US009132346B2

(12) United States Patent
Huebner

(10) Patent No.: US 9,132,346 B2
(45) Date of Patent: Sep. 15, 2015

(54) CONNECTING VIDEO OBJECTS AND PHYSICAL OBJECTS FOR HANDHELD PROJECTORS

(76) Inventor: Kenneth J. Huebner, Milwaukee, WI (US)

(*) Notice: Subject to any disclaimer, the term of this patent is extended or adjusted under 35 U.S.C. 154(b) by 622 days.

(21) Appl. No.: 13/439,026

(22) Filed: Apr. 4, 2012

(65) Prior Publication Data

US 2013/0265502 A1 Oct. 10, 2013

(51) Int. Cl.
| G03B 21/14 | (2006.01) |
| A63F 13/20 | (2014.01) |
| G06F 3/01 | (2006.01) |
| H04N 9/31 | (2006.01) |
| G06T 15/20 | (2011.01) |

(52) U.S. Cl.
CPC . *A63F 13/06* (2013.01); *G06F 3/01* (2013.01); *G06T 15/20* (2013.01); *H04N 9/3173* (2013.01); *H04N 9/3179* (2013.01); *H04N 9/3194* (2013.01); *A63F 2300/105* (2013.01); *A63F 2300/1087* (2013.01); *A63F 2300/204* (2013.01); *A63F 2300/30* (2013.01); *A63F 2300/8058* (2013.01); *G03B 21/145* (2013.01); *G06T 2215/16* (2013.01); *G09G 2340/04* (2013.01)

(58) Field of Classification Search
USPC ............. 353/39, 42, 121, 122, 69, 70, 79, 28, 353/30, 46
See application file for complete search history.

(56) References Cited

U.S. PATENT DOCUMENTS

| 6,195,093 B1 | 2/2001 | Nelson et al. |
| 6,375,079 B1 | 4/2002 | Swartz |
| 6,554,431 B1 | 4/2003 | Binsted et al. |
| 6,766,955 B2 | 7/2004 | Patel et al. |
| 7,154,395 B2 | 12/2006 | Raskar et al. |
| 7,204,428 B2 | 4/2007 | Wilson |
| 7,292,269 B2 | 11/2007 | Raskar et al. |
| 7,743,348 B2 | 6/2010 | Robbins et al. |
| 7,874,681 B2 | 1/2011 | Huebner |
| 7,907,128 B2 | 3/2011 | Bathiche et al. |
| 7,946,484 B2 | 5/2011 | Patel et al. |
| 7,976,372 B2 | 7/2011 | Baerlocher et al. |
| 8,038,304 B2 | 10/2011 | Mizuuchi et al. |
| 8,100,540 B2 | 1/2012 | Huebner |
| 8,100,541 B2 | 1/2012 | Taylor |
| 8,142,271 B2 | 3/2012 | Kuhn et al. |
| 8,651,666 B2 * | 2/2014 | Huebner .................... 353/28 |

(Continued)

OTHER PUBLICATIONS

Huebner, pending U.S. Appl. No. 13/084,687 entitled "Interactive Multi-Display Control Systems", filed Apr. 12, 2011.

(Continued)

*Primary Examiner* — William C Dowling
(74) *Attorney, Agent, or Firm* — Andrus Intellectual Property Law, LLP

(57) ABSTRACT

A handheld projecting device that illuminates a visible image comprised of one or more video objects that appear to interact, connect, and/or form paths with physical objects and/or other video objects within a user's environment. In at least one embodiment, a projecting device animates and projects one or more video objects that appear to responsively adapt to the position and orientation of at least one physical object for unique graphic and tactile effects. In some embodiments, a projecting device may connect together physical objects and video objects to form a user-defined object path, such as a racetrack or adventure trail. Video objects may be rendered and illuminated as three-dimensional objects to simulate real world objects.

25 Claims, 41 Drawing Sheets

(56) References Cited

U.S. PATENT DOCUMENTS

| | | |
|---|---|---|
| 2004/0201823 A1 | 10/2004 | Raskar et al. |
| 2005/0064936 A1 | 3/2005 | Pryor |
| 2006/0001543 A1 | 1/2006 | Raskar et al. |
| 2006/0118634 A1 | 6/2006 | Blythe et al. |
| 2008/0044005 A1 | 2/2008 | Johnston |
| 2009/0040194 A1 | 2/2009 | Shelton et al. |
| 2009/0075733 A1 | 3/2009 | Andersen et al. |
| 2009/0118005 A1 | 5/2009 | Kelly et al. |
| 2009/0118006 A1 | 5/2009 | Kelly et al. |
| 2009/0150802 A1 | 6/2009 | Do et al. |
| 2009/0207322 A1 | 8/2009 | Mizuuchi et al. |
| 2009/0246749 A1 | 10/2009 | Thursfield et al. |
| 2009/0322706 A1 | 12/2009 | Austin |
| 2010/0004062 A1 | 1/2010 | Maharbiz et al. |
| 2010/0033682 A1* | 2/2010 | LaDuke et al. ............... 353/28 |
| 2010/0113140 A1 | 5/2010 | Kelly et al. |
| 2010/0130286 A1 | 5/2010 | Ackley et al. |
| 2010/0199232 A1 | 8/2010 | Mistry et al. |
| 2010/0328615 A1 | 12/2010 | Ikeda et al. |
| 2010/0331083 A1 | 12/2010 | Maharbiz et al. |
| 2011/0001935 A1* | 1/2011 | Reale et al. .................. 353/28 |
| 2011/0019162 A1* | 1/2011 | Huebner ...................... 353/79 |
| 2011/0053688 A1 | 3/2011 | Crawford et al. |
| 2011/0115823 A1 | 5/2011 | Huebner |
| 2011/0166694 A1 | 7/2011 | Griffits et al. |
| 2011/0205500 A1 | 8/2011 | Ikeda et al. |
| 2011/0237327 A1 | 9/2011 | Baerlocher et al. |
| 2011/0248913 A1* | 10/2011 | Willis et al. ................. 345/156 |
| 2011/0316767 A1 | 12/2011 | Avrahami |
| 2012/0004031 A1 | 1/2012 | Barney et al. |
| 2012/0026088 A1* | 2/2012 | Goran ......................... 345/158 |
| 2012/0026376 A1 | 2/2012 | Goran |
| 2012/0033856 A1 | 2/2012 | Flagg et al. |
| 2012/0052931 A1 | 3/2012 | Jaqua et al. |
| 2013/0229396 A1* | 9/2013 | Huebner ...................... 345/207 |

OTHER PUBLICATIONS

Huebner, pending U.S. Appl. No. 13/336,051 entitled "Light Array Projection and Sensing System", filed Dec. 23, 2011.

Huebner, pending U.S. Appl. No. 13/412,005, entitled "Surface Aware, Object Aware, and Image Aware Handheld Projector", filed Mar. 5, 2012.

* cited by examiner

FIG. 16A

| DOG – VIDEO OBJECT | |
|---|---|
| Object ID = DOG | D100 |
| Object Position = (20,30,200) units | D102 |
| Object Orientation = (10,10,5) degrees | D104 |
| Object Velocity = (-10,-5,0) units/sec | D106 |
| Object Shape = (10,12,...); Object Size=(20,15); etc. | D107 |
| Connect status: | |
| Current Action = ACTION – EAT FOOD | D110 |
| Connected To = FOOD DISH | D112 |
| Connected Action = ACTION – HAS FOOD | D114 |
| ACTION – EAT FOOD | |
| Request for Food: | |
| Action Type = WANTS FOOD | D116 |
| Action Region = (-20,-20; 20,-20; 20,20; -20,20) | D118 |
| Connect the Dog Video Object to the Food Dish: | |
| Object Displacement Offset = (- 30,- 40) units | D120 |
| Object Orientation Offset = (20) degrees | D122 |
| Generate multimedia effects for the Dog Video Object: | |
| Graphics File = DogEatingFood.mpg | D124 |
| Sound File = Crunching.mp3 | D126 |
| Haptic File = Vibrate.data | D128 |

FIG. 16B

| FOOD DISH – PHYSICAL OBJECT | |
|---|---|
| Object ID = FOOD DISH | D140 |
| Object Position = (40,60,195) units | D142 |
| Object Orientation = (10,10,-2) degrees | D144 |
| Object Velocity = (-10,-5,0) units/sec | D146 |
| Object Shape = (5,6,...); Object Size=(10,8); etc. | D147 |
| ACTION – HAS FOOD | |
| Respond with Food: | |
| Tag ID = "123" | D150 |
| Action Type = HAS FOOD | D152 |
| Action Region = (-5,-2; 5,-2; 5,2; -5,2) | D154 |

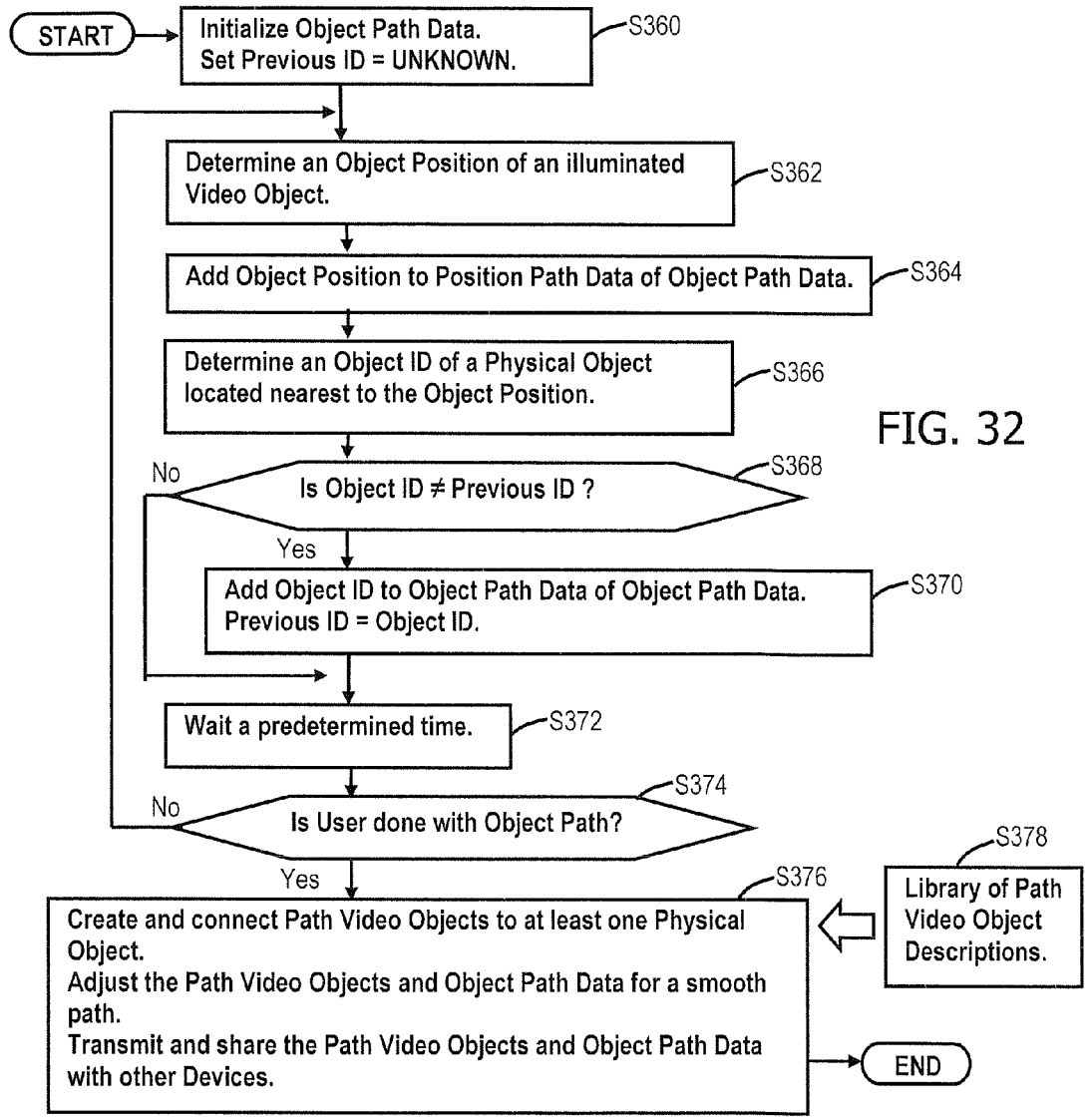

CONNECTING VIDEO OBJECTS AND PHYSICAL OBJECTS FOR HANDHELD PROJECTORS

FIELD OF THE DISCLOSURE

The present disclosure generally relates to handheld projecting devices. In particular, the present disclosure relates to handheld projecting devices that illuminate a visible image comprised of one or more video objects that appear to interact, connect, and/or form paths with physical objects and/or other video objects within a user's environment.

BACKGROUND OF THE INVENTION

Presently, there are many types of handheld video devices that enable a player/user to control a display image. One type of highly popular video console is the Wii game machine and controller manufactured by Nintendo, Inc. of Japan. This game system enables a user to interact with an animated image, such as a TV screen, by waving a wireless controller through the air. However, the system does not enable its graphic image to extend beyond its boundaries and connect with physical objects found in the user's environment.

Other types of electronic display devices are available, such as tablet computers and handheld game devices. However, such displays are further incapable of extending and connecting a graphic display to household objects in the user's environment.

Projected image displays are also available, as manufacturers are embedding compact, image projectors (often called "pico" projectors) into handheld devices, such as cameras and mobile phones. However, the present focus of these projecting devices is to project images rather than utilize the projectors for illuminating video objects (such as characters, avatars, etc.) that connect and form paths with physical objects and other video objects.

For typical handheld projecting devices, when held obliquely to a remote surface, are hindered with unrealistic images that suffer from shape and keystone distortion with brightness hotspots.

Therefore, an opportunity exists for the use of handheld projecting devices that illuminate video objects that appear to interact, connect, and form paths with physical objects and other video objects within a user's environment, creating a uniquely realistic, visual and tactile experience.

SUMMARY

The present disclosure relates to handheld projecting devices that illuminate a visible image comprised of one or more video objects that appear to interact, connect, and/or form paths with physical objects and/or other video objects within a user's environment.

In some embodiments, a handheld projecting device is moved through space while projecting a visible image comprised of one or more video objects Onto a remote surface, creating a virtual world. A video object may be comprised of any type of graphically represented object—such as a character, avatar, vehicle, item, path, etc.—which may be animated and projected by the projecting device. Moreover, the projecting device may sense the surrounding three-dimensional (3D) real world comprised of physical objects, such as walls, furniture, people, and other items. Such a capability enables the projecting device to illuminate one or more video objects that appear to interact, connect, and/or form paths with physical objects and/or other video objects in the user's environment.

In some embodiments, a projecting device is comprised of a control unit (such as a microprocessor) that provides computing abilities for the device, supported by one or more executable programs contained in a computer readable storage media, such as a memory.

The projecting device is further comprised of an image projector, such as a compact pico projector. In some embodiments, the image projector may illuminate a "full-color" visible image comprised of one or more video objects to the delight of a user.

The device is further comprised of an image sensor, such as a camera-based image sensor, capable of observing a spatial view of one or more physical objects within the user's environment.

The projecting device may also include a sound generator and a haptic generator to create audible sound and vibration effects in response to the movement of one or more video objects and physical objects within the environment.

In certain embodiments, an interactive image projecting system may be comprised of at least one handheld projecting device and one or more physical objects. The physical objects may be stationary and/or moveable objects, including handheld physical objects. Examples of stationary physical objects may include, but not limited to, a wall, ceiling, floor, and tabletop. Examples of moveable physical objects may include a rolling vehicle, floating balloon, 2D picture, token, or playing card, while examples of moveable handheld physical objects may include a wristwatch, book, toothbrush, or key.

In some embodiments, physical objects are affixed with object tags to create tagged physical objects that are identifiable. Examples of object tags include barcodes, infrared emitting markers, and other optically discernible fiducial markers.

In certain embodiments, a handheld projecting device and its image sensor may observe a tagged physical object such that the device determines (e.g., using computer vision techniques) the position and/or orientation of the tagged physical object in 3D space. Whereupon, the projecting device can illuminate one or more video objects that appear to adapt to the position and orientation of the physical object. For example, in one embodiment, a handheld projecting device illuminates a video object of a dog near a physical object of a food dish. Whereby, the device connects the video object (of the dog) to the physical object (of the food dish) such that the dog appears to eat from the food dish. That is, the video object (of the eating dog) appears to remain substantially fixed to the physical object (of the food dish) irrespective of device movement.

Video objects can also connect to moveable physical objects. In one embodiment, a projecting device projects a first video object of a dog having its teeth brushed. When a user moves a handheld toothbrush back and forth in the vicinity, a second video object of bubbles connects and remains affixed to the moving toothbrush, cleaning the dog's white teeth.

In at least one embodiment, a handheld projecting device illuminates a video object of a motorcycle. Physical objects, such as a ramp and a "360 degree" loop, may be arbitrarily located and oriented (e.g., upside down, tilted, or right side up) on a wall, ceiling, floor, table top, etc. Then in operation, when the projecting device is moved, the video object of the motorcycle adapts and is oriented according to the ramp orientation, moving up the incline and leaping into the air. When the projecting device is moved over the "360 degree"

loop, the motorcycle connects to the loop, spinning the motorcycle around the physical loop, before disconnecting and exiting from the loop.

In some embodiments, a handheld projecting device may connect a plurality of video objects and physical objects to form an object path. In one embodiment, a first and a second handheld projecting device each illuminate a video object of a motorcycle. A racing game may then be constructed of physical objects (e.g., a ramp, a hoop of fire, and a 360-degree loop) that are placed on multiple surfaces. In operation, a user/player may move the first device to trace out a user-defined object path to connect the physical objects for the racing game. Then during the race, players move their projecting devices and motorcycles along the object path between and over the physical objects. If a player drives off course, the projecting device presents video text reading "Disqualified Rider", and the player loses the race.

BRIEF DESCRIPTION OF THE DRAWINGS

Some embodiments of the invention will now be described by way of example with reference to the accompanying drawings:

FIG. 16A is a data table for the projecting device of FIG. 1, wherein the data table describes a dog video object and its object action.

FIG. 16B is a data table for the projecting device of FIG. 1, wherein the data table describes a dish physical object and its object action.

FIG. 32 is a flowchart of a computer readable method of the projecting device of FIG. 1, where the method creates a user-defined object path.

FIG. 33 is a data table for the projecting device of FIG. 1, wherein the data table describes a user-defined object path.

DETAILED DESCRIPTION OF THE INVENTION

Figure 1:
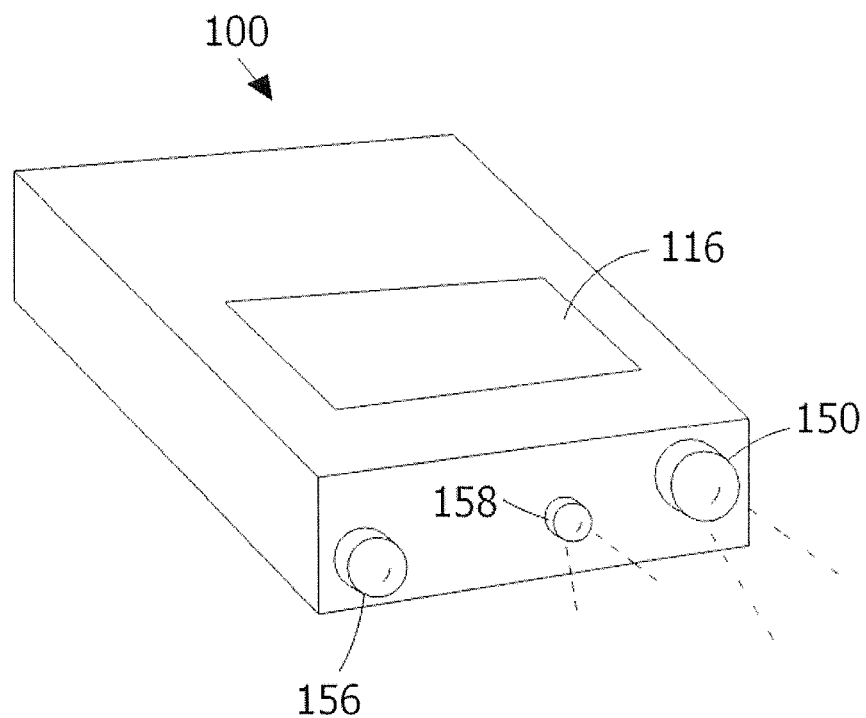
FIG. 1 is a perspective view of a first embodiment of a projecting device, illustrating its front end.

One or more specific embodiments will be discussed below. In an effort to provide a concise description of these embodiments, not all features of an actual implementation are described in the specification. It should be appreciated that when actually implementing embodiments of this invention, as in any product development process, many decisions must be made. Moreover, it should be appreciated that such a design effort could be quite labor intensive, but would nevertheless be a routine undertaking of design and construction for those of ordinary skill having the benefit of this disclosure. Some helpful terms of this discussion will be defined:

The terms "a", "an", and "the" refers to one or more items. Where only one item is intended, the terms "one", "single", or similar language is used. Also, the term "includes" means "comprises". The term "and/or" refers to any and all combinations of one or more of the associated list items.

The terms "adapter", "analyzer", "application", "circuit", "component", "control", "interface", "method", "module", "program", and like terms are intended to include hardware, firmware, and/or software.

The term "barcode" refers to any optical machine-readable representation of data, such as one-dimensional (1D) or two-dimensional (2D) barcodes, or symbols.

The term "computer readable medium" or the like refers to an kind of medium for retaining information in any form or combination of forms, including various kinds of storage devices e.g., magnetic, optical, and/or solid state, etc.). The term "computer readable medium" may also include transitory forms of representing information, including various hardwired and/or wireless links for transmitting the information from one point to another.

The terms "connect an object", "connecting objects", "object connection", and like terms refer to an association formed between or among objects, and does not always imply that the objects physically connect or overlap.

The term "haptic" refers to tactile stimulus presented to a user, often provided by a vibrating or haptic device when placed near the user's skin. A "haptic signal" refers to a signal that activates a haptic device.

The terms "key", "keypad", "key press", and like terms are meant to broadly include all types of user input interfaces and their respective action, such as, but not limited to, a gesture-sensitive camera, a touch pad, a keypad, a control button, a trackball, and/or a touch sensitive display.

The term "multimedia" refers to media content and/or its respective sensory action, such as, but not limited to, video, graphics, text, audio, haptic, user input events, program instructions, and/or program data.

The term "operatively coupled" refers to, but not limited to, a wireless and/or a wired means of communication between items, unless otherwise indicated. Moreover, the term "operatively coupled" further refers to a direct coupling between items and/or an indirect coupling between items via an intervening item or items (e.g., an item includes, but not limited to, a component, a circuit, a module, and/or a device). The term "wired" refers to any type of physical communication conduit (e.g., electronic wire, trace, or optical fiber).

The term "optical" refers to any type of light or usage of light, both visible (e.g., white light) and/or invisible light (e.g., infrared light), unless specifically indicated.

The term "video" generally refers to the creation or projection of images for a projected display, typically a sequence of still images that create an animated image.

The term "video frame" refers to a single still image.

The term "video object" refers to an object (e.g., character, avatar, vehicle, item, path, etc.) that is graphically represented within an image or animated sequence of images.

The present disclosure illustrates examples of operations and methods used by the various embodiments described. Those of ordinary skill in the art will readily recognize that certain steps or operations described herein may be eliminated, taken in an alternate order, and/or performed concurrently. Moreover, the operations may be implemented as one or more software programs for a computer system and encoded in a computer readable medium as instructions executable on one or more processors. The software programs may also be carried in a communications medium conveying signals encoding the instructions. Separate instances of these programs may be executed on separate computer systems. Thus, although certain steps have been described as being performed by certain devices, software programs, processes, or entities, this need not be the case and a variety of alternative implementations will be understood by those having ordinary skill in the art.

The following detailed description refers to the accompanying drawings. The same reference numbers in different drawings do identify the same or similar elements.

Handheld Projecting Device

Figure 2:
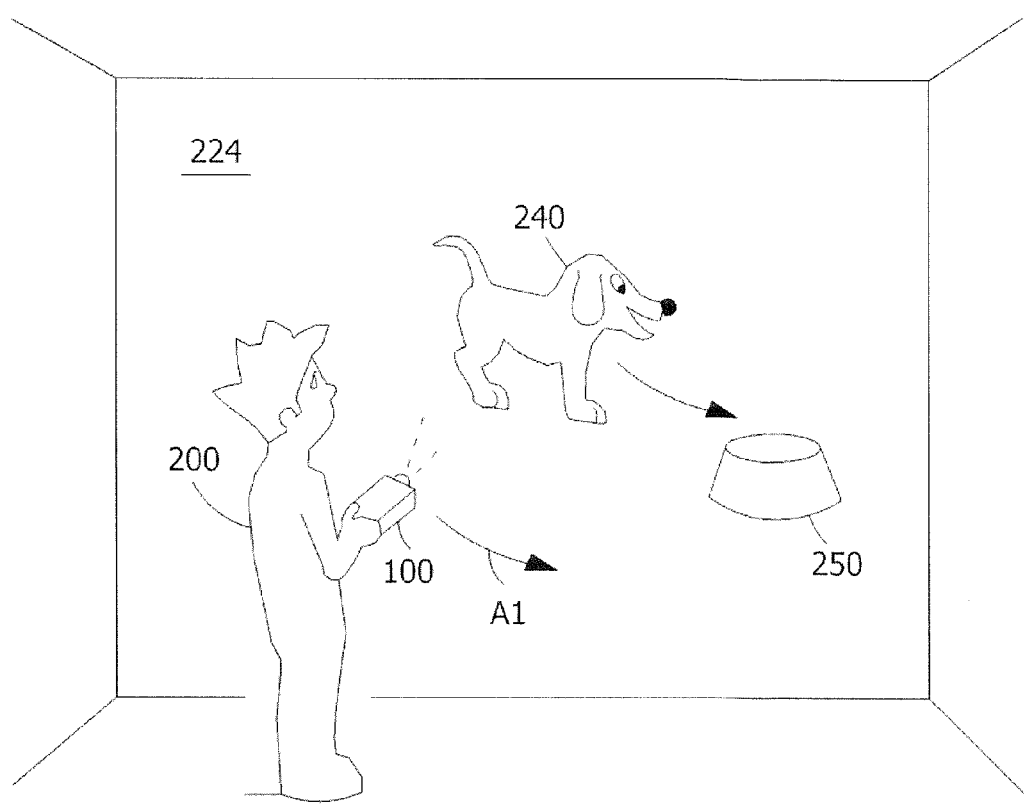
FIG. 2 is a perspective view of the projecting device of FIG. 1, where the device is being held by a user and is projecting a video object near a physical object.

So turning first to FIGS. 1 and 2, perspective views are shown of a first embodiment of the disclosure, referred to as a handheld projecting device 100. FIG. 2 shows the handheld projecting device 100, which may be compact and mobile, grasped and moved through 3D space (as shown by arrow A1) by a user 200. The projecting device 100 may alternatively be attached to a user's clothing or body and worn as well. As can be seen, the projecting device 100 is illuminating a video object 240 (of a dog) on a remote surface 224, such as a wall. Moreover, device 100 may enable the user 200 to make interactive motion and/or aim-and-click gestures relative to one or more physical objects, such as a wall picture physical object 250 (of a food dish), located on one or more remote surfaces in the environment. The remote surface 224 may be representative of any type of surface, such as a wall, ceiling, floor, tabletop, chair, lawn, sidewalk, etc., both indoors and outdoors.

Thereshown in FIG. 1 is a close-up, perspective view of the handheld projecting device 100 comprising an image projector 150, an infrared image sensor 156, an infrared light emitter 158, and a user interface 116.

Figure 3:
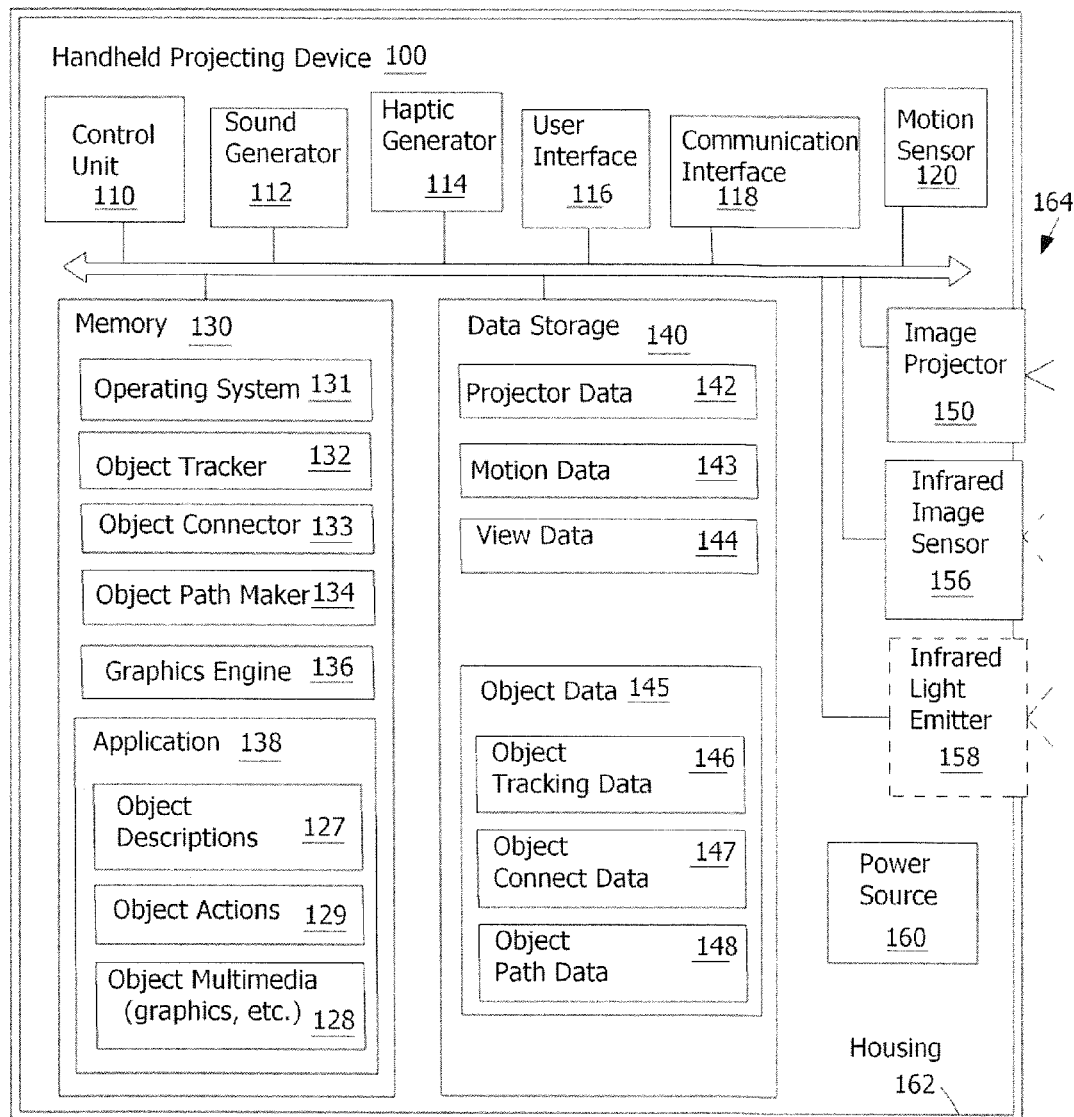
FIG. 3 is a block diagram of the projecting device of FIG. 1, showing components.

Turning now to FIG. 3, a block diagram is presented of the handheld projecting device 100, which may be comprised of, but not limited to, an outer housing 162, a control unit 110, a sound generator 112, a haptic generator 114, the user interface 116, a communication interface 118, a motion sensor 120, the image projector 150, the infrared image sensor 156, the infrared light emitter 158, a memory 130, a data storage 140, and a power source 160.

The outer housing 162 may be of handheld size (e.g., 70 mm wide×110 mm deep×20 mm thick) and made of, for example, easy to grip plastic. The housing 162 may be constructed in any shape, such as a rectangular shape (as in FIG. 1) as well as custom shaped, such as the shape of a tablet, steering wheel, rifle, gun, golf club, or fishing reel.

Affixed to a front end 164 of device 100 is the image projector 150, which may be operable to, but not limited to, project a "full-color" (e.g., red, green, blue) image of visible light. Projector 150 may be of compact size, such as a micro or pico projector. The image projector 150 may be comprised of a digital light processor (DLP)-, a liquid-crystal-on-silicon (LCOS)-, or a laser-based image projector, although alternative image projectors may be used as well. Projector 150 may be operatively coupled to the control unit 110 such that the control unit 110, for example, can generate and transmit image graphic data to projector 150 for display.

The infrared image sensor 156 may be affixed to the front end 164 of device 100, wherein sensor 156 may be operable to observe a spatial view of the environment and capture one or more image view frames. Image sensor 156 may be operatively coupled to control unit 110 such that control unit 110, for example, may receive and process captured image data. Sensor 156 may be comprised of at least one of a photo diode-, a photo detector-, a photo detector array-, a complementary metal oxide semiconductor (CMOS)-, a charge coupled device (CCD)-, or an electronic camera-based image sensor that is sensitive to at least infrared light, although other types of image sensors may be considered. In some embodiments, sensor 156 may be a 3D depth camera, often referred to as a ranging, lidar, time-of-flight, stereo pair, or RGB-D camera, which creates a 3-D spatial depth view frame. In the current embodiment, image sensor 156 may be comprised of a CMOS- or a CCD-based video camera that is sensitive to at least infrared light. Moreover, image sensor 156 may optionally include an infrared pass-band filter, such that only infrared light is sensed (while other light, such as visible light, is blocked from view). The image sensor 156 may optionally include a global shutter or high-speed panning shutter for reduced image motion blur.

The infrared light emitter 158 may be optionally included (as denoted by a dashed line) with device 100, enhancing infrared illumination for low ambient light conditions, such as a dark or unlit room. Emitter 158 may be operatively coupled to control unit 110 such that control unit 110, for example, may modulate the emitter's 158 generation of infrared light. The infrared illuminating emitter 158 may be comprised of, but not limited to, at least one of an infrared light emitting diode, an infrared laser, or an infrared light source, such that emitter 158 generates at least infrared light. In some alternative embodiments, the light emitter 158 may be integrated with the image projector 150.

The motion sensor 120 may be affixed to device 100, providing inertial awareness. Whereby, motion sensor 120 may be operatively coupled to control unit 110 such that control unit 110, for example, may receive spatial position and/or movement data. Motion sensor 120 may be operable to detect spatial movement and transmit a movement signal to control unit 110. Moreover, motion sensor 120 may be operable to detect a spatial position and transmit a position signal to control unit 110. The motion sensor 120 may be comprised of, but not limited to, at least one of an accelerometer, a magnetometer (e.g., electronic compass), a gyroscope, a spatial triangulation sensor, and/or a global positioning system (GPS) receiver. Advantages exist for motion sensing in 3D space; wherein, a 3-axis accelerometer and/or 3-axis gyroscope may be utilized.

The user interface 116 provides a means for a user to input information to the device 100. For example, the user interface 116 may generate one or more user input signals when a user actuates (e.g., presses, touches, taps, or hand gestures) the user interface 116. The user interface 116 may be operatively coupled to control unit 110 such that control unit 110 may receive one or more user input signals and respond accordingly. User interface 116 may be comprised of, but not limited to, one or more control buttons, keypads, touch pads, rotating dials, trackballs, touch-sensitive displays, and/or hand gesture-sensitive devices.

The communication interface 118 provides wireless and/or wired communication abilities for device 100. Communication interface 118 is operatively coupled to control unit 110 such that control unit 110, for example, may receive and transmit data from/to other remote devices, such as other handheld projecting devices. Communication interface 118 may be comprised of, but not limited to, a wireless transceiver, data transceivers, processing units, codecs, and/or antennae, as illustrative examples. For wired communication, interface 118 provides one or more wired interface ports (e.g., universal serial bus (USB) port, a video port, a serial connection port, an IEEE-1394 port, an Ethernet or modem port, and/or an AC/DC power connection port). For wireless communication, interface 118 may use modulated electromagnetic waves of one or more frequencies (e.g., RF, infrared, etc.) and/or modulated audio waves of one or more frequencies (e.g., ultrasonic, etc.). Interface 118 may use various wired and/or wireless communication protocols (e.g., TCP/IP, WiFi, Zigbee, Bluetooth, Wireless USB, Ethernet, Wireless Home Digital Interface (WHDI), Near Field Communication, and/or cellular telephone protocol).

The sound generator 112 may provide device 100 with audio or sound generation capability. Sound generator 112 may be operatively coupled to control unit 110, such that control unit 110, for example, can control the generation of sound from device 100. Sound generator 112 may be comprised of, but not limited to, audio processing units, audio codecs, audio synthesizer, and/or at least one sound generating element, such as a loudspeaker.

The haptic generator 114 provides device 100 with haptic signal generation and output capability. Haptic generator 114 may be operatively coupled to control unit 110 such that control unit 110, for example, may control and enable vibration effects of device 100. Haptic generator 114 may be comprised of, but not limited to, vibratory processing units, codecs, and/or at least one vibrator (e.g., mechanical vibrator).

The memory 130 may be comprised of computer readable medium, which may contain, but not limited to, computer readable instructions. Memory 130 may be operatively coupled to control unit 110 such that control unit 110, for example, may execute the computer readable instructions. Memory 130 may be comprised of RAM, ROM, Flash, Secure Digital (SD) card, and/or hard drive, although other types of memory in whole, part, or combination may be used, including fixed and/or removable memory, volatile and/or nonvolatile memory.

Data storage 140 may comprised of computer readable medium, which may contain, but not limited to, computer related data. Data storage 140 may be operatively coupled to control unit 110 such that control unit 110, for example, may read data from and/or write data to data storage 140. Storage 140 may be comprised of RAM, ROM, Flash, Secure Digital (SD) card, and/or hard drive, although other types of memory in whole, part, or combination may be used, including fixed and/or removable, volatile and/or nonvolatile memory. Although memory 130 and data storage 140 are presented as separate components, some embodiments of the projecting device may use an integrated memory architecture, where memory 130 and data storage 140 may be wholly or partially integrated. In some embodiments, memory 130 and/or data storage 140 may wholly or partially integrated with control unit 110.

The control unit 110 may provide computing capability for device 100, wherein control unit 110 may be comprised of, for example, one or more central processing units (CPU) having appreciable processing speed (e.g., 2 gHz) to execute computer instructions. Control unit 110 may include one or more processing units that are general-purpose and/or special purpose (e.g., multi-core processing units, graphic processors, and/or related chipsets). The control unit 110 may be operatively coupled to, but not limited to, sound generator 112, haptic generator 114, user interface 116, communication interface 118, motion sensor 120, memory 130, data storage 140, image projector 150, image sensor 156, and light emitter 158. Although an architecture to connect components of device 100 has been presented, alternative embodiments may rely on alternative bus, network, and/or hardware architectures.

Finally, device 100 may include a power source 160, providing energy to one or more components of device 100. Power source 160 may be comprised, for example, of a portable battery and/or a power cable attached to an external power supply. In the current embodiment, power source 160 is a rechargeable battery such that device 100 may be mobile.

Computing Modules of the Projecting Device

FIG. 3 shows memory 130 may contain various computing modules comprised of computer readable instructions, such as, but not limited to, an operating system 131, an object tracker 132, an object connector 133, an object path maker 134, a graphics engine 136, an application 138, an object descriptions 127, an object actions 129, and an object multimedia 128. Such modules may be implemented in software, firmware, and/or hardware. In the current embodiment, these modules may be implemented in memory 130 and executed by control unit 110.

The operating system 131 may provide the device 100 with basic functions and services, such as read/write operations with the hardware, such as projector 150 and image sensor 156.

The object tracker 132 may enable the device 100 to track the position, orientation, and/or velocity of video objects and/or tagged physical objects in the vicinity of device 100. That is, tracker 132 may capture one or more view frames from the image sensor 156 and analyze the view frames using computer vision techniques. Whereupon, the object tracker 132 may detect and identify object tags and corresponding physical objects in the environment. Tracker 132 may be comprised of, but not limited to, a tag reader, a barcode reader, and/or an optical light signal demodulator to identify object tags comprised of optical machine-readable representation of data.

The object connector 133 may enable the device 100 to connect one or more illuminated video objects to one or more physical objects and/or other video objects. Whereby, the object connector 133 may manage object relationships, such as, but not limited to, the spatial proximity and movement of the illuminated video objects relative to physical objects and other video objects.

The object path maker 134 may enable the device 100 to create an object path among physical objects and/or video objects. The object path may be auto-generated or user-defined, such that a user can create a desired path in 3D space. Once defined, the device 100 may generate a visible path that a user can follow, such as for a racing or adventure application.

The graphics engine 136 may be operable to render computer graphics of one or more video objects within data storage in preparation for projecting a visible image.

The application 138 is representative of one or more user applications, such as, but not limited to, electronic games and/or educational programs. Application 138 may be comprised of operations and data for video objects and physical objects.

For example, the application 138 may include object descriptions 127, which is a library of video object descriptions and/or physical object descriptions. Object descriptions may include information that describes both object behavior and object attributes, such as the spatial orientation, shape, and size, etc. of the objects.

The application 138 may further include object actions 129, which is a library of video object actions and/or physical object actions. Object actions 129 may describe the causal conditions that need to be met before objects can interact. In addition, object actions 129 may describe the resultant effects of object interactivity. That is, once interactivity is allowed, the object actions 129 may enable the generation of multimedia effects (e.g., graphics, sound, and haptic) for one or more video objects presented by the projecting device 100.

Finally, the application 138 may further include object multimedia 128, which is a library of video object graphics for rendering and animating a visible image comprised of one or more video objects. Object multimedia 128 may also include sound and haptic data for creating sound and haptic effects for the one or more video objects.

Computer Readable Data of the Projecting Device

FIG. 3 also shows data storage 140 may be comprised of various collections of computer readable data (or data sets), such as, but not limited to, projector graphics 142, motion data 143, view data 144, object data 145, object tracking data 146, object connect data 147, and object path data 148. These data sets may be implemented in software, firmware, and/or hardware. In the current embodiment, these data sets may be implemented in data storage 140, which can be read from and/or written to (or modified) by control unit 110.

For example, the view data 142 may retain one or more captured image view frames from image sensor 156 for pending view analysis.

The projector data 142 may provide storage for video frame data for the image projector 150. For example, the control unit 110 executing application 138 may render off-screen graphics of one or more video objects in projector data 142, such as a pet dog or cat, prior to visible light projection by projector 150.

The motion data 143 may store spatial motion data collected and analyzed from the motion sensor 120. Motion data 143 may define, for example, in 3D space the spatial acceleration, velocity, position, and/or orientation of the projecting device 100.

Object data 145 may provide general data storage for one or more video objects and/or physical objects, where each object instance may be defined with attributes, such as, but not limited to, an object identifier (e.g., object ID="344"), an object type (e.g., video or physical), etc.

Object tracking data 146 may provide spatial tracking storage for one or more video objects and/or physical objects, where each object instance may be defined with attributes, such as, but not limited to, an object position, object orientation, object shape, object velocity, etc.

Object connect data 147 may define object connections made among a plurality of video objects and/or physical objects, where each object instance may be defined with attributes, such as, but not limited to, a first connection object ID, a second connection object ID, etc. Various object connections may be formed such that video objects and/or physical objects can interact and connect in different ways.

Object path data 148 may define one or more object paths of video objects and/or physical objects located in the environment, such as for racing or exploration applications. Object path data 148 may be comprised of, for example, path positions, connected object IDs of connected objects along a path, and path video object IDs that define an illuminated path.

Configuration of Light Projection and Viewing

Figure 4A:
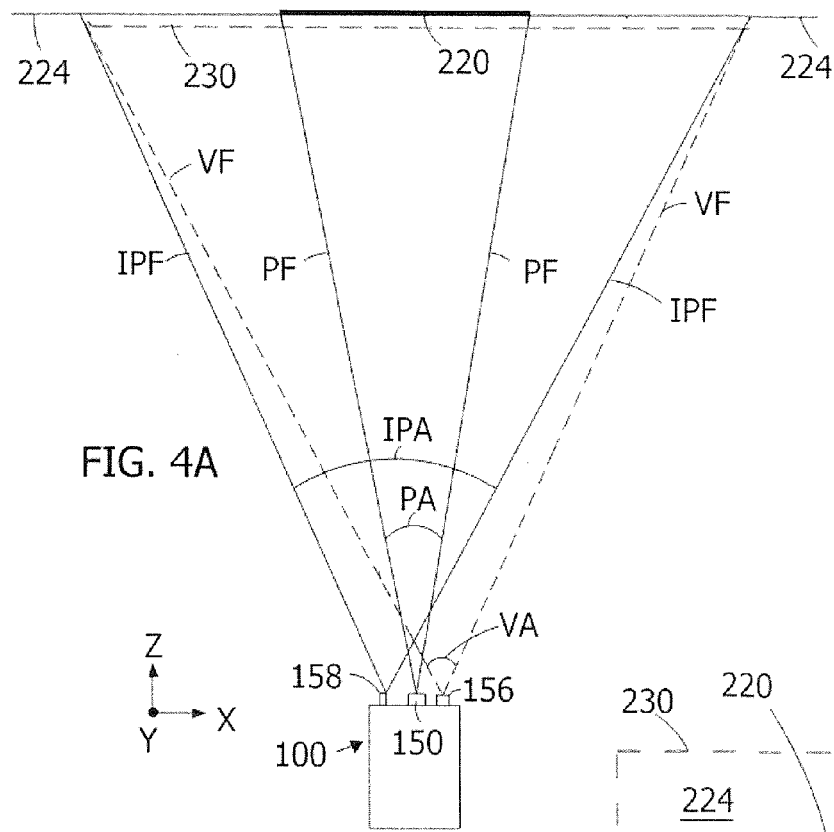
FIG. 4A is a top view of the projecting device of FIG. 1, showing the light projection angle of the projector and the light view angle of the image sensor.
Figure 4B:
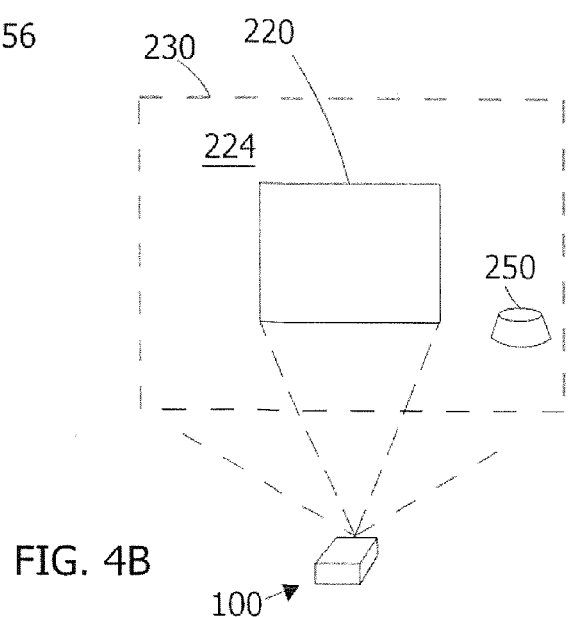
FIG. 4B is a perspective view of the projecting device of FIG. 1, showing the projected visible image and the image sensor's view region.

Turning now to FIGS. 4A and 4B, there presented is an optional device configuration for enhanced light projection and sensing by device 100, although alternative configurations may be used as well. FIG. 4A shows a top view of a configuration of the projecting device 100, along with image projector 150, infrared light emitter 158, and infrared image sensor 156. Whereby, image projector 150 may create a visible image 220 on remote surface 224, such as a wall. Projector 150 may illuminate visible light with a predetermined visible light projection angle PA creating a projection field PF. Moreover, infrared light emitter 158 may illuminate with infrared light a predetermined infrared light projection angle IPA creating an infrared projection field IPF. As shown, the infrared light emitter's 158 infrared light projection angle IPA may be substantially larger than the image projector's 150 visible light projection angle PA. In some embodiments, the infrared light projection angle IPA (e.g., 70 degrees) may be at least twice as large as the visible light projection angle PA (e.g., 30 degrees).

Further affixed to device 100, the image sensor 156 may have a predetermined light view angle VA of the observed spatial view of view region 230 on remote surface 224 within view field VF. As illustrated, the image sensor's 156 view angle VA may be substantially larger than the image projector's 150 visible light projection angle PA. The image sensor 156 may be implemented, for example, using a wide-angle camera lens or fish-eye lens. In some embodiments, the image sensor's 156 view angle VA (e.g., 70 degrees) may be at least twice as large as the image projector's 150 visible light projection angle PA (e.g., 30 degrees). Such a configuration enables the device to observe the remote surface 224 and physical objects (not shown) substantially outside of the visible light projection field PF, enhancing the light sensing capabilities of device 100.

FIG. 4B shows a perspective view of projecting device 100, illuminating its visible image 220 on remote surface 224. In an example operation, device 100 may enable its image sensor (not shown) to observe the wide view region 230. Thus, an advantage is to, but not limited to, enable device 100 to observe one or more physical objects 250 within and outside of its projected image 220.

Passive Object Tags

Figure 5:
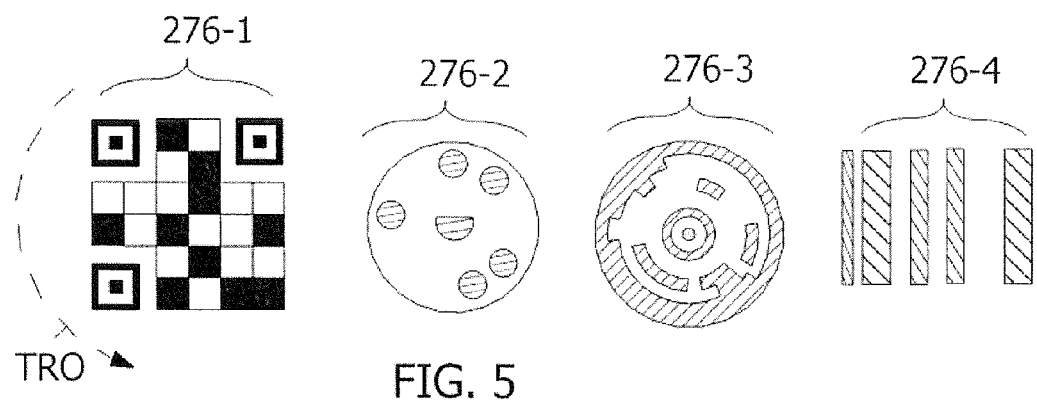
FIG. 5 is a top view of some types of passive object tags, such as a 2D barcode and other symbols.

Turning now to FIG. 5, there presented are various passive object tags that include optical machine-readable barcodes or patterns (as indicated elsewhere) that represent data comprised of, but not limited to, a unique tag identifier (e.g., where tag ID="123"). Presented are a 2D barcode tag 276-1, a 2D circular code tag 276-2, a 2D shot code tag 276-3, and a 1D barcode tag 276-4, as illustrative examples. Such tags may be located (e.g., printed, embossed, etc.) on physical objects for, but not limited to, identification purposes. In some embodiments, tags may be asymmetrical and/or have a one-fold rotational symmetry. The term "one-fold rotational symmetry" denotes a shape or pattern that only appears the same when rotated 360 degrees. For example, the 2D barcode tag 276-1 has a one-fold rotational symmetry since it must be rotated a full 360 degrees before it appears the same (as suggested by an arrow defining a tag rotation angle TRO).

Observing a Tagged Physical Object

Figure 6:
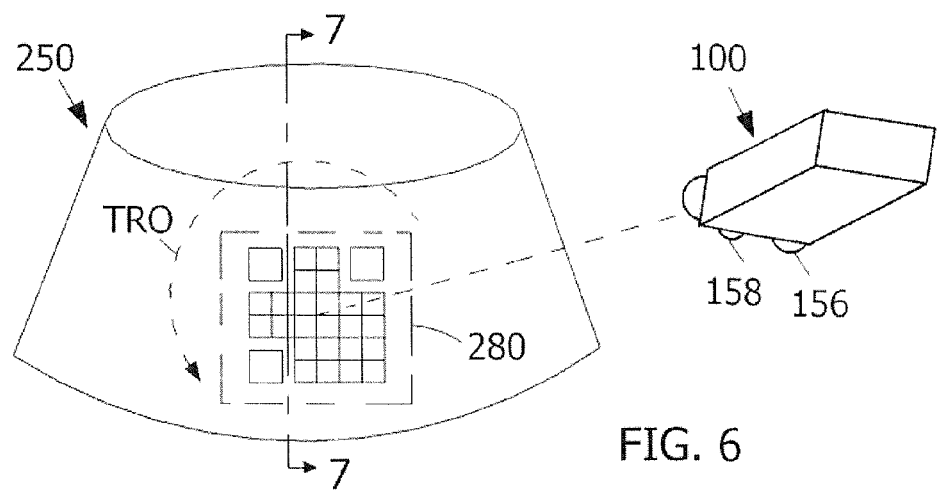
FIG. 6 is a perspective view of the projecting device of FIG. 1, showing an object tag affixed to a physical object.

Presented in FIG. 6 is the tagged physical object 250 (as shown earlier in FIG. 2), which represents a 2D picture of a blue colored food dish, which includes an object tag 280. In the current embodiment, the physical object 250 may be sized similar to a real-world food dish (e.g., 25 cm×20 cm). The physical object 250 may be constructed of, for example, low cost plastic or paper.

During a tag sensing operation, device 100 may optionally activate infrared light emitter 158 (to enhance the view of tag 280 in low light conditions) and enable image sensor 158 to capture at least one view frame of the spatial view of tag 280. Then using computer vision techniques adapted from current art (e.g., barcode reading, camera pose estimation, etc.), the device 100 may analyze the at least one view frame and detect, identify, and determine the position and orientation of the object tag 280 affixed to the physical object 250 in 3D space. For example, the object tag 280 may be an optical machine-readable 2D barcode tag that represents data comprised of, for example, a tag identifier (e.g., tag ID="123"). Moreover, the object tag 280 may be a 2D barcode tag that has a one-fold rotational symmetry (similar to the tag 276-1 of FIG. 5) such that the device 100 can determine a tag rotation angle TRO in 3D space.

In the current embodiment, the object tag 280 may be of a predetermined physical size such that the device 100 can readily determine a position and orientation of the tag 280 in 3D space using computer vision techniques (e.g., camera pose estimation). However, in alternate embodiments, object tag 280 may be of arbitrary physical size and have an optical machine-readable barcode that represents data comprised of a tag identifier (ID) (e.g., tag ID="123") and a tag dimension (e.g., tag size="10 cm×10 cm") such that device 100 can dynamically determine the position and orientation of tag 280 using computer vision methods. In some embodiments, there may be a plurality of object tags affixed to a physical object, where each object tag may provide a unique tag identifier (e.g., first tag ID="10", second tag ID="11", etc.).

Visible and/or Hidden Object Tags on a Physical Object

Figure 7:
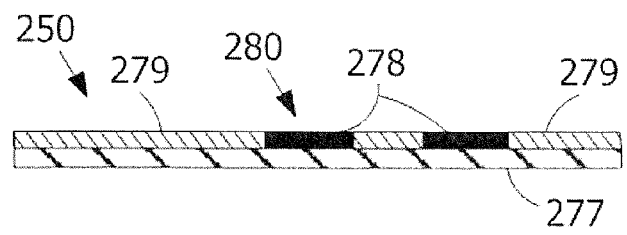
FIG. 7 is a section view of the object tag affixed to the physical object of FIG. 6.

Turning now to FIG. 7, thereshown is a section view of the tagged physical object 250 (also shown in FIG. 6) that includes the object tag 280. The projecting device (with its infrared image sensor 156 of FIG. 3) may detect and identify both visible and hidden object tags. Visible object tags are observable by the naked eye, such as a typical barcode printed in black and/or colored ink on paper or plastic. For many printable inks and materials are observable in both visible light and infrared light. However, hidden object tags are substantially hidden from a user's view such that the tags can be of substantial size (e.g., 15 cm×15 cm) for long-distance sensing. Various materials and/or printable inks may be used for hidden tags. Some commercial inks or dyes are often translucent, reflective, or absorbing in infrared light but appear brightly colored, dark, or even black in visible light, such as some inks in Crayola Classic Color Markers from Binney and Smith, Inc. of USA. For example, object tag 280 may comprised of an infrared absorbing ink 278 and an infrared translucent ink 279, which both appear colored blue in visible light, which are deposed on a light reflective substrate 277, such as white paper or plastic.

Whereby, in FIG. 6, the object tag 280 may be hidden from the user's view on the physical object 250 that appears solid blue color in visible light. Yet device 100 with its infrared image sensor 156 can still optically detect the tag 280 using infrared light (e.g., appearing similar to the 2D barcode tag 276-1 in FIG. 5). Understandably, myriad other physical objects may be constructed using other materials, artwork, colors, sizes, 2D shapes, 3D shapes, etc., including other types, sizes, and numbers of object tags.

Start-up the Handheld Projecting Device

Referring briefly to FIG. 3, the device 100 may begin its operation, for example, when a user actuates the user interface 116 (e.g., presses a button) on device 100 causing energy from power source 160 to flow to components of the device 100. The device 100 may then begin to execute computer implemented methods, such as a high-level method of operation.

High-level Method of Operation for the Projecting Device

Figure 8:
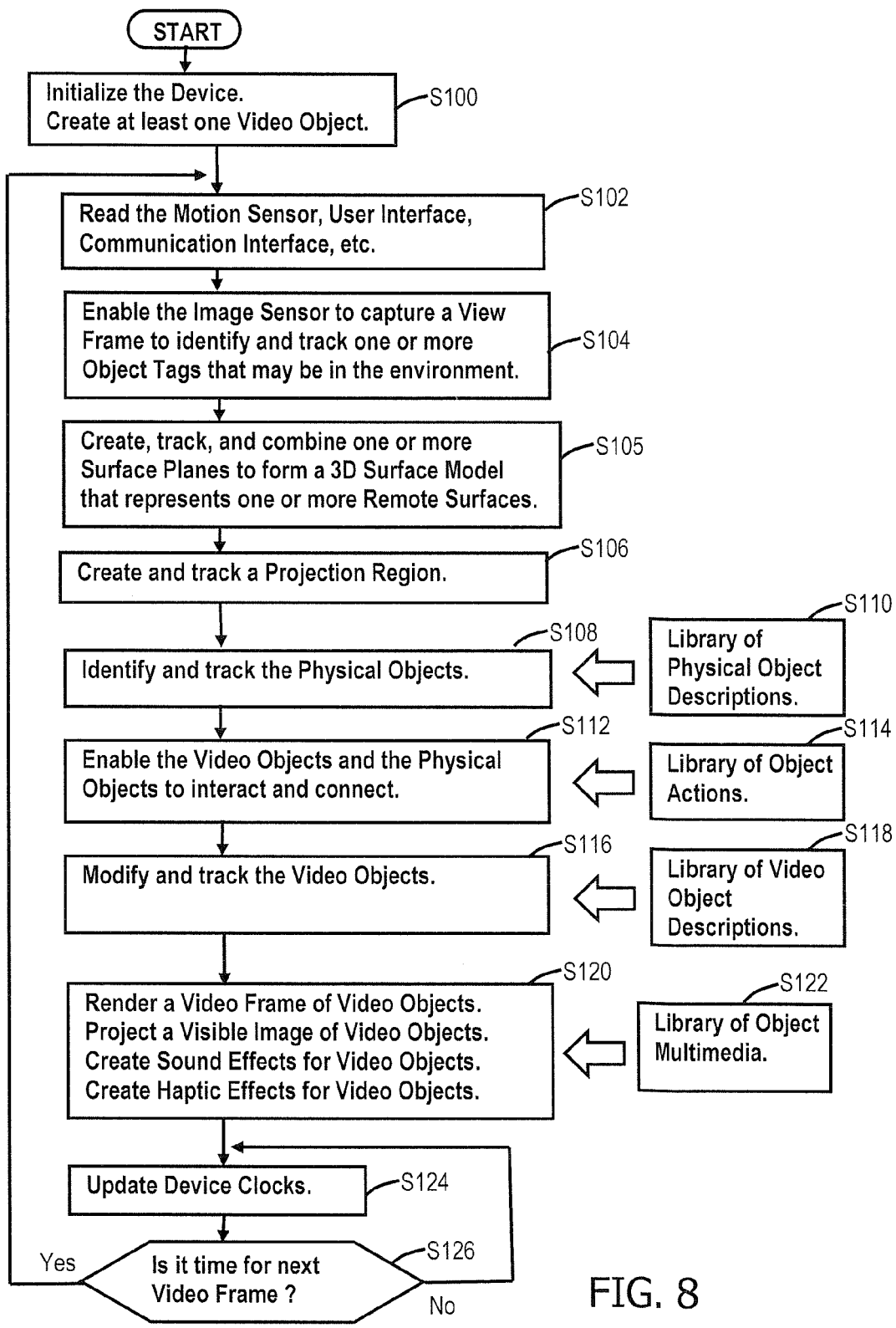
FIG. 8 is a flowchart of a computer readable method of the projecting device of FIG. 1, wherein the method describes high-level operations of the device.

In FIG. 8, a flowchart of a high-level, computer implemented method of operation for the projecting device is presented, although alternative methods may also be considered. The method may be implemented, for example, in memory (reference numeral 130 of FIG. 3) and executed by at least one control unit (reference numeral 110 of FIG. 3).

Beginning with step S100, the device's control unit initializes the projecting device's operating state, such as setting data storage (reference numeral 140 of FIG. 3) with default data, configuring libraries, etc. Moreover, the control unit starts up an application (reference numeral 138 of FIG. 3), which may establish an instance of at least one video object in object data (reference numeral 145 of FIG. 3).

Then in step S102, the control unit may receive one or more movement signals from the motion sensor (reference numeral 120 of FIG. 3) in response to device movement; whereupon, the signals are transformed and stored as motion data (reference numeral 143 of FIG. 3). Further, the control unit may receive user input data (e.g., button press) from the device's user interface (reference numeral 116 of FIG. 3); whereupon, the input data is stored in data storage. The control unit may also receive (or transmit) communication data using the communication interface (reference numeral 118 of FIG. 3); whereupon, communication data is stored in (or read from) data storage.

In step S104, the control unit enables the image sensor (reference numeral 156 of FIG. 3), while optionally activating the light emitter (reference numeral 158 of FIG. 3), to capture at least one view frame of the spatial view of surrounding remote surfaces, object tags, and physical objects. Then using computer vision techniques (e.g., barcode reading, camera pose estimation, etc.), the control unit analyzes the at least one view frame to detect, identify, and track the position and orientation of one or more object tags affixed to physical objects. For example, each object tag may be identified by reading its optical machine-readable pattern that represents data, such as, but not limited to, a tag identifier (e.g., tag ID="123").

Continuing to step S105, the control unit then creates and tracks a geometrical surface plane for each detected object tag (from step S104). Thus, each surface plane coincides with the position and orientation of each detected object tag in 3D space. Moreover, the control unit combines the surface planes to create and track a 3D surface model that represents the surrounding remote surfaces in three dimensions of space.

Next, in step S106, the control unit creates a projection region, which is a geometrical region that defines a full-sized, projected image as it would appear on the 3D surface model (from step S105). The control unit may track the position, orientation, shape, and velocity of the projection region, as it moves across one or more remote surfaces when the projecting device is moved.

In step S108, the control unit detects the physical objects in the environment. That is, the control unit may take each identified object tag (e.g., tag ID="123" from step S104) and search a library of physical object descriptions (reference numeral 127 of FIG. 3) for a matching tag identifier. For each matching tag, the control unit transforms the associated physical object description (shown in step S110) and generates an instance of physical object data (reference numeral 145 of FIG. 3) that represents the real-world physical object. The control unit may track each identified physical object, such as its position, orientation, and velocity. Thus, each identified physical object is represented by an instance of physical object data (reference numeral 145 of FIG. 3), such as, but not limited to, physical object ID, tag ID, position, orientation, velocity, shape, size, color, etc.

Whereupon, in step S116, the control unit enables the active video objects and physical objects to interact and connect by analyzing the current activity of each object. For example, a video object may only choose to interact and connect with a physical object when certain conditions are met, such as having a specific video object position, orientation, velocity, size, shape, color, etc. relative to the physical object. Further, video objects may interact and connect with other video objects. The control unit may rely on a library of object actions (reference numeral 129 of FIG. 3) as shown in step S114, which define how objects can interact and connect with each other. When conditions are met for object interactivity to occur, the control unit selects a specific response to the interaction. For example, the control unit may connect a video object to a physical object so that the objects remain physically connected. In addition, the control unit may prepare to output multimedia effects (e.g., graphics, sound, and haptic) for one or more video objects based upon the object interactions.

Then in step S116, the control unit modifies and tracks one or more video objects, as managed by the application (reference numeral 138 of FIG. 3). The control unit may rely on a library of video object descriptions (reference numeral 127 of FIG. 3) to generate instances of video object data (reference numeral 145 of FIG. 3), which may include, but not limited to, a video object ID, position, orientation, velocity, shape, color, etc., as shown in step S118.

Continuing to step S120, the control unit generates or modifies a visible image comprised of one or more video objects (from step S116) such that the one or more video objects appear to adapt to the position and orientation of at least one physical object (from step S108). To generate or modify the visible image, the control unit may retrieve graphic data (e.g., image file in step S122) from at least one application (reference numerals 138 and 128 of FIG. 3) and render graphics in a video frame in projector data (reference 142 of FIG. 3). The control unit then transfers the video frame to the image projector (reference 150 of FIG. 3), creating a projected visible image comprised of one or more video objects on at least one remote surface, observable by a user.

Also, the control unit generates or modifies a sound effect such that the sound effect is based upon the type, position, orientation, shape, size, and velocity of one or more video objects (from step S116) relative to at least one physical object (from step S108). To generate a sound effect, the control unit may retrieve audio data (e.g., MP3 file in step S122) from at least one application (reference numerals 138 and 128 of FIG. 3) and transfer the audio data to the sound generator (reference numeral 112 of FIG. 3), creating audible sound enjoyed by the user.

Also, the control unit generates or modifies a haptic effect such that the haptic effect is based upon the type, position, orientation, shape, size, and velocity of one or more video objects (from step S116) relative to at least one physical object (from step S108). To generate a haptic effect, the control unit may retrieve haptic data (e.g., wave data in step S122) from at least one application (reference numeral 138 and 128 of FIG. 3) and transfer the haptic data to the haptic generator (reference numeral 114 of FIG. 3), creating a vibratory effect that may be felt by a user holding the projecting device.

In step S124, the control unit updates clocks and timers so the projecting device operates in a time-coordinated manner.

Finally, in step S126, if the control unit determines that the next video frame needs to be presented (e.g., once every 1/30 of a second), then the method loops to step S102 to repeat the process. Otherwise, the method returns to step S124 to wait for the clocks to update, assuring smooth video frame animation.

Detecting and Locating Object Tags and Surface Planes

Figure 9:
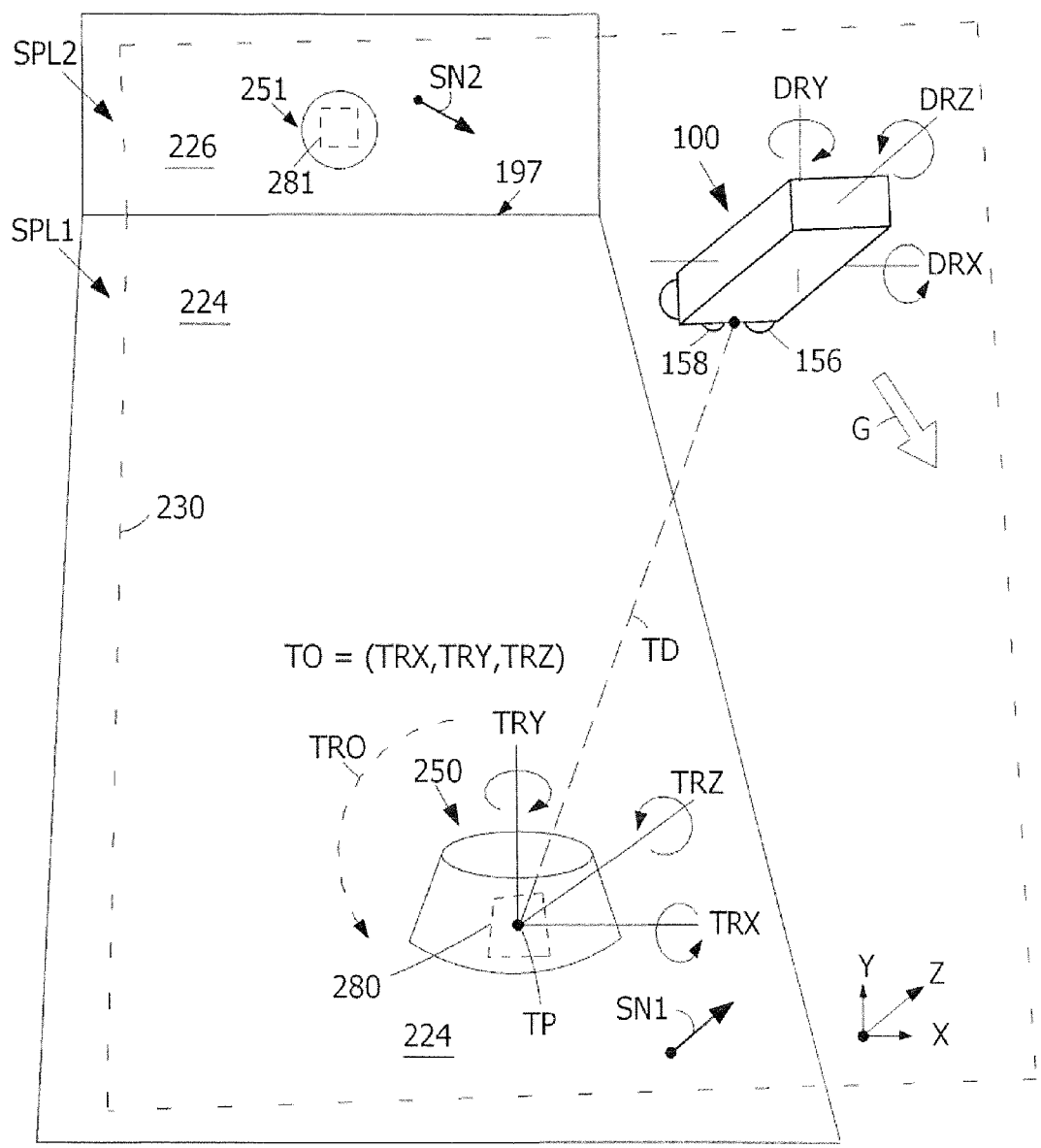
FIG. 9 is a perspective view of the projecting device of FIG. 1, where the device captures a view frame of an object tag affixed to a physical object.

Turning now to FIG. 9, a perspective view is presented of the handheld projecting device 100 (with no user shown), operable to detect, identify, and determine the orientation of the nearby object tag 280 affixed to the physical object 250 (of a 2D wall picture of a dog food dish). The physical object 250 (e.g., with stick-on adhesive backing) may be located on a remote surface 224, such as a wall.

In an example tag sensing operation, device 100 may optionally activate the light emitter 158, which illuminates surface 224 with infrared light. Whereupon, the infrared image sensor 156 captures one or more view frames of a view region 230 within the environment. Using computer vision analysis (e.g., segmentation, barcode recognition, etc.), the device 100 may detect and identify the optical machine-readable tag 280 within the captured view frame of the view region 230.

As illustrated, the tag 280 appears in perspective (with a distorted shape) in view region 230. Whereby, using computer vision techniques (e.g., camera pose estimation, homography, projective geometry, etc.), the projecting device 100 computes a tag position TP and a tag distance TD in 3D space relative to the device 100. The projecting device 100 further observes a tag rotation angle TRO and determines a tag orientation comprised of tag rotational orientations TRX, TRY, and TRZ in 3D space relative to the device 100.

The reader may note that the object tag 280, remote surface 224, and physical object 250 substantially reside (or lay flat) on a common geometric plane. As a result, the device 100 may create and determine a position and orientation of a surface plane SPL1, where the object tag 280 resides on the surface plane SPL1 with a surface normal vector SN1. In this case, the surface plane SPL1 represents the remote surface 224.

Moreover, a plurality of surface planes may be generated. Understandably, for each detected object tag, the device can generate a surface plane that coincides with the position and orientation of each object tag. For example, the device 100 may further observe within its captured view frame of view region 230 an object tag 281 affixed to a physical object 251 located on a remote surface 226. Wherein, the device 100 generates a surface plane SPL2 comprised of a surface normal vector SN2, where surface plane SPL2 represents remote surface 226.

Subsequently, the device 100 may use geometric methods (e.g., projective geometry, etc.) to combine and intersect a plurality of surface planes, such as surface plane SPL1 with surface plane SPL2, to generate a 3D surface model that represents one or more remote surfaces 224 and 226. Boundaries of non-parallel surface planes SPL1 and SPL2 may be determined by extending the surface planes until the planes intersect, forming a surface edge 197. Hence, the device 100 can determine the position and orientation of surface edges in 3D space, thereby, determining the shape of surface planes SPL1 and SPL2.

The device 100 can also determine each type of surface plane and remote surface defined in 3D space, whether belonging to a floor, wall, or ceiling. The device 100 may utilize its motion sensor (e.g., a 3-axis accelerometer included with motion sensor 120 of FIG. 3) to determine the orientation of the device 100 relative to the always present vertical acceleration of gravity on earth. As a result, the device 100 can determine a device orientation comprised of pitch DRX, yaw DRY, and roll DRZ relative to the vertical acceleration of gravity (as denoted by arrow G). Whereby, since the projecting device 100 is aware of every surface plane's orientation relative to the device 100, the projecting device 100 can determine that surface plane SPL1 represents a wall remote surface 224, surface plane SPL2 represents a ceiling remote surface 226, and a horizontal surface plane below device 100 is a table top or floor remote surface (not shown).

Method for Detecting and Tracking Object Tags

Figure 10:
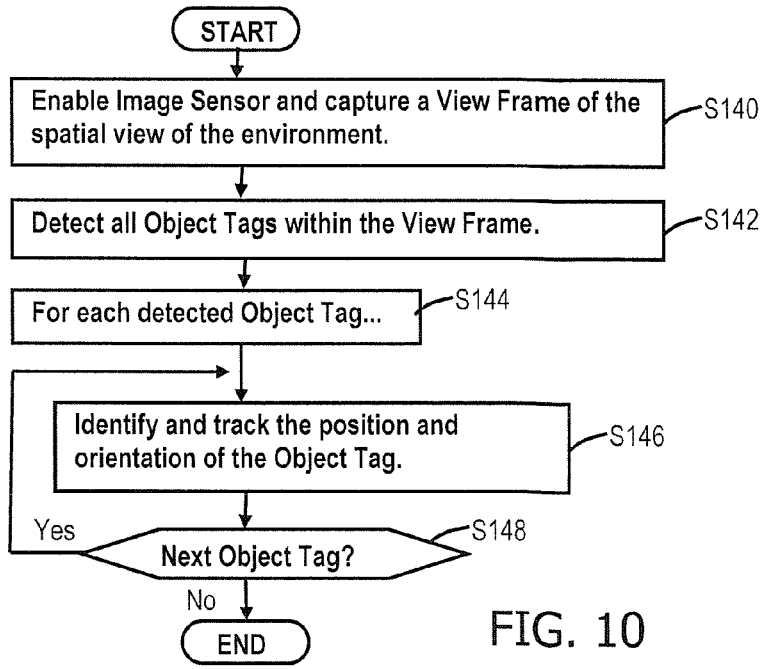
FIG. 10 is a flowchart of a computer readable method of the projecting device of FIG. 1, wherein the method detects and identifies object tags.

Turning to FIG. 10, a flowchart of a computer implemented method for detecting and tracking object tags is presented, although alternative methods may also be considered. The method may be implemented, for example, in the object tracker (reference numeral 132 of FIG. 3) and executed by at least one control unit (reference numeral 110 of FIG. 3). The method may be continually invoked (e.g., every 1/30 second) by a high-level method (such as step S104 of FIG. 8).

Beginning with step S140, the control unit enables the image sensor (reference numeral 156 of FIG. 3), while optionally activating the light emitter (reference numeral 158 of FIG. 3), to capture at least one view frame of the spatial view of potentially one or more object tags located in the environment.

Then in step S142, using computer vision techniques (e.g., segmentation, pattern recognition, etc.), the control unit analyzes the at least one view frame and may detect one or more object tags in the view frame.

In step S144, for each detected object tag (from step S142), the control unit initially selects a first detected object tag to analyze.

In step S146, the control unit identifies the selected object tag by reading its optical machine-readable pattern that represents data, such as a 1D or 2D barcode. Computer vision methods (e.g., image-based barcode reader, etc.) may be used to read the object tag to retrieve a tag ID of binary data, such as tag ID="123". In addition, the control unit determines the spatial position and orientation of the tag in 3D space (such as a 6-tuple having three positional coordinates and three rotational angles in x-y-z space) relative to the projecting device. Such a computation may be made using computer vision techniques (e.g., camera pose estimation, homography, projective geometry, etc.) adapted from current art. The control unit may further reduce spatial data noise (or jitter) by, for example, by computing a moving average of the position and orientation of object tags continually collected in real-time. The detected tag information (e.g., tag ID, position, orientation, etc.) is then stored in data storage (reference 140 of FIG. 3) for future reference.

Finally, in step S148, if there are any more detected object tags to identify, the control unit selects the next detected object tag, and the method returns to step S146. Otherwise the method ends.

Method for Creating Surface Planes and a 3D Surface Model

Figure 11:
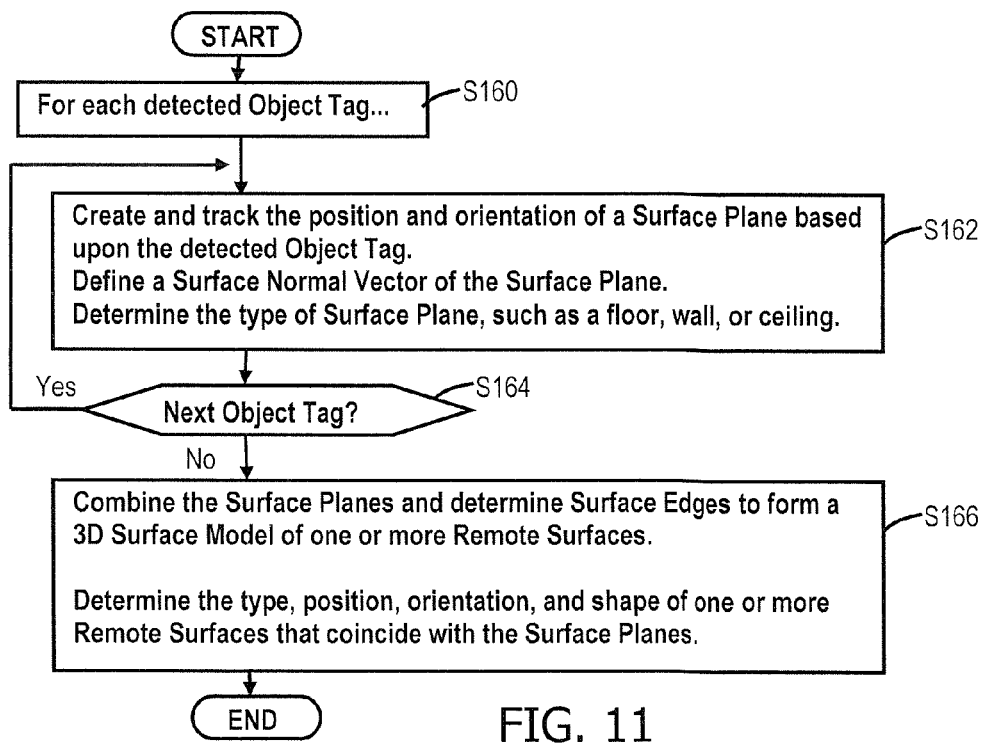
FIG. 11 is a flowchart of a computer readable method of the projecting device of FIG. 1, wherein the method creates surface planes and a 3D surface model.

Turning to FIG. 11, a flowchart of a computer implemented method for creating surface planes and a 3D surface model is presented, although alternative methods may also be considered. The method may be implemented, for example, in the object tracker (reference numeral 132 of FIG. 3) and executed by at least one control unit (reference numeral 110 of FIG. 3). The method may be continually invoked (e.g., every 1/30 second) by a high-level method (such as step S105 of FIG. 8).

Starting with step S160, for each detected object tag (as determined by the method of FIG. 10), the control unit initially selects a first detected object tag to analyze.

In step S162, the control unit generates a geometrical surface plane that coincides with the position and orientation of the detected object tag (as if the object tag lays flat on the surface plane). Moreover, the surface plane's orientation in 3D space may be defined with a surface normal vector. The surface plane is stored in data storage (reference numeral 140 of FIG. 3) for future reference.

The control unit can also determine the type of surface plane defined in 3D space, whether belonging to a floor, wall, or ceiling. The control unit can accomplish this by, but not limited to, the following steps: 1) determine the orientation of a surface plane relative to the projecting device; 2) read the motion sensor (e.g., a 3-axis accelerometer) and determine the orientation of the projecting device relative to the downward acceleration of gravity; and 3) transform the device orientation and surface plane orientation to determine the type of surface plane, such as a floor-, wall-, or ceiling-surface plane.

Then in step S164, if there are any more detected object tags to analyze, the control unit selects the next detected object tag, and the method returns to step S162. Otherwise the method continues to step S166.

In step S166, the control unit analyzes the generated surface planes (from steps S160-164) for redundancy. As can be surmised, a surface plane exists for each detected object tag. So the control unit may ignore or remove any surface plane that substantially coincides with another surface plane, since these are redundant.

The control unit then combines the remaining surface planes to form a 3D surface model, which represents the surrounding 3D space of one or more remote surfaces, such as walls, a floor, a ceiling, and/or a table top. Geometric functions (e.g., projective geometry, etc.) may be utilized to combine the surface planes to form a three-dimensional model of the environment. Whereby, non-parallel surface planes will converge and intersect, forming a surface edge, such as where a wall surface meets a ceiling surface. The surface edges define the shape or boundaries of one or more surface planes. Hence, the control unit can determine the 3D position and orientation of one or more surface edges of remote surfaces and, thereby, determine the shape of one or more surface planes in 3D space. The control unit then stores the 3D surface model, surface planes, and surface edges in data storage (reference numeral 140 of FIG. 3) for future reference.

Since the computed 3D surface model of surface planes represents one or more remote surfaces in an environment, the control unit can determine the type, position, orientation, and shape of one or more remote surfaces in the user's environment.

Creating a Projection Region for Video Objects

Figure 12:
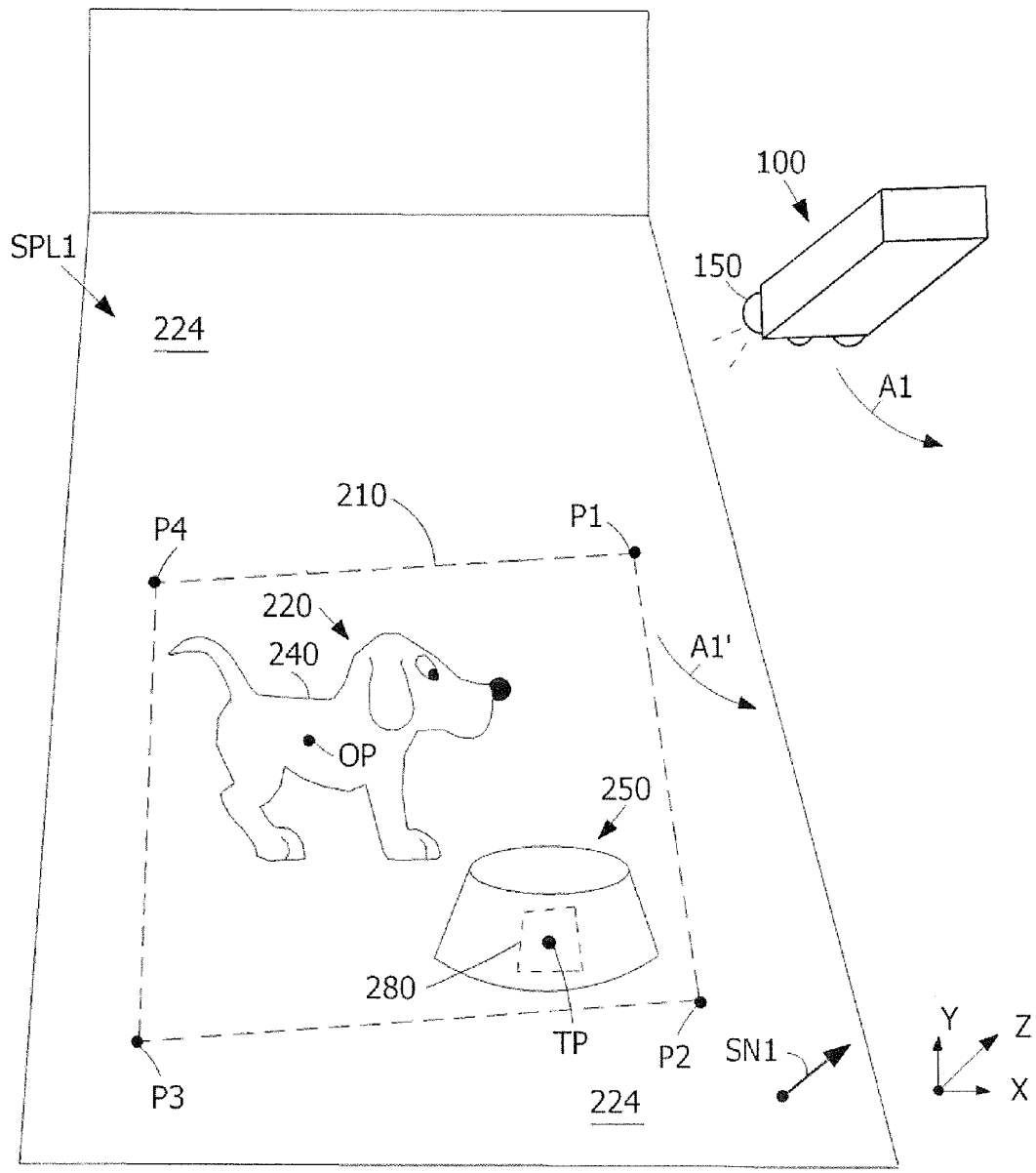
FIG. 12 is a perspective view of the projecting device of FIG. 1, where the device determines a projection region and projects a video object.

Turning now to FIG. 12, thereshown is device 100 projecting a visible image 220 comprised of a video object 240 (of a playful dog), included within a projection region 210. The defined projection region 210 (surrounded by dashed lines) is the computed geometrical region on which light would fall if device 100 were projecting a full-sized image from projector 150. Moreover, the device 100 has already pre-computed the position and orientation of the object tag 280, surface plane SPL1, and the surface normal vector SN1 relative to device 100 (as described by FIG. 9). Also, the image projector 150 has a predetermined horizontal light projection angle (as shown earlier in FIG. 4A, reference numeral PA) and a predetermined vertical light projection angle (not shown).

Hence, the device 100 can pre-compute (e.g., prior to video frame projection) the 3D position, orientation, and shape of the projection region 210 using input parameters that may include, but not limited to, the predetermined light projection angles and the position and orientation of one or more surface planes relative to device 100. As shown, the device 100 computes the 3D positions of perimeter points P1-P4 of projection region 210 residing on surface plane SPL1 and remote surface 224.

Moreover, the device 100 can determine a video object position OP and illuminate at least one video object 240 (such as the playful dog) based upon the video object position OP located on the surface plane SPL1 and remote surface 224.

Computing a Velocity of Projection Region, Video Objects, and Physical Objects

Continuing with FIG. 12, the device 100 is aware of the position, orientation, and velocity of video objects, physical objects, and remote surfaces in the environment. For example, the device 100 can determine the velocity (speed and direction) of the projection region 210 and one or more video objects 240 moving across at least one remote surface 224. When a user moves the device 100 (as denoted by arrow A1), the device may continually compute (e.g., every 1/30 second) the position of the projection region 210 and video object position OP, while storing in data storage a history of positions. Whereby, previously recorded positions may be integrated over time such that a projection region velocity (as denoted by arrow A1') and video object velocity in 3D space can be computed.

Moreover, the device 100 may further compute the position, orientation, and velocity of one or more physical objects, such as physical object 250. Since the device 100 can identify and determine the position, orientation, and velocity of one or more object tags 280, the device can further identify and determine the position and orientation of one or more physical objects 250 associated with the object tag 280.

So turning briefly to FIG. 16A, shown is an example data table that represents an instance of video object data (reference numeral 145 of FIG. 3) of a dog with some attributes, such as object ID, position, orientation, shape, size, velocity, etc. in reference numerals D100-D107.

Then in FIG. 16B, shown is an example data table that represents an instance of physical object data (reference numeral 145 of FIG. 3) of a food dish with some attributes, such as object ID, position, orientation, shape, size, velocity, etc. in reference numerals D140-D147.

Method for Creating and Tracking a Projection Region

Figure 13:
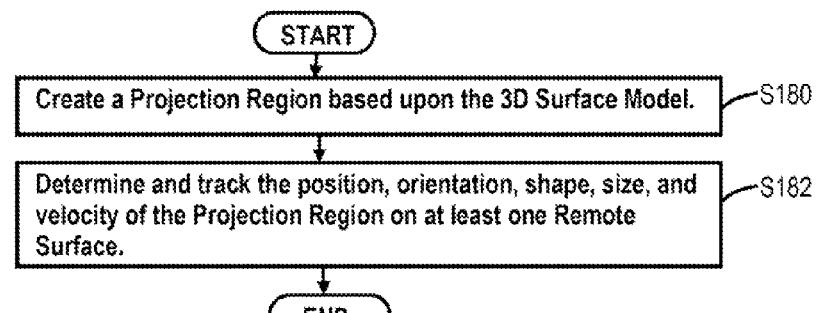
FIG. 13 is a flowchart of a computer readable method of the projecting device of FIG. 1, wherein the method creates a projection region.

FIG. 13 shows a flowchart of a computer implemented method for creating and tracking a projection region is presented, although alternative methods may also be considered. The method may be implemented, for example, in the object tracker (reference numeral 132 of FIG. 3) and executed by at least one control unit (reference numeral 110 of FIG. 3). The method may be continually invoked (e.g., every 1/30 second) by a high-level method (such as step S106 of FIG. 8).

Beginning with step S180, the control unit determines a geometric projection region (e.g., position, orientation, shape, and size) for a full-sized projected image that coincides on the 3D surface model (as created earlier in FIG. 11, step S166). Such a computation relies on projection region parameters (e.g., light projection angles, orientation of remote surfaces, etc. as discussed earlier in FIG. 12) and utilizes geometric functions (e.g., projective geometry, etc.) adapted from current art.

Then in step S182, the control unit takes previously recorded projection region data (e.g., in the past one second) and integrates over time such that a projection region velocity in 3D space is determined. The device's motion sensor (reference numeral 120 of FIG. 3) may further augment computation of velocity. Thus, the control unit computes and tracks the position, orientation, shape, size, and velocity of the projection region in 3D space and stores the projection region data in data storage (reference numeral 140 of FIG. 3) for future reference.

Method for Identifying and Tracking the Physical Objects

Figure 14:
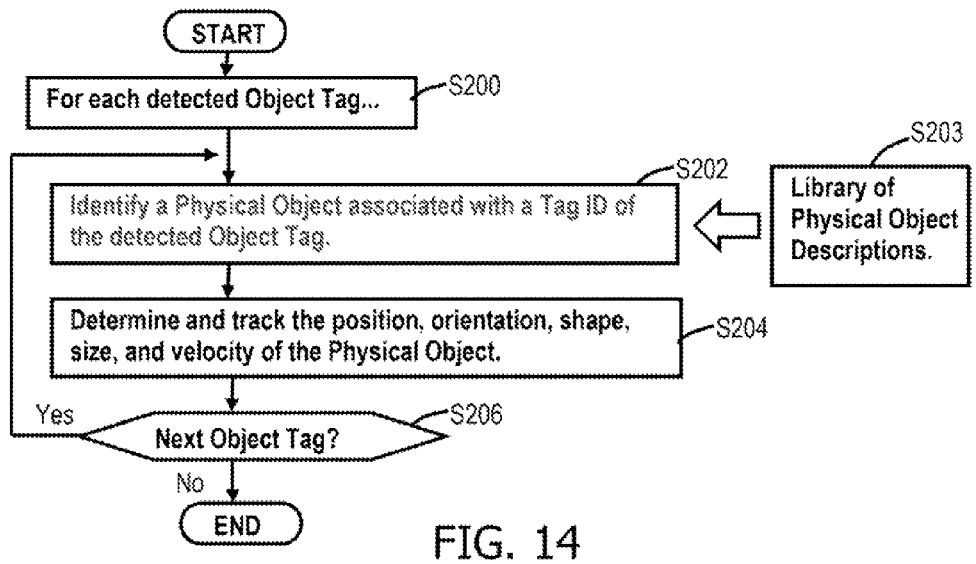
FIG. 14 is a flowchart of a computer readable method of the projecting device of FIG. 1, wherein the method identifies and tracks physical objects.

Turning to FIG. 14, a flowchart of a computer implemented method for identifying and tracking physical objects is presented, although alternative methods may also be considered. The method may be implemented, for example, in the object tracker (reference numeral 132 of FIG. 3) and executed by at least one control unit (reference numeral 110 of FIG. 3). The method may be continually invoked (e.g., every 1/30 second) by a high-level method (such as step S108 of FIG. 8).

Beginning with step S200, for each detected object tag (as determined by the method of FIG. 10), the control unit initially selects a first detected object tag to analyze.

In step S202, the control unit retrieves a detected tag ID, which was previously stored in data storage (reference numeral 140 of FIG. 3). For example, the tag ID may read "123". Whereupon, the control unit searches for a matching tag ID in the library of physical object descriptions (reference numeral 127 of FIG. 3), as shown by step S203. If a match is found, the control unit transforms the associated physical object description and generates an instance of physical object data (reference numeral 145 of FIG. 3) that represents the real-world physical object.

Thus, in step S204, the control unit can determine and track the position, orientation, shape, size, and velocity of the physical object; wherein, the control unit stores such information in the physical object data (reference numeral 145 of FIG. 3). For example, the shape may be determined by taking the associated object description (from step S202) and retrieving the predetermined shape coordinates of the physical object.

Finally, in step S206, if there are any more detected object tags to analyze, the control unit selects a next detected object tag, and the method returns to step S202. Otherwise the method ends.

Determining when Objects can Interact and Connect

Figure 15:
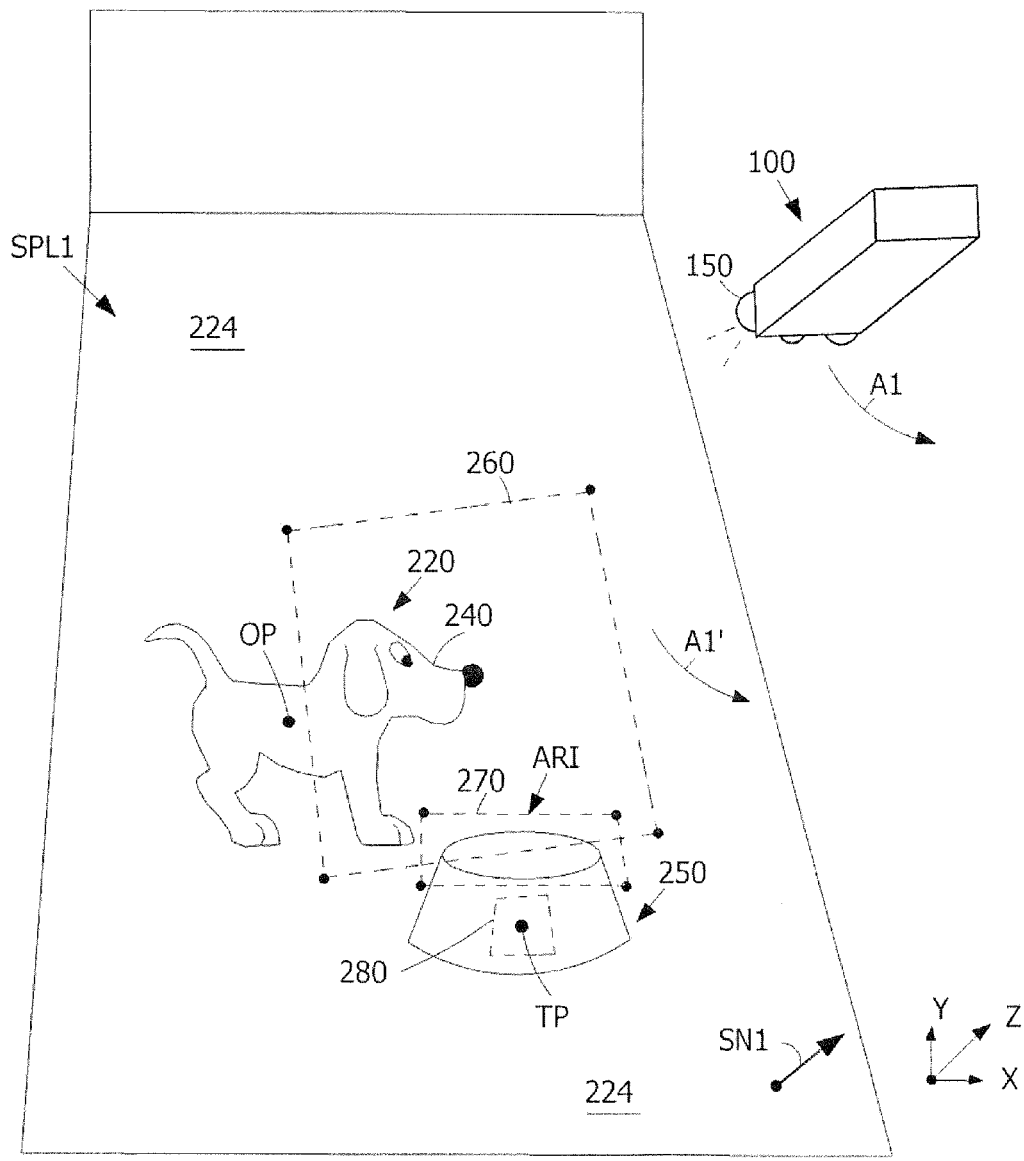
FIG. 15 is a perspective view of the projecting device of FIG. 1, where the device defines action regions for object interactivity.

Turning now to FIG. 15, a perspective view is presented where the device 100 is operable to determine if a visible image 220 comprised of one or more video objects 240 (such as a dog) can interact with at least one physical object 250 (such as a food dish). The device 100 may rely on a library of object actions (reference numeral 129 of FIG. 3) that define the conditions for interactive behavior between objects.

So turning briefly to FIG. 16A, shown is an example data table that represents an instance of object data (reference numeral 145 of FIG. 3) that defines a video object (of a dog), including its object action description. Correspondingly, shown in FIG. 16B is an example data table that represents another instance of object data (reference numeral 145 of FIG. 3) that defines a physical object (of a food dish), including its object action description.

So turning back to FIG. 15, in an example of interactive operation, the device 100 searches in the object actions library for the video object 240 of a dog and available request actions (in FIG. 16A). The device finds a request action for "WANTS FOOD" to eat (in reference numeral D116 in FIG. 16A). The request action further defines spatial coordinates (in reference numeral D118 in FIG. 16A) for a request action region 260 that are mapped to the surface plane SPL1.

Next, the device 100 searches in the object actions library for the physical object 250 of a food dish and available response actions (in FIG. 16B). If the device 100 finds an available response action of "has food" to eat (in reference numeral D152 of FIG. 16B), the action response further defines spatial coordinates (in reference numeral D154 of FIG. 16B) for a response action region 270 that are mapped to the surface plane SPL1.

Next, the device 100 determines if object interactivity should occur by determining if the request action region 260 and response action region 270 overlap using a collision detect method (e.g., 2D polygon overlap detection, etc.). In this case, as illustrated, there exists an action collision region ARI where the action regions 260 and 270 overlap. Whereby, the device 100 enables interactivity to occur between the video object 240 and physical object 250.

In cases where the action regions 260 and 270 do not overlap, no interaction would occur, as when the video object 240 (of a dog) is located too far away from the physical object 250 (of a food dish). In more sophisticated interactions between objects 240 and 250, additional action conditions may be analyzed, such as determining if the video object 240 has the correct position, orientation, velocity, color, shape, and/or size before the video object 240 and physical object 250 can interact.

Understandably, in alternative embodiments, a plurality of action types, action regions, and action conditions may be defined for a physical object. This allows the device 100 to simulate interaction with real-world objects with various effects. For example, an alternative physical object 250 may simulate a combined food and water dish (e.g., two bowls side by side), where two action regions are defined: a "food" action region; and juxtaposed, a "water" action region. Then during operation, the device maps both the food and water action regions relative to physical object 250 on at least one remote surface 224. Hence, the dog video object 240 can interact and connect to the combined food and water dish in different ways, either eating food or drinking water, depending on the position and orientation of the dog video object 240 relative to the physical object 250. Whereby, the device 100 may project an image of the dog video object 240 eating or drinking from the physical object 250. The device 100 may further generate sound and haptic effects of the eating or drinking dog video object 240.

Connecting Video Objects to Physical Objects

Figure 17:
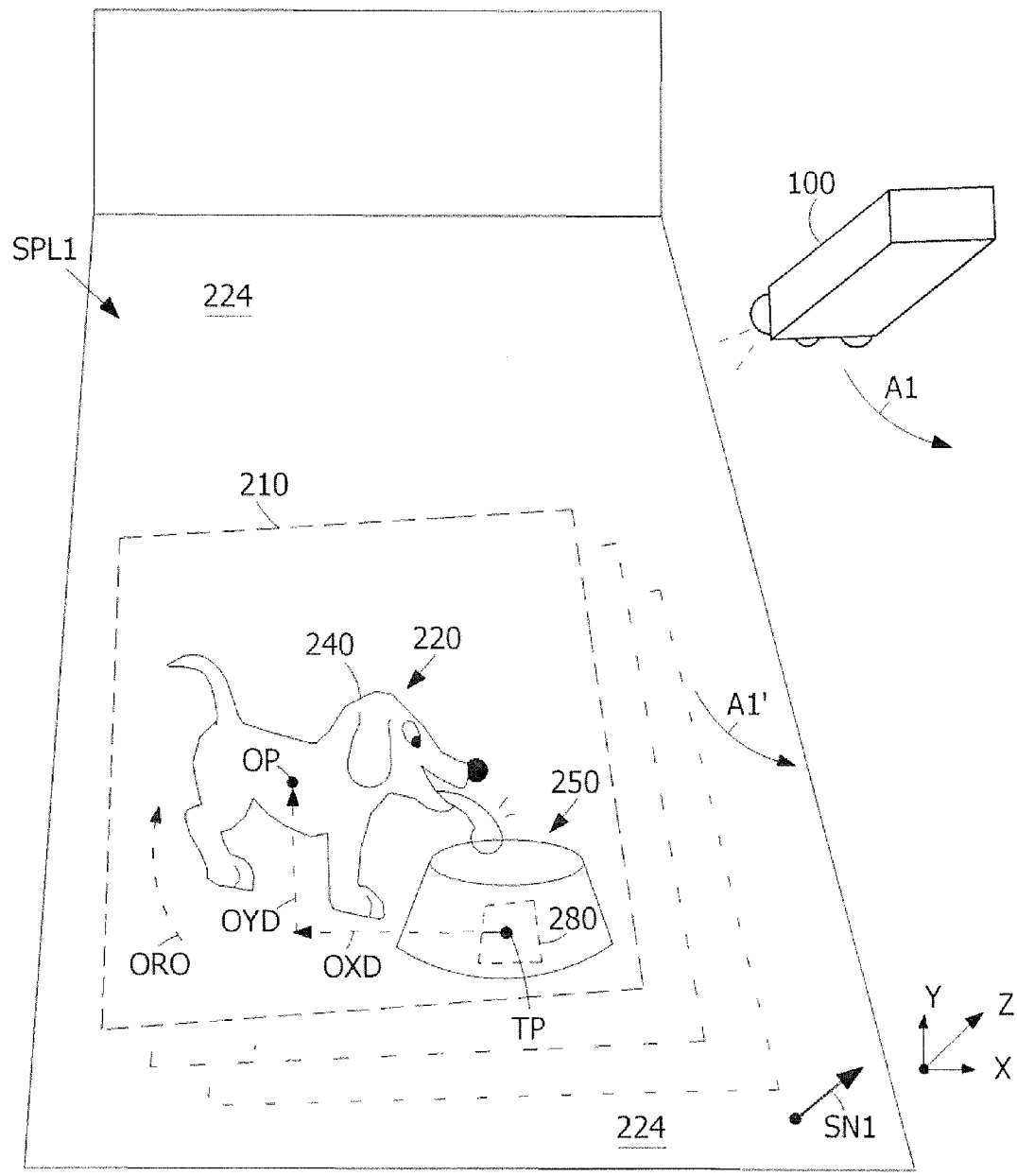
FIG. 17 is a perspective view of the projecting device of FIG. 1, where the device has connected a dog video object to a dish physical object.

Turning now to a perspective view in FIG. 17, the projecting device 100 may connect one or more video objects based upon interactivity with at least one other object. The device 100 may rely on a library of object actions (reference numeral 129 of FIG. 3) that enable objects to interact and connect.

For example, the device 100 may connect one or more video objects 240 (of a dog) to at least one physical object 250 (of a food dish). To designate a connection, the video object 240 and physical object 250 may form an association in data storage (e.g., reference numerals D110-D114 of FIG. 16A). Once connected, device 100 may then modify a visible image 220 comprised of one more video objects 240 such that the one or more video objects 240 appear to substantially remain in the vicinity of at least one physical object 250 (such as food dish). That is, while device 100 and projection region 210 may be moved in 3D space (as denoted by arrows A1 and A1'), the one or more video objects 240 appear to substantially remain in the vicinity of at least one physical object 250.

In an example operation of connecting objects, device 100 may connect the video object 240 to the physical object 250 by completing, but not limited to, the following operations: detecting the object tag 280 on the physical object 250, determining the object tag position TP and tag orientation, identifying the tag and related physical object 250, retrieving from memory the video object displacement offset OXD and OYD and the object rotational offset relative to tag 280, adjusting the video object position OP and the video object orientation ORO relative to tag 280, graphically rendering a video frame of the video object 240 at video object position OP and video object orientation ORO, and projecting the video frame as a visible image 220 comprised of the video object 240 such that the video object 240 appears to substantially remain in the vicinity of the physical object 250.

Interactive Video Objects and Physical Objects

Continuing with FIG. 17, the projecting device 100 may present to a user (not shown) some multimedia effects for one or more video objects based upon interactivity with at least one other object. The device 100 may rely on a library of object actions (reference numeral 129 of FIG. 3) that enable the device 100 to generate multimedia effects such that the objects appear to interact and connect.

The device 100 may modify the visible image 220 comprised of one or more video objects 240 such that the one or more video objects 240 appear to interact with at least one physical object 250. The device 100 may modify the visible image 220 comprised of one or more video objects 240 such that the one or more video objects 240 appear to adapt to the position, orientation, shape, and size of at least one physical object 250. The device 100 may modify the visible image 220 comprised of one or more video objects 240 such that the one or more video objects 240 appear to remain substantially in the vicinity of at least one physical object 250. For example in operation, the device 100 animates the visible image 220 comprised of the video object 240 of a dog eating from the physical object 250 of a food dish (e.g., as defined by an object action, reference numeral D124 of FIG. 16A).

Also, the device 100 may generate or modify a sound effect such that the sound effect adapts to the position and orientation of one or more video objects 240 relative to at least one physical object 250. For example in operation, the device 100 generates a "crunching" sound (e.g., as defined by an object action, reference numeral D126 of FIG. 16A) that is audible to a user.

Also, the device 100 may generate or modify a haptic effect such that the haptic effect adapts to the position and orientation of one or more video objects 240 relative to at least one physical object 250. For example in operation, the device 100 generates a haptic vibration (e.g., as defined by an object action, reference numeral D128 of FIG. 16A) that may be sensed by a user holding the device 100.

Method for Determining when Objects can Interact

Figure 18:
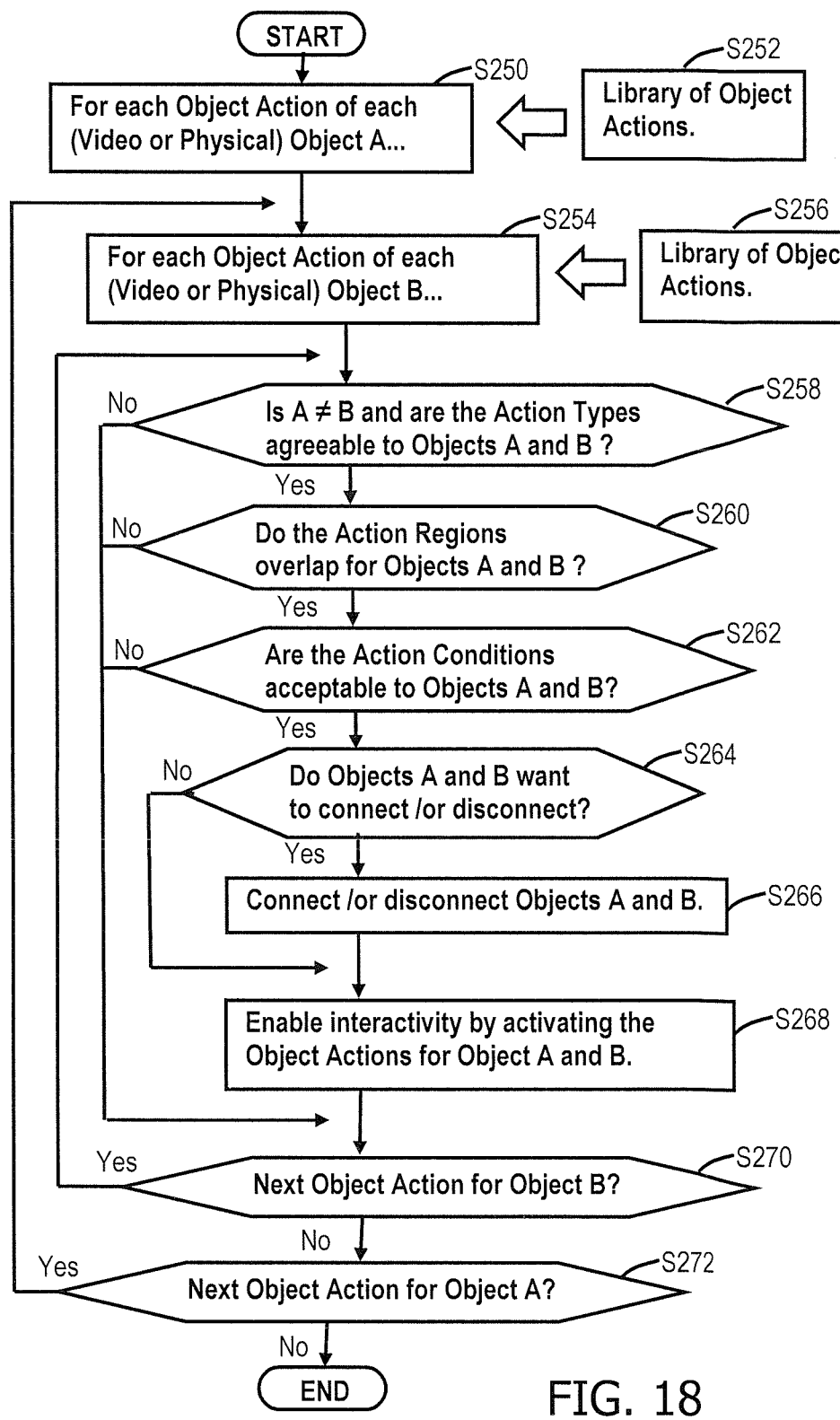
FIG. 18 is a flowchart of a computer readable method of the projecting device of FIG. 1, where the method detects action conditions for object interactivity to occur.

Turning to FIG. 18, a flowchart of a computer implemented method for determining when video objects and physical objects can interact is presented, although alternative methods may also be considered. The method may be implemented, for example, in the object connector (reference numeral 133 of FIG. 3) and executed by at least one control unit (reference numeral 110 of FIG. 3). The method may be continually invoked (e.g., every 1/30 second) by a high-level method (such as step S112 of FIG. 8).

Beginning with step S250, for each object action for each object A defined in object data (reference numeral 145 of FIG. 3), the control unit initially selects a first object action of object A to analyze. Object A may be a video object or a physical object. The control unit may retrieve an object action from the library of object actions (reference numeral 129 of FIG. 3) from step S252.

Then in step S254, for each object action for each object B defined in object data (reference numeral 145 of FIG. 3), the control unit initially selects a first object action of object B to analyze. Object B may be a video object or a physical object. The control unit may retrieve an object action from the library of object actions (reference numeral 129 of FIG. 3) from step S256.

In step S258, if the control unit determines that object A is not object B and the action types are agreeable to objects A and B, then continue to step S260. Otherwise, the method skips to step S270. For example, to determine if action types of objects A and B are agreeable, the control unit may compare the action types in data storage (e.g., reference numerals D116 and D152 of FIGS. 16A-16B).

In step S260, if the control unit determines the action regions overlap for objects A and B, then continue to step S262. Otherwise, the method skips to step S270. For example, to determine if action regions overlap for objects A and B, the control unit may construct action regions in 3D space (as discussed in FIG. 15) and determine if the regions overlap. Action region overlap may be determined using a collision detect method (e.g., 2D polygon overlap detection, etc.).

In step S262, if the control unit determines that the action conditions are acceptable for objects A and B, then continue to step S264. Otherwise, the method skips to step S270. For example, to determine if action conditions are acceptable for objects A and B, the control unit may analyze the current attributes of objects A and B, such as position, orientation, velocity, color, shape, and/or size.

In step S264, if the control unit determines that objects A and B want to connect/or disconnect, then continue to step S266. Otherwise, the method skips to step S268.

In step S266, the control unit connects/or disconnects object A and B. For example, to connect object A and B, the control unit may associate object A and B in data storage (e.g., reference numeral D112 of FIG. 16A).

Then in step S268, the control unit enables interactivity by activating the object action of object A and the object action of object B. For example, to activate an object action, the control unit may activate object actions in data storage (e.g., reference numerals D110 and D114 of FIG. 16A). In some embodiments, the control unit may execute computer-readable instructions to process the object actions. In other embodiments, the control unit may queue action events for future processing.

In step S270, if there are any more object actions for each object B to analyze, the control unit selects a next object action for each object B, and the method returns to step S258. Otherwise the method continues to step S272.

Finally, in step S272, if there are any more object actions for each object A to analyze, the control unit selects a next object action for each object A, and the method returns to step S254. Otherwise the method ends.

Method for Modifying and Tracking the Video Objects

Figure 19:
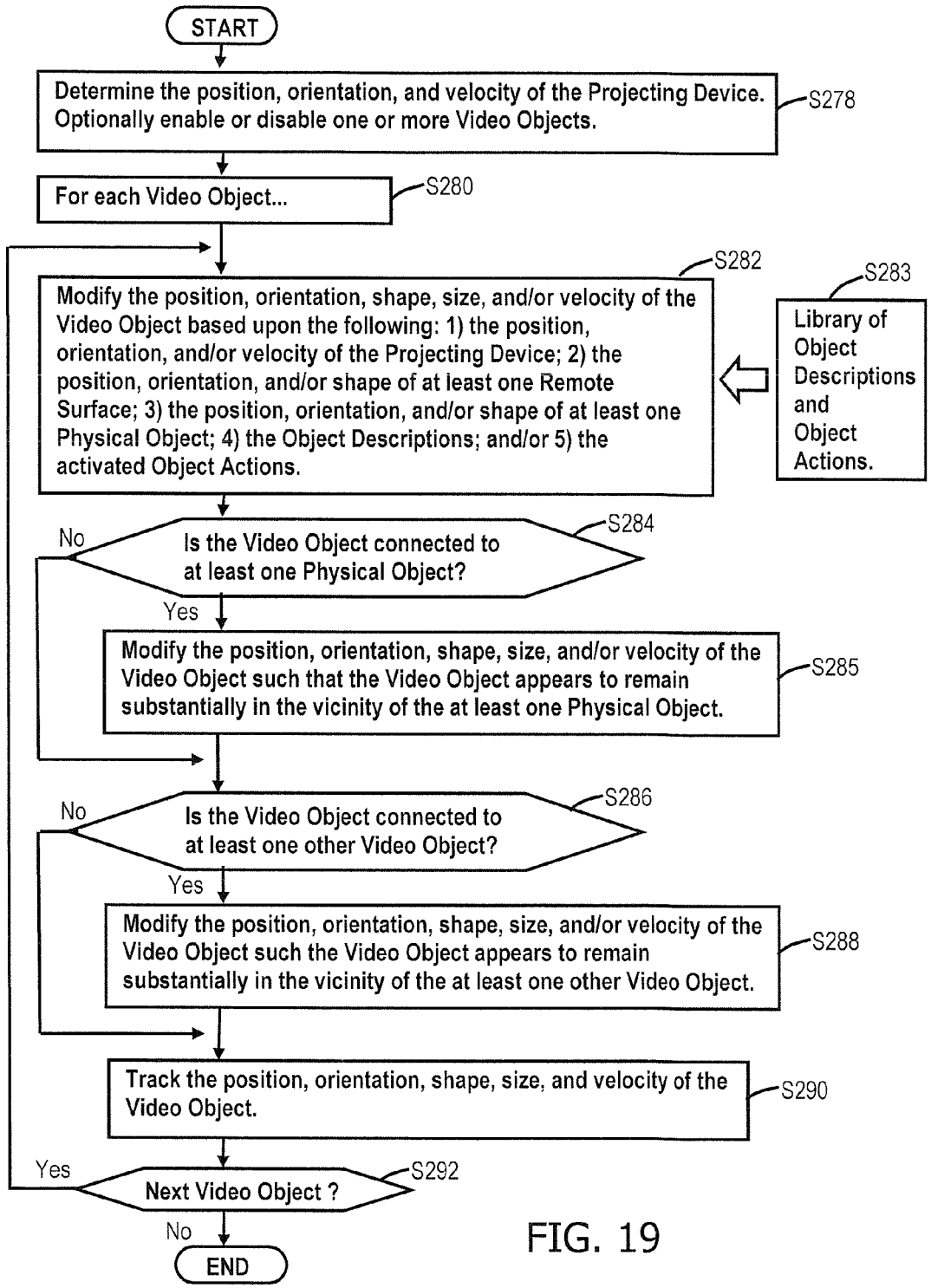
FIG. 19 is a flowchart of a computer readable method of the projecting device of FIG. 1, where the method modifies and tracks one or more video objects.

Turning to FIG. 19, a flowchart of a computer implemented method for modifying and tracking video objects is presented, although alternative methods may also be considered. The method may be implemented, for example, in the object tracker (reference numeral 132 of FIG. 3) and application (reference numeral 138 of FIG. 3), executed by at least one control unit (reference numeral 110 of FIG. 3). The method may be continually invoked (e.g., every 1/30 second) by a high-level method (such as step S116 of FIG. 8).

Beginning with step S278, the control unit can determine the position, orientation, and velocity of the projecting device in 3D space. This may be accomplished by transforming the collected motion data (from step S102 of FIG. 8) from the motion sensor (reference 120 of FIG. 3) into spatial information, such as position, velocity, orientation, etc. using spatial tracking techniques adapted from current art.

As an optional operation, dependent on the application, the control unit may create instances of one or more video objects in memory by the following: retrieving data from a library of video object descriptions (reference numeral 127 of FIG. 3); and creating an instance of video object data (reference numeral 145 of FIG. 3) comprised of, but not limited to, a video object ID, position, orientation, shape, size, velocity, etc.

As an optional operation, dependent on the application, the control unit may also remove unneeded instances of one or more video objects from object data (reference numeral 145 of FIG. 3), such as when a video object is no longer required for projected display.

Then continuing in step S280, for each video object defined in object data (reference numeral 145 of FIG. 3), the control unit initially selects a first video object to analyze.

In step S282, depending on the application, the control unit modifies the position, orientation, shape, size, and/or velocity of the Video Object based upon, but not limited to, the following: 1) the position, orientation, and/or velocity of the projecting device; 2) the position, orientation, and/or shape of at least one remote surface; 3) the position, orientation, and/or shape of at least one physical object; 4) the object descriptions; and/or 5) the activated object actions.

For item 1) above, the control unit may analyze the device's motion data (as created earlier in step S278 of FIG. 19). For item 2) above, the control unit may analyze remote surface data (as created earlier in step S166 of FIG. 11). For item 3) above, the control unit may analyze physical object data (as created earlier in step S204 in FIG. 14). For item 4) above, the control unit may analyze data from a library of object descriptions (reference numeral 127 of FIG. 3), shown by step S283. For item 5) above, the control unit may analyze the activated object actions (as established earlier by step S268 of FIG. 18) from a library of object actions (reference numeral 129 of FIG. 3), shown by step S283.

In step S284, if the control unit determines that the video object is connected to at least one physical object, then continue to step S285. Otherwise, the method skips to step S286.

In step S285, depending on the application, the control unit modifies the position, orientation, shape, size, and/or velocity of the video object such that the video object appears to remain substantially in the vicinity of the at least one physical object. Moreover, the control unit may further modify the position, orientation, shape, size, and/or velocity of the video object such that the video object appears to remain substantially affixed to the at least one physical object.

In step S286, if the control unit determines that the video object is connected to at least one other video object, then the method continues to step S288. Otherwise, the method skips to step S290.

In step S288, depending on the application, the control unit modifies the position, orientation, shape, size, and/or velocity of the video object such that the video object appears to substantially remain in the vicinity of the at least one other video object. Moreover, the control unit may further modify the position, orientation, shape, size, and/or velocity of the video object such that the video object appears to remain substantially affixed to the at least one other video object.

Then in step S290, the control unit determines and tracks, but not limited to, the position, orientation, shape, size, and velocity of the video object, storing such data in object tracking data (reference numeral 146 of FIG. 3).

Finally, in step S292, if there are any more video objects to analyze, the control unit selects a next video object defined in object data (reference numeral 145 of FIG. 3), and the method returns to step S282. Otherwise the method ends.

Projection of Video Objects with Reduced Distortion

Turning briefly back to FIG. 17, the device 100 may generate graphic, sound, and haptic effects based upon a visible image 220 comprised of one or more video objects 240. In addition, the device 100 may be operable to substantially reduce distortion of the visible image 220 comprised of one or more video objects 240 (such as a dog) in the vicinity of at least one physical object 250 (such as a food dish).

For example, the non-visible outline of the projection region 210 (as denoted by dashed lines) shows keystone or wedge-like distortion on surface 224. Yet the device 100 can modify the visible image 220 comprised of one or more video objects 240 such that the one or more video objects 240 appear substantially undistorted and/or substantially uniformly lit in the vicinity of at least one physical object 250. Moreover, the device 100 can modify the visible image 220 comprised of one or more video objects such that the size of the one or more video objects 240 is based upon the size of at least one physical object 250 in the vicinity of the one or more video objects 240.

Method of Projection of Video Objects with Reduced Distortion

Figure 20:
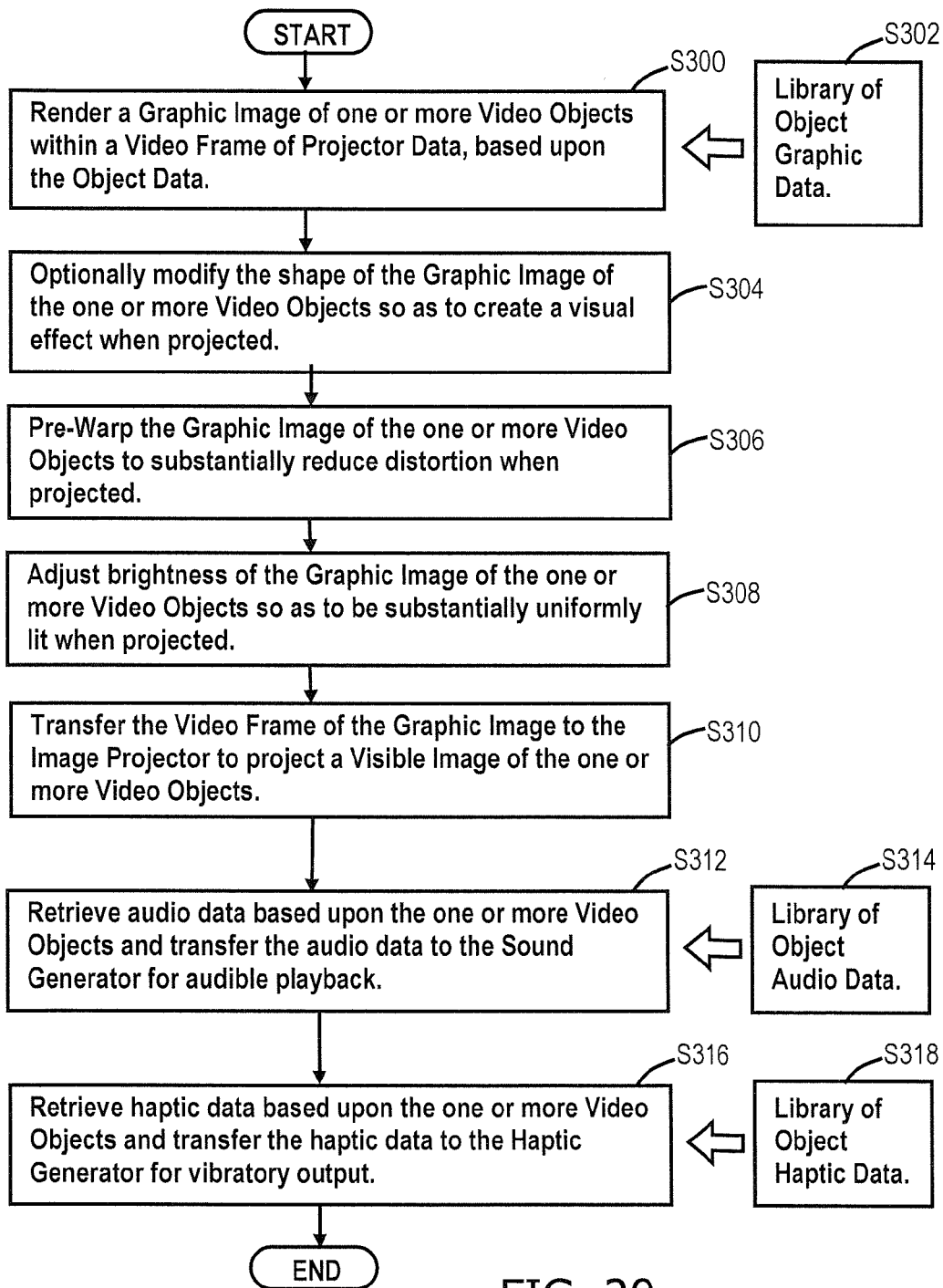
FIG. 20 is a flowchart of a computer readable method of the projecting device of FIG. 1, where the method generates graphic, sound, and haptic effects for one or more video objects.

Turning now to FIG. 20, a flowchart of a computer implemented method for generating graphic, sound, and haptic effects is presented. Moreover, the method generates a visible image comprised of one or more video objects with reduced distortion, although alternative methods may also be considered. The method may be implemented, for example, in the graphics engine (reference numeral 136 of FIG. 3) and application (reference numeral 138 of FIG. 3), executed by at least one control unit (reference numeral 110 of FIG. 3). The method may be continually invoked (e.g., every 1/30 second) by a high-level method (such as step S120 of FIG. 8) for video frame animation.

Beginning with step S300, the control unit creates an empty video frame located in projector data (reference numeral 142 of FIG. 3), in preparation for graphic rendering. To render one or more video objects, the control unit may retrieve object data (reference numeral 145 of FIG. 3) related to graphic rendering for each video object to be displayed. Object data attributes, such as video object position, orientation, shape, size, color, etc. may be used by the rendering process. The control unit retrieves graphic content (e.g., graphic object model, images, etc.) from a library of object graphic data (reference numeral 128 of FIG. 3), in step S302. Whereupon, the control unit renders a graphic image comprised of one or more video objects in the video frame.

In step S304, the control unit can optionally modify the shape of the graphic image comprised of one or more video objects such that the shape of the graphic image comprised of one or more video objects creates a visual effect when projected. For example, the control unit may modify the shape of the graphic image by clipping out a circular image and painting the background black to create a circular shaped visible image comprised of one or more video objects when projected (e.g., as shown by visible image 220 in FIG. 41), which simulates a round flashlight beam. Image shape modifying techniques (e.g., image clipping, paint fill, etc.) may be adapted from current art.

In step S306, to reduce image distortion, the control unit can pre-warp (or inverse warp) the graphic image comprised of one or more video objects such that the one or more video objects appear substantially undistorted when projected on at least one remote surface in the environment. Wherein, the control unit may pre-warp the image based upon the determined position and orientation of the at least one remote surface (as discussed in FIG. 9). Image distortion reduction functions (e.g., inverse coordinate transforms, homography, scaling, rotation, translation, etc.) may be adapted from current art.

In step S308, to assure undistorted image brightness, the control unit can modify the brightness of the graphic image comprised of one or more video objects such that the one or more video objects appear substantially uniformly lit when projected on at least one remote surface in the environment, substantially irrespective of the orientation of the at least one remote surface. The control unit may adjust the image brightness according to the position and orientation of the at least one remote surface (as discussed earlier in FIG. 9). Image brightness adjust techniques (e.g., RGB intensity adjustment of pixels, etc.) may be adapted from current art. For example, image pixel brightness may be boosted in proportion to surface distance squared to counter light intensity fall-off with distance. The following pseudo code may be used to adjust image brightness: where P is a pixel, and D is a spatial distance to the pixel P on at least one remote surface:

```
scalar = ( 1 / (maximum, distance to all pixels P) ² )
for each pixel P in the video frame...
    pixel brightness (P) = ( surface distance D to pixel P) ² x scalar x
    pixel brightness (P)
```

Then in step S310, the graphic effects are presented. The control unit transfers the graphic image comprised of the one or more video objects within the video frame to the image projector (reference numeral 150 of FIG. 3) to project a visible image comprised of one or more video objects on at least one remote surface.

Sound effects may be presented as well. In step S312, the control unit can retrieve audio data based upon the one or more video objects and transfer the audio data to the sound generator (reference numeral 112 of FIG. 3) for audible sound generation. Audio data (e.g., MP3 audio file) can be acquired from a library of object audio data (reference numeral 128 of FIG. 3), in step S314.

Haptic effects may be presented as well. In step S314, the control unit can retrieve haptic data based upon the one or more video objects and transfer the haptic data to the haptic generator (reference numeral 114 of FIG. 3) for vibratory output. Haptic data (e.g., wave data file) can be acquired from a library of object haptic data (reference numeral 128 of FIG. 3), in step S318. Whereupon, the method ends.

Whereby, in one aspect, a projecting device can modify a visible image comprised of one or more video objects such that the one or more video objects appear to adapt to the position, orientation, shape, and/or size of at least one physical object located on at least one remote surface.

A projecting device can modify a visible image comprised of one or more video objects such that the one or more video objects appear to adapt to the position, orientation, shape, and/or size of at least one remote surface.

A projecting device can modify a visible image comprised of one or more video objects such that the size of the one or more video objects is based upon the size of at least one physical object in the vicinity of the one or more video objects.

A projecting device can modify the shape of a visible image comprised of one or more video objects such that the shape of the visible image is substantially circular.

A projecting device can modify the shape of a visible image comprised of one or more video objects such that the shape of the visible image appears to adapt to the position, orientation, and/or shape of at least one remote surface.

A projecting device can modify a visible image comprised of one or more video objects such that the one or more video objects appear substantially uniformly lit in the vicinity of at least one physical object when the projecting device is projecting light onto the remote surface.

A projecting device can modify a visible image comprised of one or more video objects such that the one or more video objects appear substantially uniformly lit on at least one remote surface.

A projecting device can modify a visible image comprised of one or more video objects such that the one or more video objects appear substantially undistorted in the vicinity of at least one physical object.

A projecting device can modify a visible image comprised of one or more video objects such that the one or more video objects appear substantially undistorted on at least one remote surface.

Video Frames of Connecting Video Objects and Physical Objects

Turning now to FIGS. 21A-23D, thereshown are animated video frames of video objects that connect with physical objects and other video objects. As can be seen, time sequences of video frames of the visible image 220 is presented, as the visible image 220 is moved across a remote surface by the handheld projecting device 100. (For illustration purposes, all reference numerals are not denoted in each video frame.)

Example of a Video Object that Connects to a Physical Object

Figure 21A:
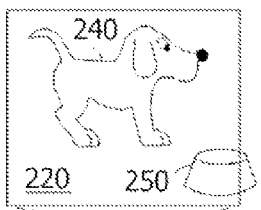
FIGS. 21A-21D are time-sequential, perspective views of the projecting device of FIG. 1, wherein a dog video object connects to a dish physical object.
Figure 21B:
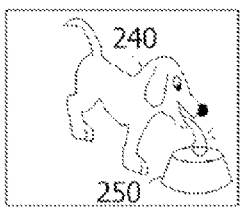
Figure 21C:
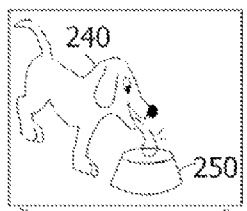
Figure 21D:
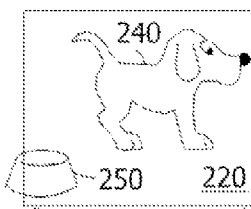

So turning specifically to FIGS. 21A-21D, the projecting device 100 is moved in a rightward direction relative to the physical object 250 in the environment. FIG. 21A shows the projected video object 240 (of a dog) located near the physical object 250 (of a dish). Then a few seconds later, FIG. 21B shows the video object 240 has been connected to the physical object 250 (where the dog is shown eating from the dish). A few seconds later, FIG. 21C, shows the objects 240 and 250 are still connected. Whereby, as the physical object 250 moves (relative to the device 100), the video object 240 substantially remains in the vicinity of the physical object 250. A few seconds later, FIG. 21D shows the video object 240 has disconnected from the physical object 250.

Whereby, in one aspect, a projecting device can determine the position and/or orientation of at least one physical object located on at least one remote surface, connect one or more video objects to the at least one physical object, and generate a visible image comprised of the one or more video objects such that the one or more video objects appear to remain substantially in the vicinity of the at least one physical object.

In another aspect, a projecting device can determine the position and/or orientation of at least one physical object located on at least one remote surface, connect one or more video objects to the at least one physical object, and generate a visible image comprised of the one or more video objects such that the one or more video objects appear to remain substantially affixed to the at least one physical object.

Example of a Video Object Already Connected to a Physical Object

Figure 22A:
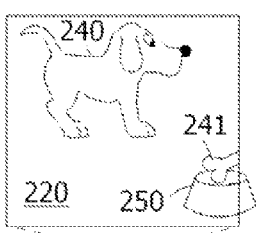
FIGS. 22A-22D are time-sequential, perspective views of the projecting device of FIG. 1, wherein a dog video object walks past a bone video object connected to a dish physical object.
Figure 22B:
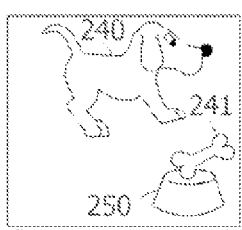
Figure 22C:
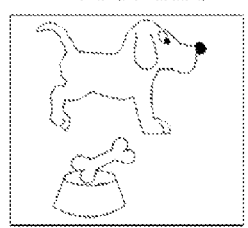
Figure 22D:
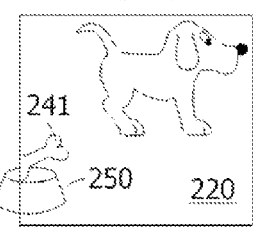

Turning now to FIGS. 22A-22D, the projecting device 100 is moved in a rightward direction relative to the physical object 250 in the environment. FIG. 22A shows a video object 240 (of a dog) located near a video object 241 (of a bone) that has been already connected to a physical object 250 (of a dish). Then a few seconds later, FIG. 22B shows the video object 241 (of the bone) still connected to the physical object 250, where the video object 241 (of a bone) substantially remains in the vicinity of the physical object 250 (of a dish). A few seconds later, FIG. 22C, shows the objects 240 and 250 are still connected. Finally, in FIG. 22D, as the physical object 250 moves outside of the visible image 220, the video object 240 remains connected to the physical object 250 but no longer displayed beyond the visible image 220.

Example of a First Video Object that Connects to a Second Video Object

Figure 23A:
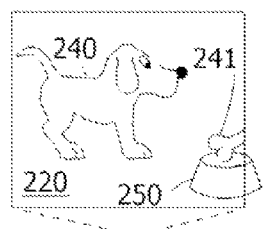
FIGS. 23A-23D are time-sequential, perspective views of the projecting device of FIG. 1, wherein a dog video object picks up and connects to a bone video object.
Figure 23B:
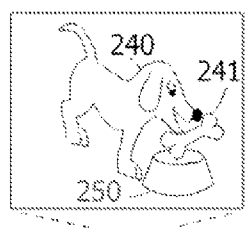
Figure 23C:
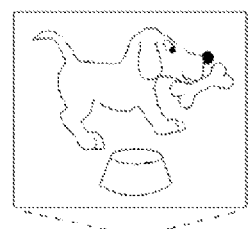
Figure 23D:
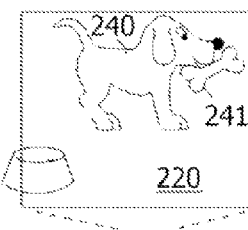

Turning now to FIGS. 23A-23D, the projecting device 100 is moved in a rightward direction relative to the physical object 250 in the environment. FIG. 23A shows a first video object 240 (of a dog) located near a physical object 250 (of a dish) that is connected to a second video object 241 (of a bone). Then a few seconds later, FIG. 23B shows the second video object 241 (of the bone) being disconnected from the physical object 250 (of the dish), where the second video object 241 (of the bone) is then connected to the first video object 240 (of the dog, which puts the bone in its mouth). Thus, in FIGS. 23C-23D, the second video object 24 (of the hone) substantially remains in the vicinity of the first video object 240 (of the dog), even though the physical object 250 (of the dish) moves outside the visible image 220.

Whereby, in one aspect, a projecting device can determine the position and/or orientation of at least one physical object located on at least one remote surface, connect a first video object to a second video object, and generate a visible image comprised of the first video object and the second video object such that the first video object appears to remain substantially in the vicinity of the second video object.

In another aspect, a projecting device can determine the position and/or orientation of at least one physical object located on at least one remote surface, connect a first video object to a second video object, and generate a visible image comprised of the first video object and the second video object such that the first video object appears to remain substantially affixed to the second video object.

Video Objects that Connect to Handheld Physical Objects

Figure 24A:
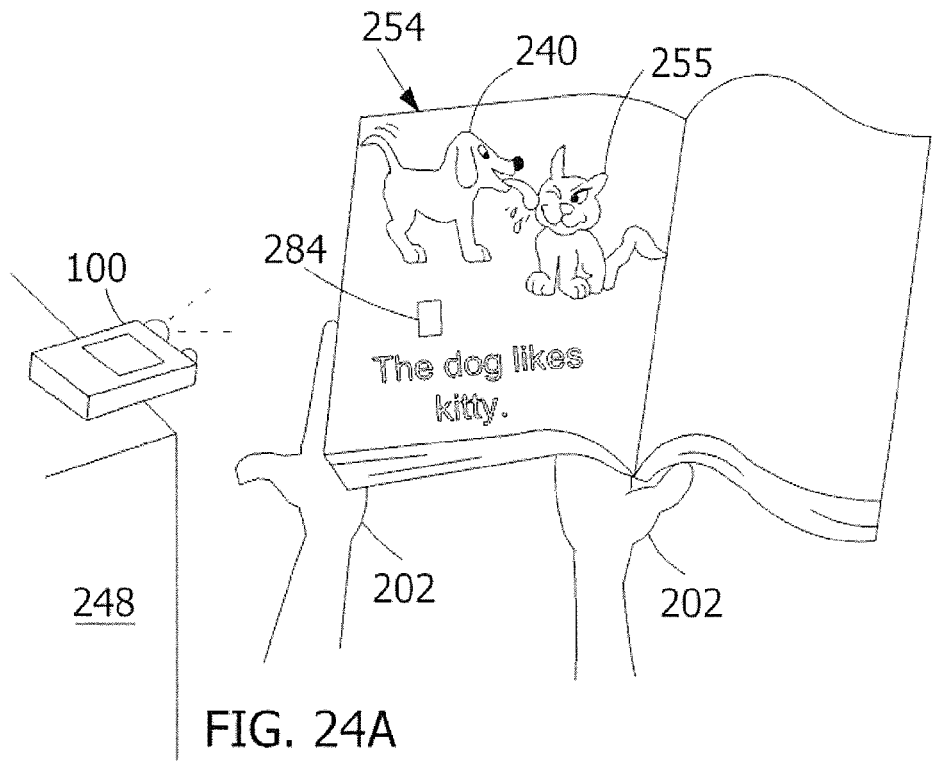
FIGS. 24A and 24B are perspective views of the projecting device of FIG. 1 that is stationary, wherein a dog video object is connected to a handheld book physical object that is moved to different positions.
Figure 24B:
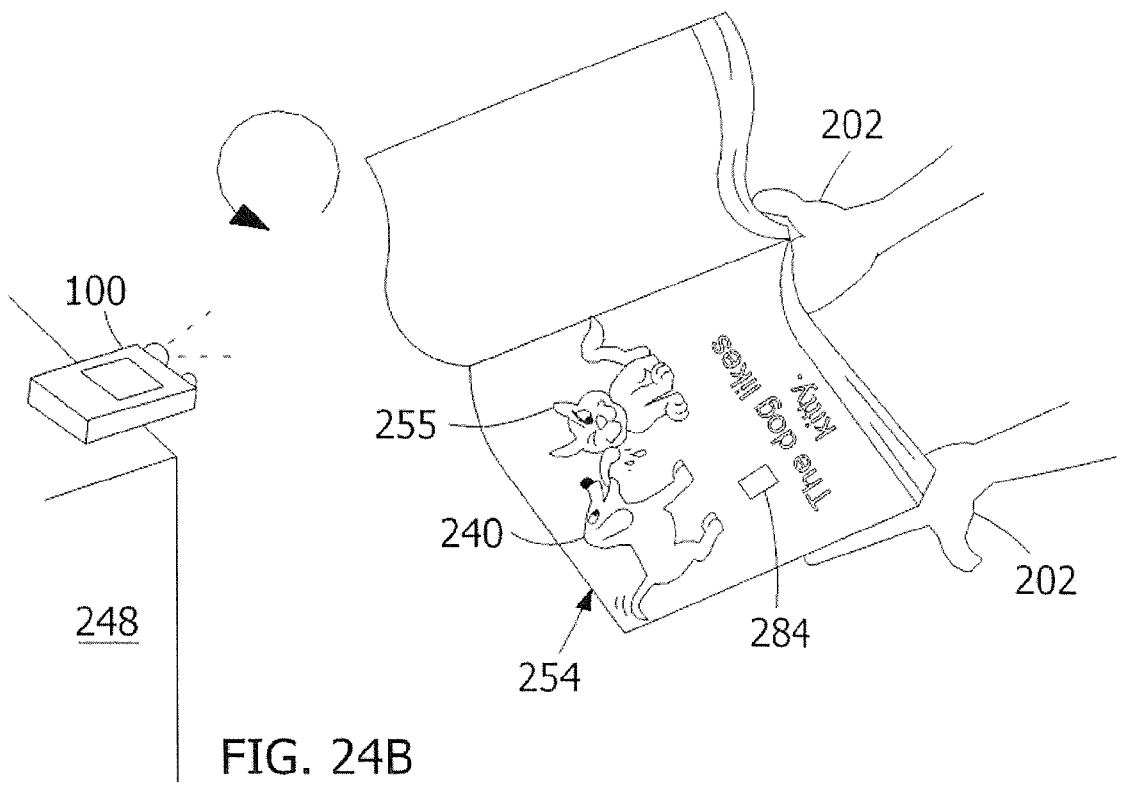

Turning now to FIGS. 24A and 24B, thereshown is a handheld physical object 254 of a book held by user hands 202. The physical object 254 of a book is printed with text and graphics, including a printed object tag 284 (e.g., 2D barcode) and a printed character 255. The projecting device 100 has been made immobile, such as placed on an item of furniture 248. In operation, the device 100 illuminates a video object 240 (of a dog) that has connected to the handheld physical object 254 (of the book), such that the video object 240 appears to interact and connect with the printed character 255. As shown by FIG. 24B, the projecting device 100 modifies a visible image comprised of one or more video objects 240 such that the position and orientation of the one or more video objects 240 (of the dog) adapt to the position and orientation of the moving handheld physical object 254 (of the book).

Figure 26A:
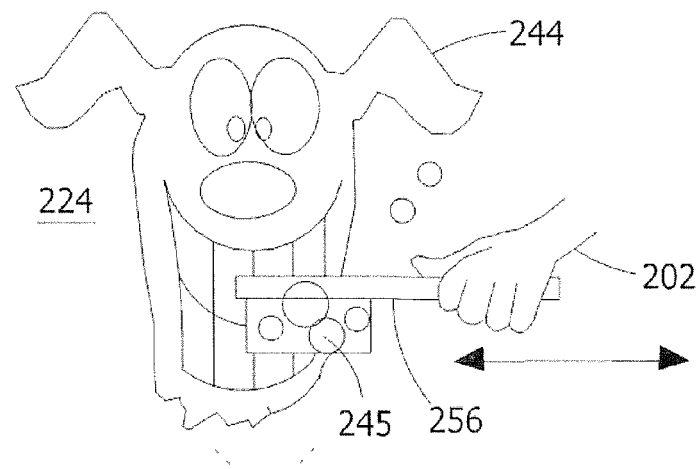
FIGS. 26A and 26B are perspective views of the projecting device of FIG. 1, wherein the handheld toothbrush of FIG. 25 is moved back and forth in the vicinity of the device.
Figure 25:
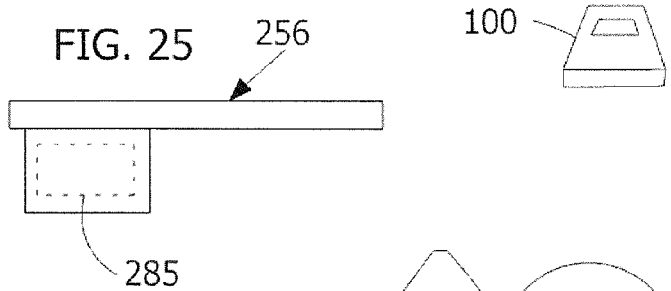
FIG. 25 is a front view of a handheld toothbrush that includes an object tag.
Figure 26B:
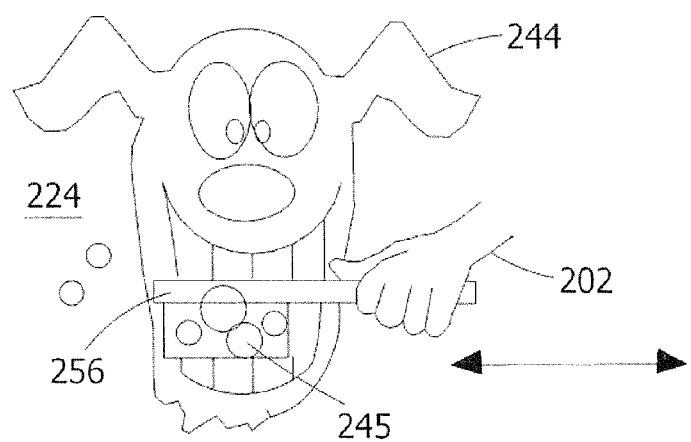

Turning now to FIG. 25, thereshown is a handheld physical object 256 of a toothbrush that includes an object tag 285. Shown in FIGS. 26A and 26B, the projecting device 100 projects a visible image comprised of a first video object 244 of a dog's face onto a remote surface 224. Moreover, a user hand 202 is shown moving the handheld physical object 256 back and forth in front of the first video object 244, while a second video object 245 of bubbles connects to the moving handheld physical object 256. Thus, as the handheld physical object 256 moves through 3D space, the projecting device 100 further modifies the visible image comprised of the second video object 245 of bubbles such that the second video object 245 appears to substantially remain in the vicinity of the moving handheld physical object 256. The device 100 may further create "scrubbing" sound effects and vibratory haptic effects.

Video Objects that Interact and Connect Using a Plurality of Object Actions

Figure 27:
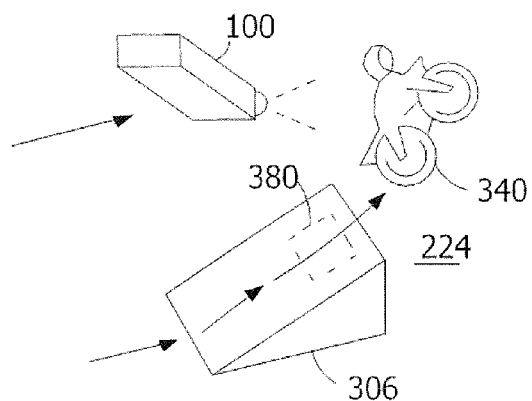
FIG. 27 is a perspective view of the projecting device of FIG. 1, wherein a motorcycle video object is leaping over a ramp physical object.
Figure 28:
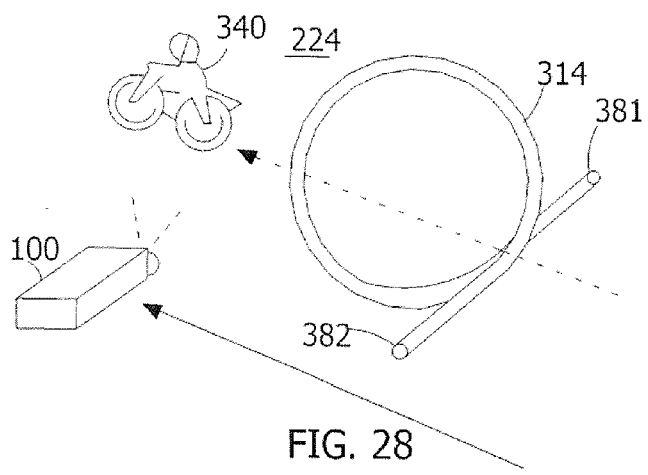
FIG. 28 is a perspective view of the projecting device of FIG. 1, wherein a motorcycle video object is moving through a loop physical object.
Figure 29:
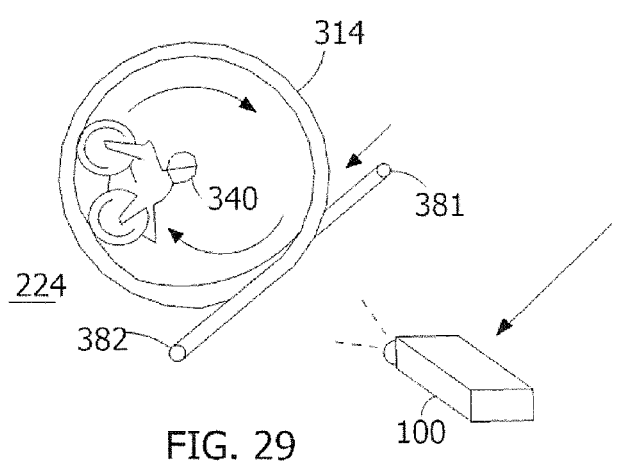
FIG. 29 is a perspective view of the projecting device of FIG. 1, wherein a motorcycle video object is spinning around in a loop physical object.

FIGS. 27-29 present examples of video objects that interact and connect with physical objects using a plurality of object action types, action regions, and action conditions (as discussed earlier in FIGS. 15-19). Turning to FIG. 27, shown is a 2D picture of a ramp physical object 306 that includes an object tag 380. Moreover, the handheld projecting device 100 (with no user shown) can be moved in 3D space while moving an illuminated video object 340 of a motorcycle on remote surface 224. Interactivity occurs when the wheels of the motorcycle video object 340 touch the ramp physical object 306; wherein, the device 100 connects the video object 340 to the ramp physical object 306. The device 100 further modifies the orientation of the video object 340 such that the motorcycle video object 340 adapts to the orientation of the physical object 306. Then when the motorcycle video object 340 reaches the end of the ramp physical object 380 (near the object tag 380), the device 100 disconnects objects 306 and 340, tilting the orientation of the video object 340 while generating a high-pitched motor sound effect, as if the motorcycle has leaped into the air. A few seconds later, the device 100 re-orients the video object 340 and makes a thump sound effect and a haptic vibration, simulating the motorcycle landing.

However, if the device 100 is moved at a slower rate of movement or from a different direction, the video object 340 may interact quite differently with the physical object 306. For example, if the device 100 is moved in the opposite direction, the device 100 may animate a video object of a motorcycle crashing near the ramp physical object 306, with generated "crash" sound and haptic effects.

Turning to FIGS. 28 and 29, there presented is an example of the video object 340 of the motorcycle that interacts and connects with a 2D picture of a "360 degree" loop physical object 314. The physical object 314 includes two object tags 381 and 382 at opposite ends. So in FIG. 28 during an example operation, when the projecting device 100 is moved upward, the video object 340 passes by and does not interact with the physical object 314. Yet in FIG. 29, when the projecting device 100 is moved downward (over object tag 381), the video object 340 interacts and connects with the physical object 314 of the loop. The device 100 causes the video object 340 to spin around, before being disconnected (when over object tag 382) and move away from the physical object 314—while producing "whirring" sound effects and haptic effects.

The handheld projecting device 100 may enable such precise interaction and connection of video objects and physical objects by utilizing a plurality of object actions, action regions, and action conditions for the video objects and physical objects (as discussed earlier in FIGS. 15-19). Moreover, a plurality of object actions, action regions, and action conditions may be defined in memory to provide realistic interactivity among objects. The object action conditions may include, but not limited to, data related to object position, object orientation, object speed, object direction, object shape, object size, and object color.

Hence, the projecting device 100 can generate graphic, sound, and haptic effects based upon one or more object action conditions of the one or more video objects and at least one physical object. The projecting device 100 can modify a visible image comprised of one or more video objects based upon object action conditions of the one or more video objects and at least one physical object. The projecting device 100 can modify a visible image comprised of one or more video objects based upon the position, orientation, speed, and/or direction of the one or more video objects relative to at least one physical object.

Creating an Object Path

Figure 30:
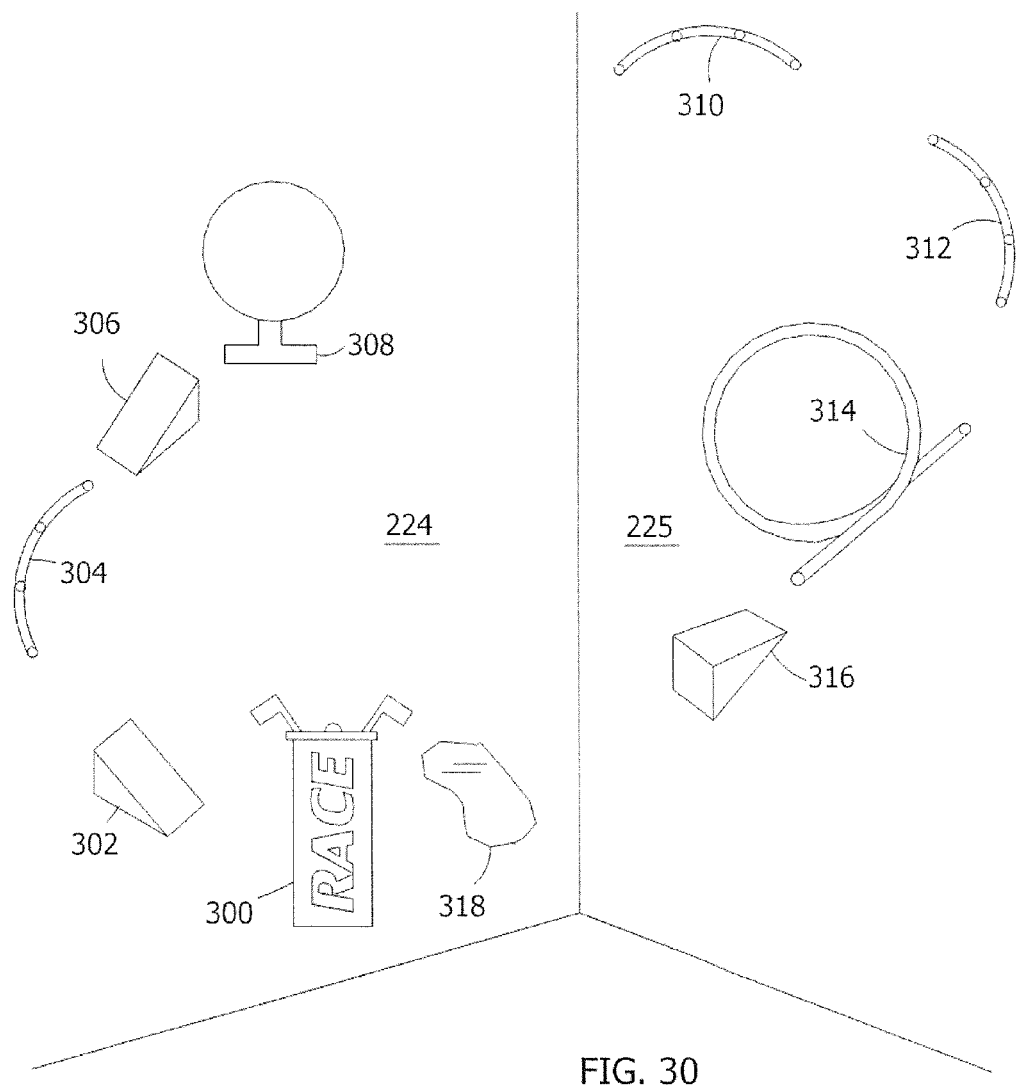
FIG. 30 is a perspective view of a collection of physical objects affixed to two remote surfaces.

Turning now to FIG. 30, there presented is a perspective view of a collection of 2D picture physical objects affixed (e.g., with stick-on adhesive) to remote surfaces 224 and 225. The physical objects include the following: a gate physical object 300; ramp physical objects 302, 306, and 316; path physical objects 304, 310, and 312; hoop physical object 308; loop physical object 314, and pond physical object 318. Each one of the physical objects 300, 302, 306, 308, 314, 316, and 318 includes an object tag comprising a unique tag identifier (e.g., first tag ID="1", second tag ID="2", etc.) such that each physical object can be identified by the device 100. The path physical objects 304, 310, and 312 may not include object tags, as these physical objects may simply provide visual guidance for the object path.

Figure 31:
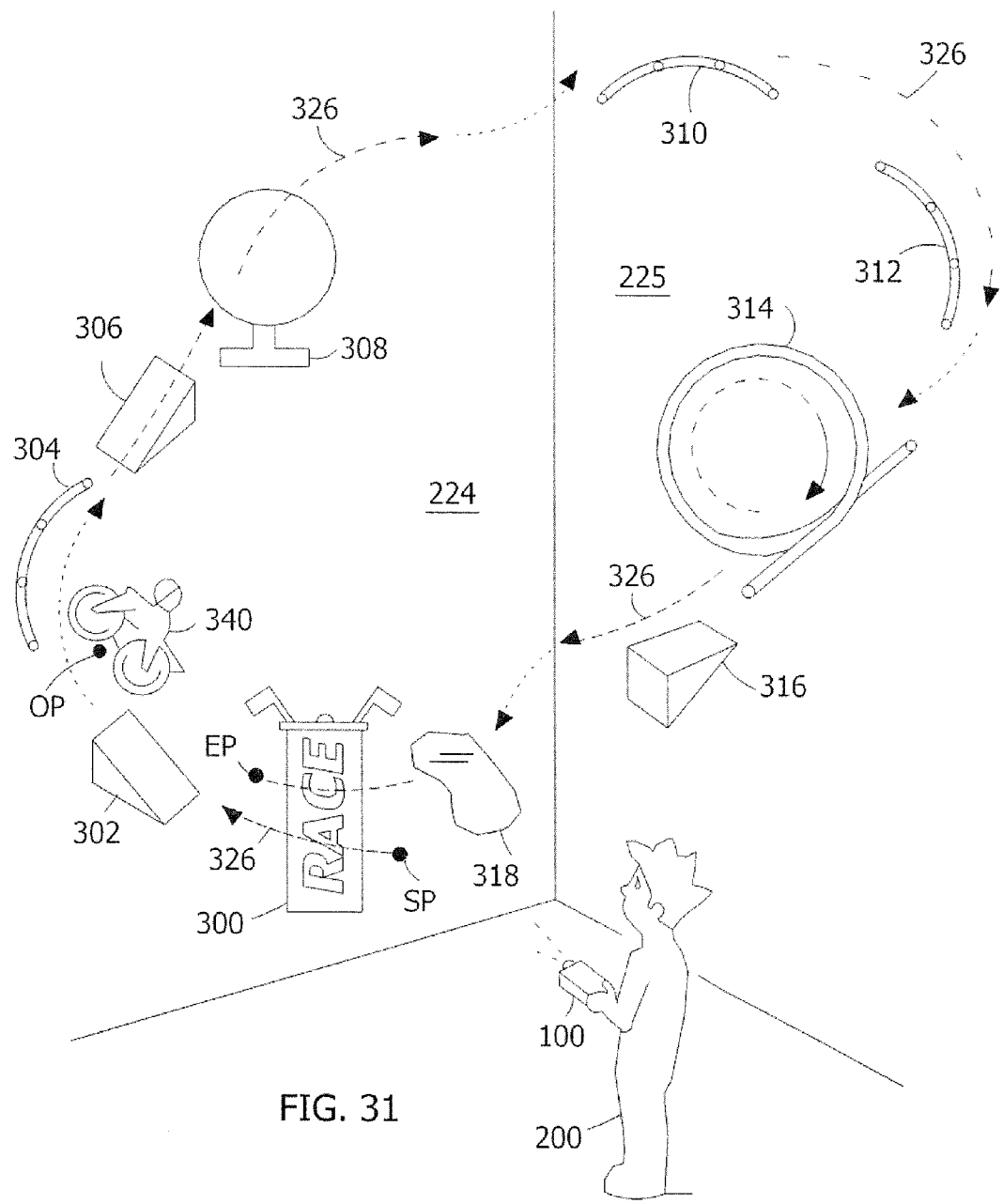
FIG. 31 is a perspective view of the projecting device of FIG. 1, wherein the device is constructing a user-defined object path.

Now turning to FIG. 31, a user-defined object path 326 will be created. During an example path construction, a user 200 moves the projecting device 100, which moves an illuminated video object 340 (of a motorcycle) with an object position OP across surfaces 224 and 225 of the environment. The user begins by aiming the projecting device 100 at a start point SP. Thus, the user 200 moves and aims the projecting device 100 so that the video object 340 and object position OP move across the physical objects 300, 302, 304, 306, 308, 310, 312, 314, 316, 318, and 300 in sequence, stopping at end point EP to complete the user-defined object path 326.

During construction of the user-defined path 326, the device 100 may acquire the identity of each physical object in sequence to create the object ID path data containing object identifiers (e.g., "300", "302", "306", etc.). Moreover, the device 100 may acquire a sequence of object positions OP to create the position path data that describes the object path 326 in 3D space.

Method for Creating a User-Defined Object Path

Turning now to FIG. 20, a flowchart of a computer implemented method for creating a user-defined object path is presented, although alternative methods may also be considered. The method may be implemented in the object path maker (reference numeral 134 of FIG. 3) and executed by at least one control unit (reference numeral 110 of FIG. 3).

Beginning with step S360, the control unit initializes an instance of object path data (reference numeral 148 of FIG. 3), which (as shown in FIG. 33) may be comprised of Position Path Data, Object ID Path Data, and Path Video Object ID Data. The control unit also sets a variable Previous ID=UNKNOWN.

Continuing to step S362, the control unit determines a Video Object Position of an illuminated video object (as discussed earlier in FIGS. 30 and 12).

In step S364, the control unit then adds the Video Object Position (from step S362) to the Position Path Data (reference numeral D302 of FIG. 33).

Whereby, in step S366, the control unit determines an Object ID of a physical object nearest to the Video Object Position. The nearest physical object may be determined by comparing the positions and computed distances of the detected physical objects to the Video Object Position (from step S362). The Object ID may be retrieved from the physical object data (reference numeral 145 of FIG. 3).

Then in step S368, if the control unit determines that the Object ID is not equal to the variable Previous ID, the method continues to step S370. Otherwise the method skips to step S372.

In step S370, the control unit adds the Object ID (from step S366) to the Object ID Path Data (reference numeral D300 of FIG. 33) and sets the variable Previous ID=Object ID.

Whereby, in step S372, the control unit may wait for a predetermined period of time (e.g., 1/30 second) to limit the rate of data acquisition.

In step S374, if the control unit determines that a user is done creating the user-defined object path, the method continues to step S376. Otherwise, the method loops back and continues at step S362. The control unit can determine if the user is done by, but not limited to, detecting at least two similar Object ID in the Object ID Path Data, which indicates a closed path or racetrack; and/or detecting a user interface signal (e.g., when the user pushes a button on the device) indicating that the user-defined object path is complete.

Finally, in step S376, the control unit may create one or more path video objects (defined in reference numeral D304 of FIG. 33) and connect the one or more path video objects to at least one physical object or between each of the physical objects (defined in reference numeral D300 of FIG. 33) of the object path data. To create a path video object, the control unit may rely on a library of path video object descriptions (reference numeral 127 of FIG. 3) to create an instance of path video object data (reference numeral 145 of FIG. 3), which may define, but not limited to, a path video object ID, position, orientation, velocity, shape, object connections, etc., as shown by step S378. Creating path video objects is an optional step, as some applications (reference numeral 138 of FIG. 3) may not require the creation of path video objects.

The control unit may further adjust the path video objects (as created above) and object path data (as created in step S364 and S370), such as, but not limited to, smoothing the path video objects and object path data to remove jagged corners to form a smooth path or paths, removing substantially similar path locations, and/or joining unconnected path ends (e.g., such as the start point SP and end point EP of FIG. 31) to form a closed path. This may be completed by analyzing the 3D spatial geometry and adjusting path positions of the path video objects and object path data (reference numeral 148 of FIG. 3).

Moreover, by utilizing the communication interface (reference numeral 118 of FIG. 3), the control unit can transmit instances (e.g., data attributes, etc.) of the path video objects and object path data to other devices, such as other handheld projecting devices, so that a plurality of devices can interoperate and share the same user-defined object path.

In some alternative methods and applications, a user operating a projecting device may be able to construct a plurality of user-defined object paths within an environment.

Example of Object Path Data

Turning now to FIG. 33, thereshown is an example of object path data collected for an object path, which may be comprised of object ID path data D300, position path data D302, and path video object ID data D304. Object ID Path Data D300 may contain a sequence of object identifiers of physical objects along the object path (e.g., which correspond to the physical objects 300, 302, 306, etc. of the object path 326 in FIG. 34). Moreover, the Position Path Data D302 may contain 3D positions of the object path (e.g., such as object path 326 of FIG. 34). Path video object ID data D304 may define one or more path video objects (e.g., such as path video objects 344, 345, 346, etc. of FIG. 35) that define an illuminated object path.

Application with an Object Path

Figure 34:
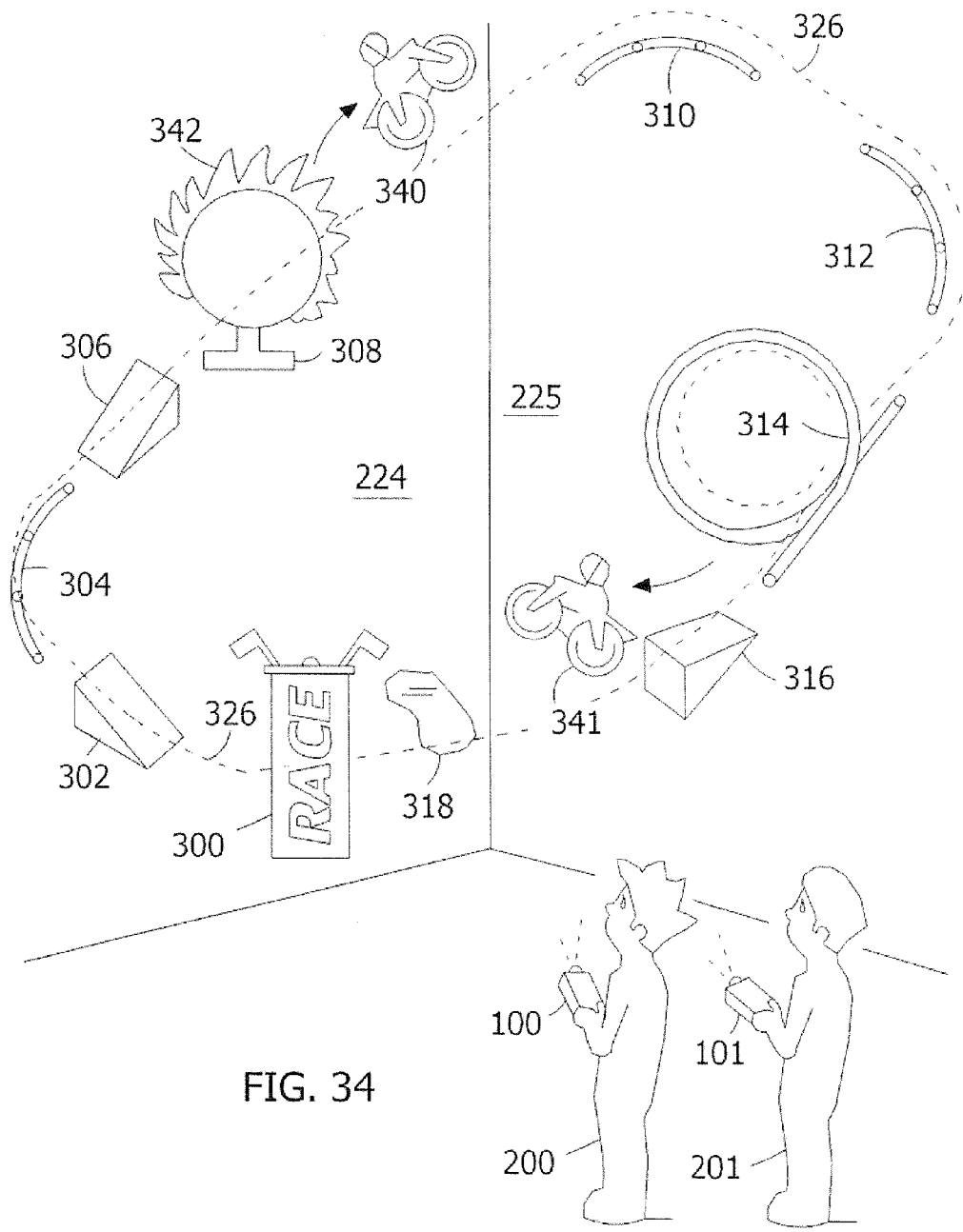
FIG. 34 is a perspective view of the projecting device of FIG. 1, wherein two users are moving two motorcycle video objects around a path of physical objects.

So presented in FIG. 34 is a motorcycle racing application that utilizes the previously constructed object path 326 (as described in FIG. 31). Remote surfaces 224 and 225 further contain picture physical objects 300-318, including the hoop physical object 308 and ramp physical object 316. As can be seen, a first user 200 is moving the device 100, which moves and illuminates a first motorcycle video object 340. A second user 201 is moving a second device 101, which moves and illuminates a second motorcycle video object 341. The second device 101 is assumed to be constructed and function similar to device 100 (described in FIG. 3).

During an example operation, the users/players 200 and 201 move their respective video objects 340 and 341 of motorcycles around the racetrack defined by the object path 326. The video objects 340 and 341 of the motorcycles interact in a realistic manner with the physical objects 300-318. For example, as the first motorcycle video object 340 passes over the hoop physical object 308, an animated fire video object 308 is created and is connected to the hoop physical object 308. Hence, as device 100 is moved, the fire video object 308 substantially remains affixed to the physical object 308, while the motorcycle video object 340 moves beyond the hoop object 308. Further, as device 101 is moved, the second motorcycle video object 341 appears to jump over the ramp object 316. Sound and haptic effects may be further generated by devices 100 and 101 to enhance the game.

Winning the racing game may entail the user 200 or 201 to be the first to move the motorcycle video object 340 or 341 around the racetrack for a certain number of laps to simulate a real-world motorcycle race. That is, every time a motorcycle video object 340 or 341 goes past the gate physical object 300, another lap is counted by device 100 or 101, respectively. Devices 100 and 101 may each retain a history of laps made by a user around the path 326. Game information, such as lap count, speed, etc. may be shared by the devices 100 and 101 using their communication interfaces (reference numeral 118 of FIG. 3), such as wireless transceivers.

Moreover, if a player, such as user 200 holding the device 100 veers the motorcycle video object 340 too far off course (as defined by the object path 326) or skips a physical object on the course, the device 100 responds by disqualifying the player and displaying text reading "Disqualified Rider" on its projected visible image.

Application with an Illuminated Object Path

Figure 35:
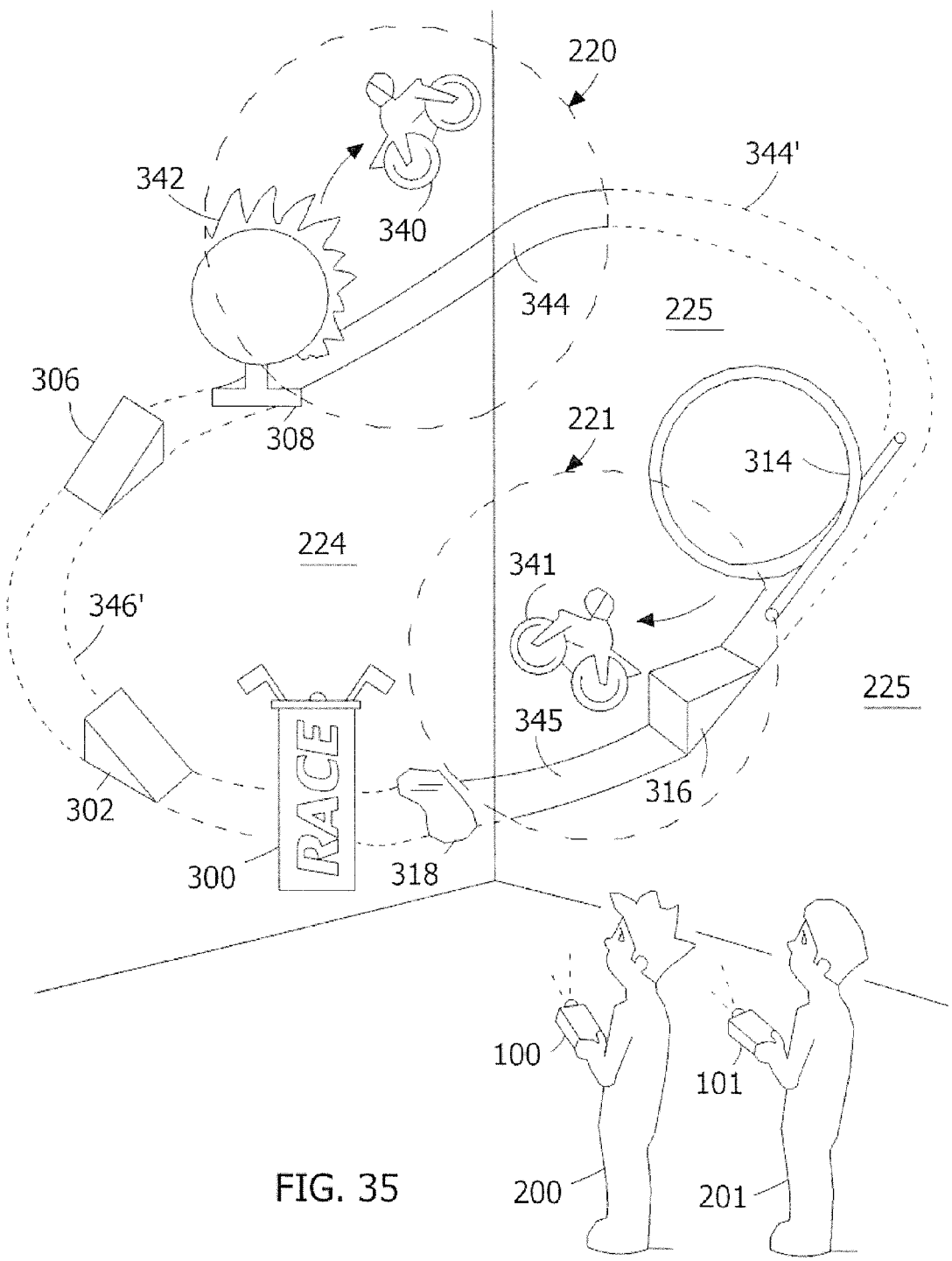
FIG. 35 is a perspective view of the projecting device of FIG. 1, wherein two users are moving two motorcycle video objects around an illuminated path of physical objects.

Turning now to FIG. 35, thereshown is alternative racing application that provides illuminated paths for users to follow. The application uses the already constructed object path 326 (as described in FIG. 31). As in the previous application (of FIG. 34), remote surfaces 224 and 225 contain picture physical objects 300-318. However, the path physical objects (reference numeral 304, 310, 312 of FIG. 34) have been removed and are not necessary in the current application. As can be seen, a first user 200 is moving the device 100, which illuminates and animates a visible image 220 comprised of a first motorcycle video object 340, a path video object 344, and a fire video object 342. A second user 201 is moving a second device 101, which illuminates and animates a visible image 221 comprised of a second motorcycle video object 341 and a path video object 345. The second device 101 is assumed to be constructed and function similar to device 100 (described in FIG. 3).

In the current embodiment, the path video objects 344, 344', 345, and 346' are created during the construction of the user-defined object path (as shown by the flowchart step S376 of FIG. 32). Whereupon, the device further generates and connects path video objects between the physical objects based upon the object path. The path video objects may graphically represent any kind of path, such as a racetrack, street, railroad track, trail, river, stream, etc. Moreover, since the path video objects are connected to the physical objects, the path video objects may remain substantially attached to physical objects during operation of the device.

During an example operation, the users/players 200 and 201 move their respective video objects 340 and 341 of motorcycles around the racetrack. As illustrated, path video objects 344' and 346' (as denoted by dashed lines) are not yet illuminated by the visible images 220 and 221 projected by devices 100 and 101. Thus, the illuminated path video objects 344 and 345 provide a visual cue to the users 200 and 201 as to the direction of the path or racetrack beyond the projected images 220 and 221. Thus, the projecting device 100 or 101 can generate one or more video objects 340 or 341 that appear to move along the illuminated path video objects 344 or 345, respectively.

Understandably, in alternative embodiments, a projecting device may operate other types of racing, exploration, search and rescue, and adventure applications that utilize an object path, such as a closed path or racetrack, or even a plurality of object paths forming a network of paths. Whereby, the projecting device may project a visible image comprised of one or more video objects of characters, people, airplanes, cars, boats, spaceships, trains, etc. for the user to interactively control in respect to the object path.

In some embodiments, a projecting device is operable to construct one object path that forms a path among one or more video objects and/or physical objects, such as an open path or a closed path. In other embodiments, a projecting device is operable to construct a plurality of object paths that form a network of paths among a plurality of video objects and/or physical objects. One or more object paths may extend across one or more remote surfaces, such as from a ceiling, to a wall, to a floor, to a table top. Wherein, a user can control and move video objects along the object paths throughout the user's environment.

In some embodiments, a projecting device may project a visible image comprised of one or more path video objects that connect to other video objects and/or physical objects. One or more path video objects of various types may be displayed on the visible image. For example, a path video object may be graphically represented as, but not limited to, a racetrack (e.g., for race cars), a stone covered road (e.g., for bicycles), a mud track (e.g., for horse racing), a snow trail (e.g., for slalom skiing), a city street (e.g., for ferrying taxis), a light beam (e.g., for spaceship travel), a river (e.g., for boats), a sidewalk (e.g., for skateboarders), a trail of flowers (e.g., for exploration), or a railroad track (e.g., for model trains).

Whereby, in one aspect, a projecting device can generate a visible image comprised of one or more video objects such that the one or more video objects appear to adapt to the position and/or orientation of the object path.

A projecting device can generate a visible image comprised of one or more video objects such that the position and/or orientation of the one or more video objects are based upon the position and/or orientation of the object path.

A projecting device can generate a visible image comprised of one or more path video objects that graphically define an object path.

A handheld projecting device can generate a visible image comprised of at least one video object that can be moved along an object path when the handheld projecting device is moved.

Application with a Plurality of Object Paths

Figure 36A:
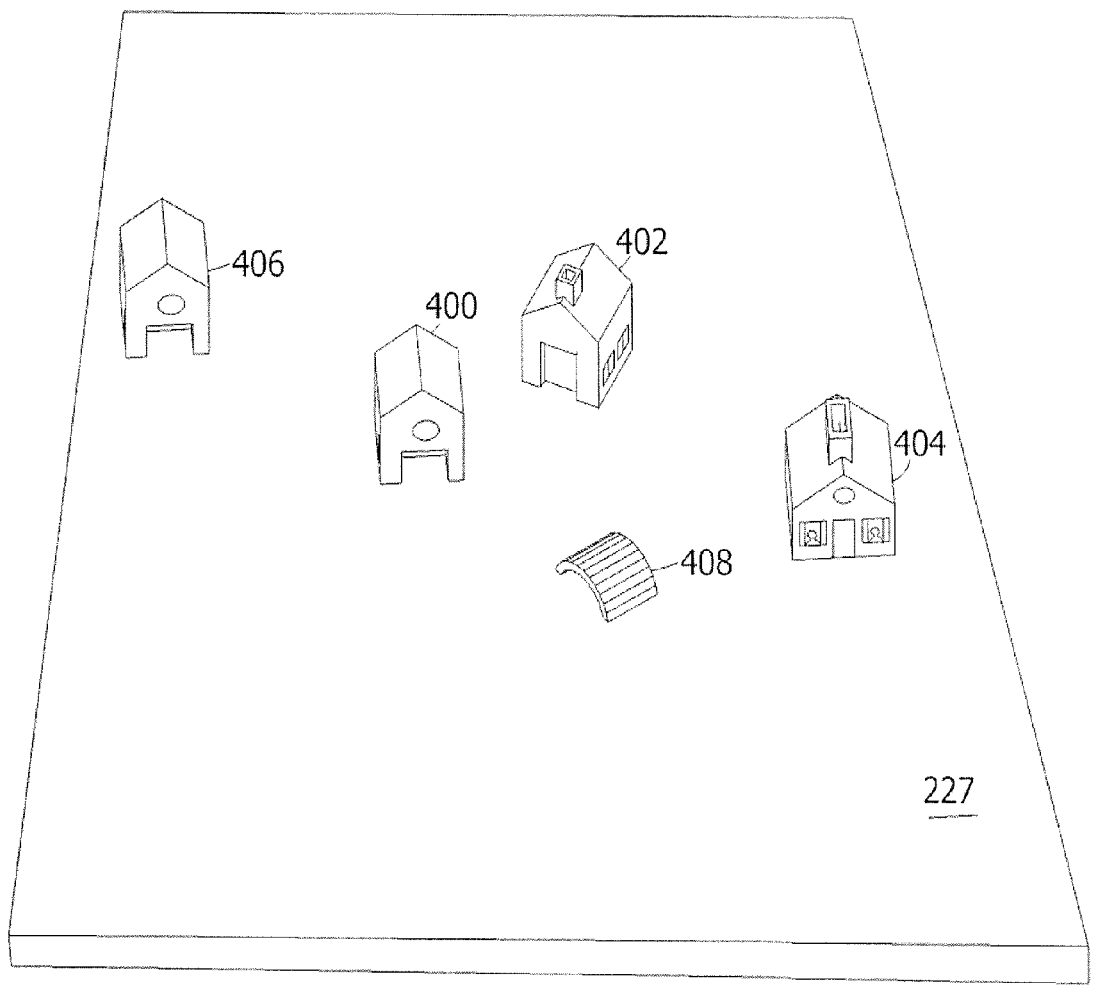
FIG. 36A is a perspective view of a collection of physical objects located on a remote surface.

Turning now to FIG. 36A, thereshown are physical objects 400-408 located on a remote surface 227, such as a table top. The physical objects 400-408 may be 2D- or 3D-shaped objects, where each physical object includes at least one object tag (not shown).

Figure 36B:
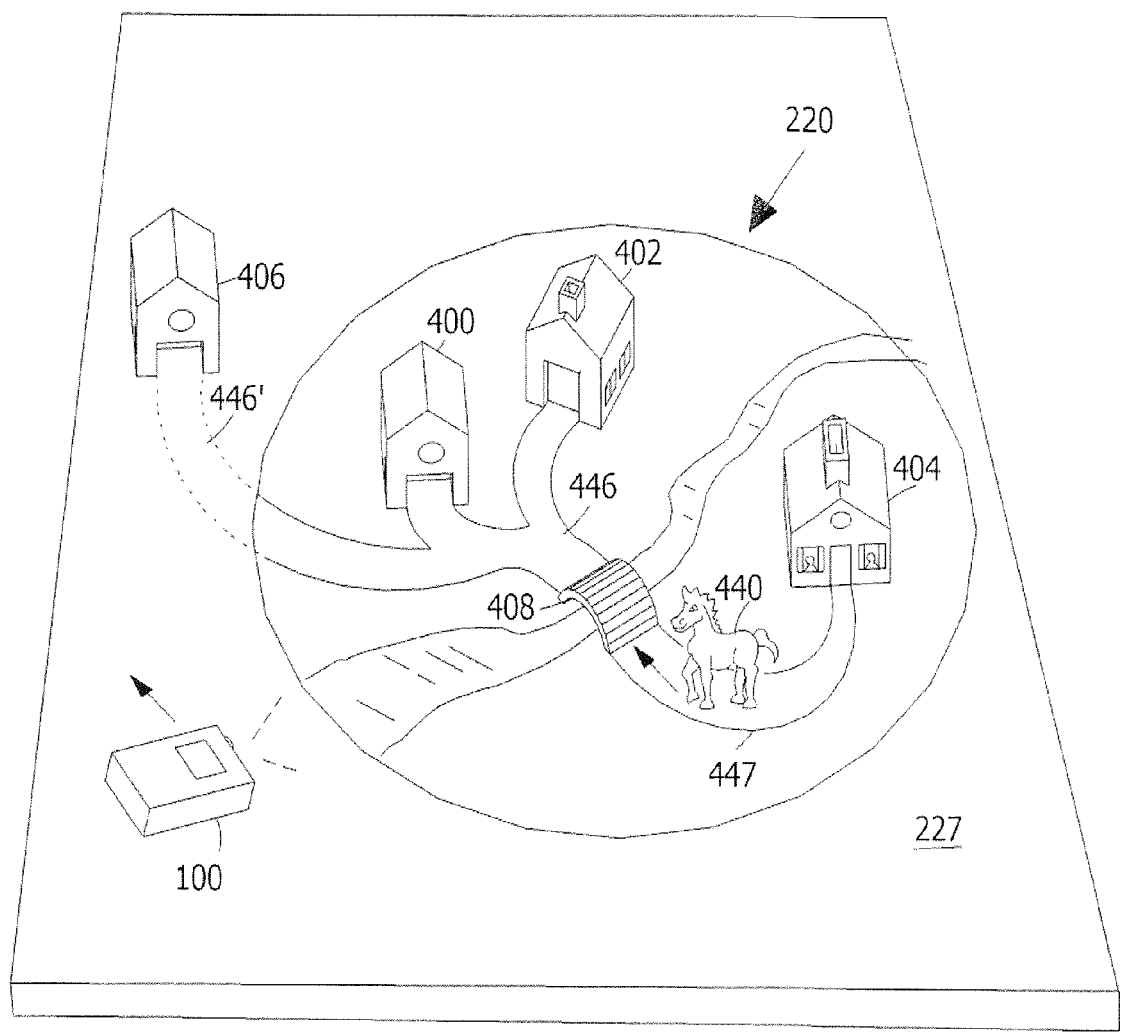
FIG. 36B is a perspective view of the projecting device of FIG. 1, wherein the device has created auto-generated paths among a collection of physical objects.

Then turning to FIG. 36B, presented is the same collection of physical objects 400-408. However, the projecting device 100 is now illuminating a visible image 220 comprised of path video objects 446 and 447 (with a portion of a path video object 446' not illuminated), along with an animated horse video object 440.

Unlike the previous applications, an auto-generated object path may be created by the projecting device 100 to connect a plurality of video objects and/or physical objects. In this case, the auto-generated object path comprises path video objects 447, 446, and 446' that are connected to physical objects 400-408.

Moreover, the projecting device 100 may connect one video object, such as path video object 446, to a plurality of physical objects 400, 402, 406, and 408. Such a capability enables device 100 to create an object path that forms a network of paths.

In an example operation, the device 100 may be moved by a user (not shown) such that the animated horse video object 440 moves along an object path comprised of the first path video object 447, over the bridge physical object 408, and across the second path video object 446.

Method for Creating Auto-Generated Object Paths

Figure 37:
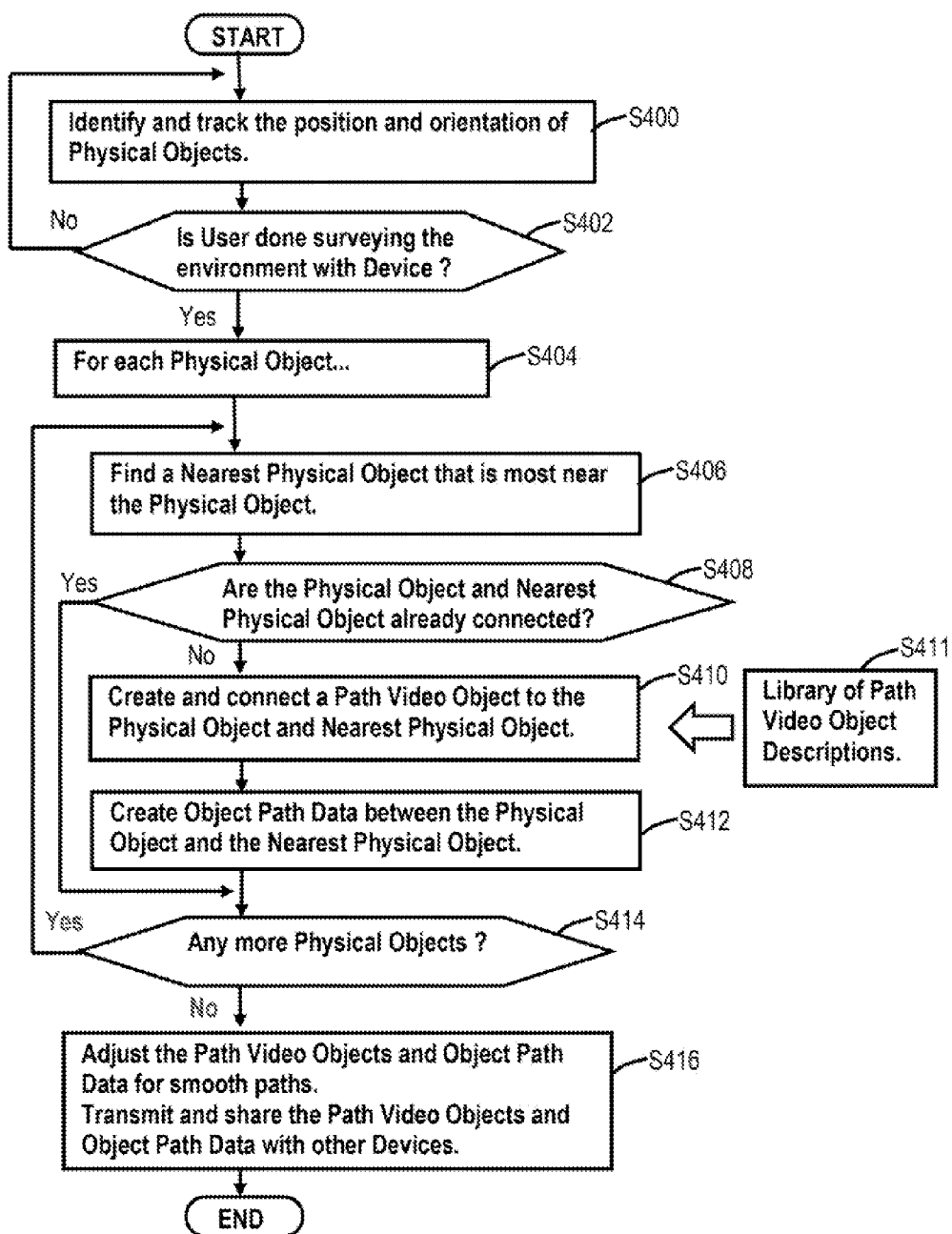
FIG. 37 is a flowchart of a computer readable method of the projecting device of FIG. 1, where the method creates auto-generated object paths.

Turning now to FIG. 37, a flowchart of a computer implemented method for making auto-generated object paths is presented, although alternative methods may also be considered. The method may be implemented in the object path maker (reference numeral 134 of FIG. 3) and executed by at least one control unit (reference numeral 110 of FIG. 3).

Beginning with step S400, the control unit detects, identifies, and tracks the position and orientation of physical objects in the environment.

Then in step S402, if the control unit determines that a user is done surveying the environment with a handheld projecting device, the method continues to step S404. Otherwise, the method loops back to step S400 to detect more physical objects. The control unit may determine when a user is done surveying the environment by, but not limited to, the control unit detects a user interface signal (e.g., such as button press) indicating that the projecting device is done sensing the environment.

In step S404, the control unit selects each physical object that was previously identified (in step S400), selecting the first of a physical object.

In step S406, the control unit then searches for a nearest physical object that is located nearest to the physical object. Spatial distance between physical objects can be readily determined using geometric functions.

Then in step S408, if the control unit determines that the physical object and nearest physical object (from step S406) are already connected, the method skips to step S414. Otherwise, the method continues to step S410. Connections between physical objects may be determined by analyzing the object connect data (reference numeral 147 of FIG. 3).

In step S410, the control unit creates and connects a path video object to two objects: the physical object and the nearest physical object (from step S406). To create a path video object, the control unit may rely on a library of path video object descriptions (reference numeral 127 of FIG. 3) to create an instance of path video object data (reference numeral 145 of FIG. 3), which may define, but not limited to, a path video object ID, position, orientation, velocity, shape, object connections, etc., as shown by step S411. Creating a path video object is an optional step, as some applications (reference numeral 138 of FIG. 3) may not require the creation of a path video object.

In step S412, the control unit can create an instance of object path data (reference numeral 148 of FIG. 3), which defines the object connections made (e.g., object ID path data) and path coordinates (e.g., position path data) between the physical object and the nearest physical object (from step S406).

Then in step S414, if the control unit determines that there are more physical objects to analyze (as identified by step S400), the method loops back to step S406 with the next physical object to analyze. Otherwise, the method continues to step S416.

Finally, in step S416, the control unit adjusts the path video objects (as created in step S410) and object path data (as created in step S412), such as, but not limited to, smoothing the path video objects and object path data to remove jagged corners to form a smooth path or paths, removing substantially similar path locations, and/or joining unconnected path ends to form a closed path. This may be completed, for example, by analyzing the 3D spatial geometry and adjusting path positions of the path video objects and object path data (reference numeral 148 of FIG. 3).

Then utilizing the communication interface (reference numeral 118 of FIG. 3), the control unit can transmit instances (e.g., data attributes, etc.) of the object path data and path video objects to other devices, such as other handheld projecting devices, so that a plurality of devices can interoperate and share the same auto-generated object paths.

Token Physical Object with 3D Video Object

Figure 38:
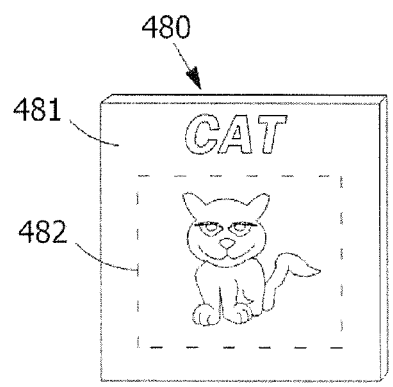
FIG. 38 is a front view of a token physical object that includes an object tag.

Turning now to FIG. 38, a front view is shown of a token physical object 480 of compact size (e.g., 10 mm×10 mm), where the token physical object 480 is comprised of at least one object tag 482 affixed to substrate 481, such as paper or plastic sheet material as illustrative examples. The object tag 482 may be similar to other disclosed object tags (such as the object tags 276-1 to 276-4 of FIG. 5 or object tag 280 of FIG. 6). For example, object tag 482 may be a low cost, visible or hidden 2D barcode (e.g., printed on substrate 481) that uniquely identifies the token physical object 480. The token physical object 480 may further be comprised of user-discernible object graphics (e.g., printed on substrate 481) to convey to a user the type of video object that will be represented by the projecting device, such as a character, avatar, vehicle, path, item, or in this case, a "cat" character. Whereby, the token physical object 480 may be embodied as a playing card, game token, or placemat that can be placed on or attached to any surface (e.g., wall, ceiling, floor, etc.) in the user's environment.

So turning to FIGS. 39A-39E, presented is the projecting device 100 that is operable to detect and identify the token physical object 480 (shown in FIG. 38) as a "cat" character. Upon identification, the projecting device 100 then creates a 3D video object 490 (of a cat) and connects the 3D video object 490 to the token physical object 480. Whereupon, the device 100 projects a visible image comprised of the 3D video object 490 (of a cat) that adapts to the position and orientation of the token physical object 480 located on a remote surface, such as a floor, wall, or ceiling remote surface. As discussed earlier (in step S162 of the method of FIG. 11), the projecting device 100 can determine the orientation and type of remote surface, whether a ceiling, wall, or floor surface (such as a tabletop).

Figure 39E:
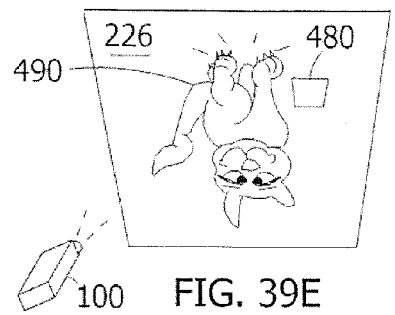
FIGS. 39A-39E are perspective views of the projecting device of FIG. 1, wherein a 3D video object of a cat is projected on remote surfaces that have different orientations relative to the device.
Figure 39D:
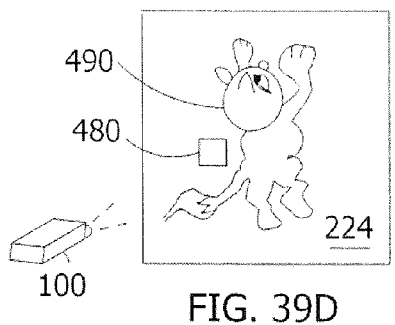
Figure 39A:
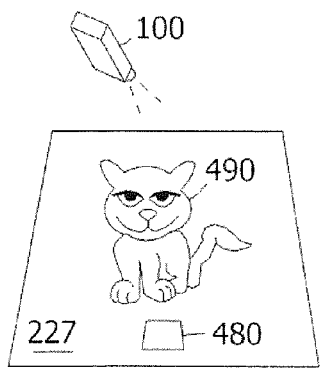
Figure 39B:
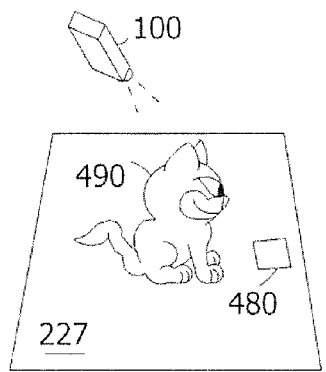
Figure 39C:
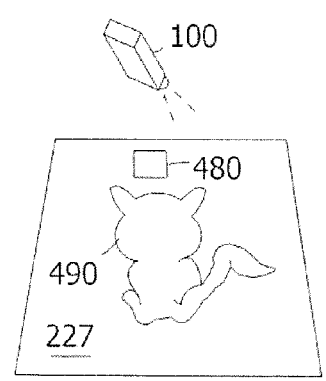

So FIG. 39A shows the token physical object 480 attached to a floor remote surface 227; wherein, a front view of the cat 3D video object 490 is projected by device 100. FIG. 39B shows the token physical object 480 and floor remote surface 227 rotated 90 degrees (relative to device 100); wherein, a side view of the cat 3D cat video object 490 is projected by device 100. FIG. 39C shows the token physical object 480 and floor remote surface 227 rotated 180 degrees (relative to device 100); wherein, a back view of the cat 3D video object 490 is projected by device 100. FIG. 39D shows the token physical object 480 attached to a wall remote surface 224; wherein, an elevation view of the cat 3D video object is projected by device 100. Finally, FIG. 39E shows token physical object 480 attached to a ceiling remote surface 226; wherein, an upside-down view of the cat 3D video object 490 is projected by device 100.

Understandably, alternative embodiments of token physical objects may be constructed, each comprising at least one object tag that has a unique tag identifier. Whereupon, the projecting device 100 may generate a visible image comprised of one or more video objects based upon the one or more token physical objects identified by the projecting device 100. As a result, the projecting device may display other types of 2D and/or 3D video objects (e.g., cat, dog, fish, automobile, truck, spaceship, cottage, house, shelf, dirt path, stone path, river path, or other types of characters, vehicles, paths, buildings, items, etc.) in the vicinity one or more token physical objects.

Whereby, in one aspect, a projecting device can identify at least one physical object located on at least one remote surface, connect one or more video objects to the at least one physical object, and generate a visible image comprised of the one or more video objects such that the types of the one or more video objects being displayed are based upon the at least one physical object identified by the projecting device.

A projecting device can identify at least one physical object located on at least one remote surface, connect one or more 3D video objects to the at least one physical object, and generate a visible image comprised of the one or more 3D video objects such that the types of the one or more 3D video objects being displayed are based upon the at least one physical object identified by the projecting device.

A projecting device can identify at least one physical object located on at least one remote surface, determine the position and orientation of the at least one physical object, connect one or more 3D video objects to the at least one physical object, and generate a visible image comprised of the one or more 3D video objects such that the appearance of the one or more 3D video objects is based upon the position and orientation of the at least one physical object.

A projecting device can identify at least one physical object located on at least one remote surface, determine the position and orientation of the at least one physical object, connect one or more 3D video objects to the at least one physical object, and generate a visible image comprised of the one or more 3D video objects such that the one or more 3D video objects appear to remain substantially in the vicinity of the at least one physical object.

A projecting device can identify at least one physical object located on at least one remote surface, determine the position and orientation of the at least one physical object, connect one or more 3D video objects to the at least one physical object, and generate a visible image comprised of the one or more 3D video objects such that the one or more 3D video objects appear to remain substantially affixed to the at least one physical object.

A projecting device can identify at least one physical object located on at least one remote surface, determine the position and orientation of the at least one physical object, connect one or more 3D video objects to the at least one physical object, and generate a visible image comprised of the one or more 3D video objects such that the position and orientation of the one or more 3D video objects is based upon the position and orientation of the remote surface.

Plurality of Token Physical Objects with 3D Video Objects and Paths

Figure 40:
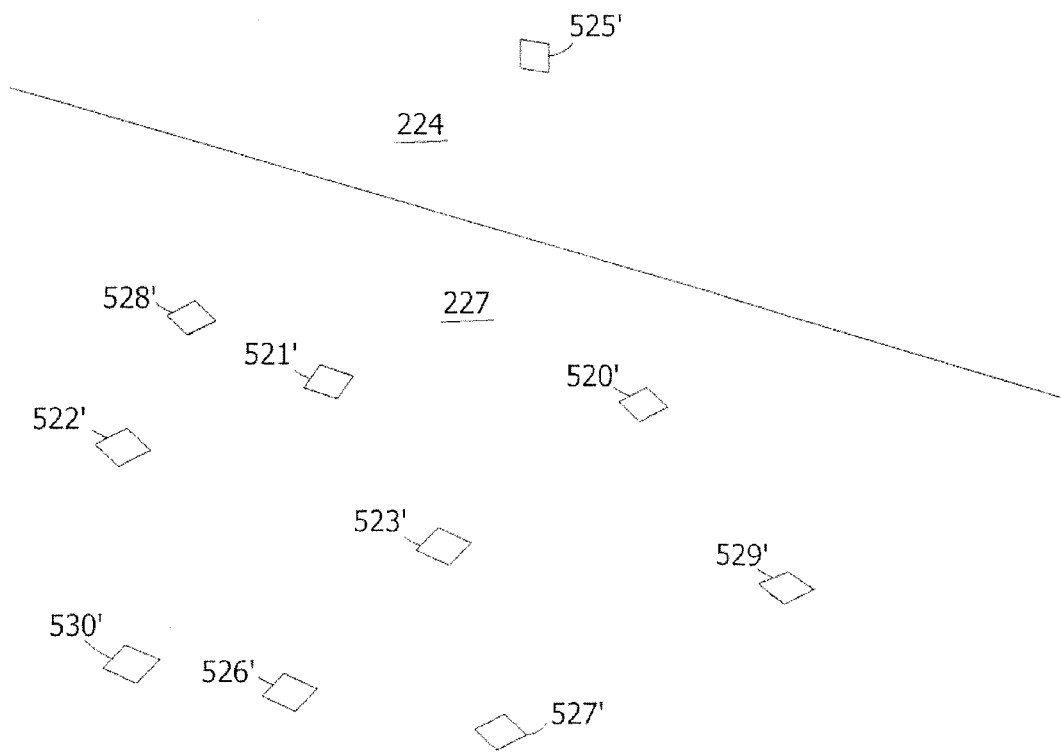
FIG. 40 is a perspective view of a collection of token physical objects located on two remote surfaces.

Turning now to FIG. 40, a perspective view of a plurality of token physical objects 520'-530' are shown located on a wall remote surface 224 and floor remote surface 227. The token physical objects 520'-530' may be arbitrarily placed in an environment.

Figure 41:
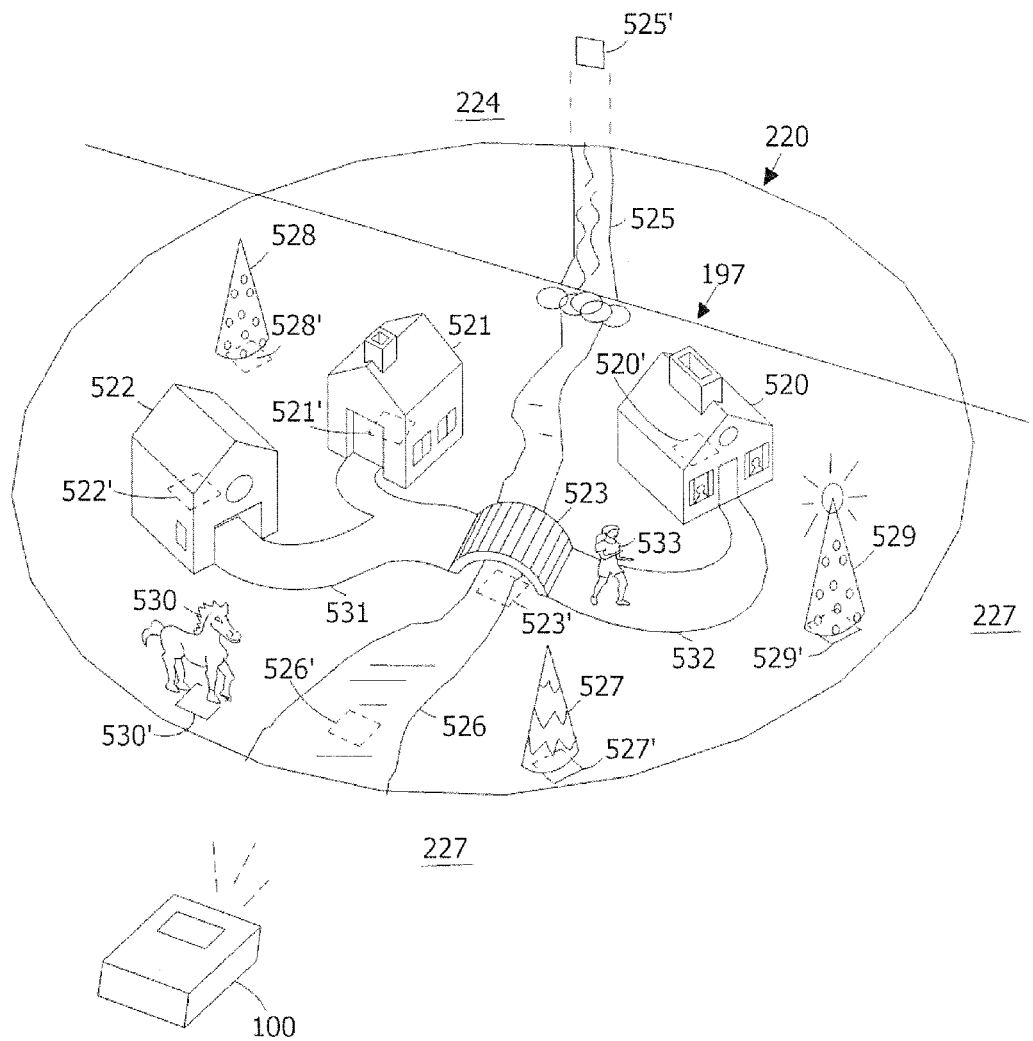
FIG. 41 is a perspective view of the projecting device of FIG. 1, wherein a multitude of 3D video objects are projected on two remote surfaces.

Now turning to FIG. 41, in an example operation, the projecting device 100 is aimed by a user (not shown) at the token physical objects 520'-530', creating a visible image 220 comprised of a multitude of 3D video objects on remote surfaces 224 and 227. Each one of the video objects 520, 521, 522, 523, 525, 526, 527, 528, 529, 530 appears in the vicinity of each token physical objects 520', 521', 522', 523', 525', 526', 527', 528', 529', and 530', respectively. Specifically, there are building video objects 520-522, bridge video object 523, river video object 526, waterfall video object 525, tree video objects 527-529, and the horse video object 530. Moreover, the device 100 has created an auto-generated object path comprised of path video objects 531 and 532 connected to the building video objects 520-522 and bridge video object 523. The device 100 has also created a doll video object 533 that has been connected to the path video object 532 of the auto-generated object path.

Some of the presented video objects appear to adapt to the orientation of the remote surfaces and a surface edge (as detected by the method of FIG. 11). For example, the river token physical objects 525' and 526' are similar objects, each comprised of the same object tag identifier (not shown). Yet since token physical object 525' is located on the vertical wall surface 224, the waterfall video object 525 is presented by device 100. But the token physical object 526' is located on the floor surface 227, so the river video object 526 is presented by device 100. The waterfall video object 525 and river video object 526 appear to further adapt to the surface edge 197. Wherein, the waterfall video object 525 ends at the surface edge 197 and the river video object 526 begins, simulating an actual river.

Figure 42:
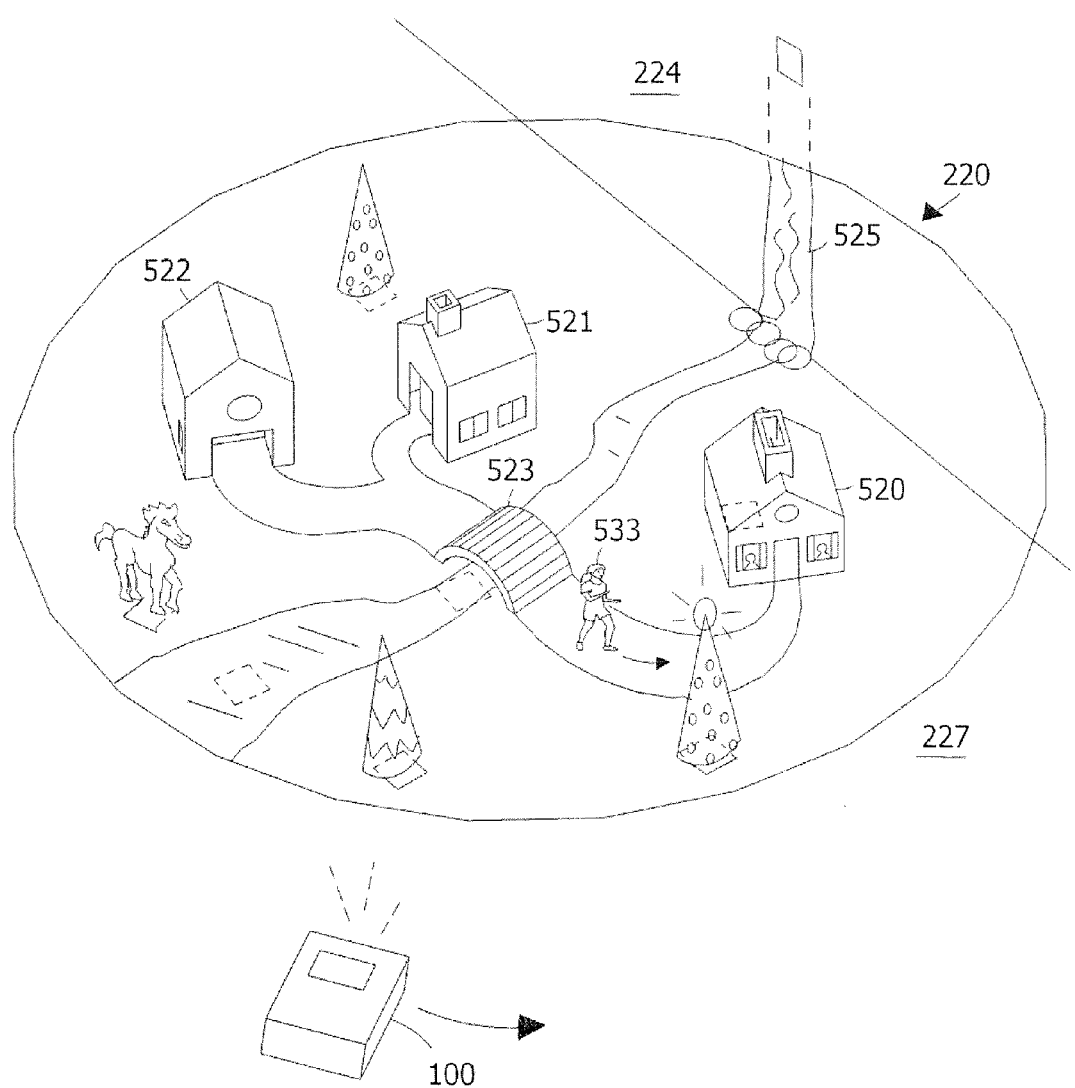
FIG. 42 is a perspective view of the projecting device of FIG. 1, wherein the device has moved to a different vantage point in the view of FIG. 41.

Now turning to FIG. 42, the projecting device 100 has been moved towards the right by a user (not shown), such that the presented visible image 220 comprised of 3D video objects has shifted its view point (in respect to the projected image 220 in FIG. 41). For example, the building video objects 520-522 and waterfall video object 525 have shifted in their perspective, giving the impression to the user that he or she is observing a miniature village of houses, characters, and paths in three-dimensions. Moreover, as the device 100 is moved to the right, the doll video object 533 moves along the path video object 532 on the auto-generated object path. In some embodiments, if device 100 is moved in an arbitrary direction (such as downward), the doll video object 533 remains substantially in the vicinity of the path video object 532 on the auto-generated object path. In some embodiments, if device 100 is moved in an arbitrary direction (such as downward), the doll video object 533 remains substantially affixed to the path video object 532 on the auto-generated object path.

Whereby, in one aspect, a handheld projecting device may present animated video frames, comprising: identifying at least one physical object located on at least one remote surface, connecting one or more video objects to the at least one physical object, determining the position and orientation of the at least one physical object on the at least one remote surface, determining the position and orientation of at least one surface edge of the at least one remote surface, and generating at least one video frame comprised of one or more video objects, wherein the one or more video objects appear to responsively adapt to the position and orientation of the at least one surface edge of the remote surface.

A handheld projecting device may present animated video frames, comprising: connecting at least one video object to a path video object, determining the position and orientation of the path video object on at least one remote surface, and generating at least one video frame comprised of the at least one video object and the path video object, wherein the at least one video object appears to responsively adapt to the position and orientation of the path video object.

A handheld projecting device may present animated video frames, comprising: connecting at least one video object to a path video object, determining the position and orientation of the path video object on at least one remote surface, and generating at least one video frame comprised of the at least one video object and the path video object, wherein the at least one video object appears to remain substantially in the vicinity of the path video object when the handheld projecting device is moved in an arbitrary direction.

A handheld projecting device may present animated video frames, comprising: connecting at least one video object to a path video object, determining the position and orientation of the path video object on at least one remote surface, and generating at least one video frame comprised of the at least one video object and the path video object, wherein the at least one video object appears to remain substantially affixed to the path video object when the handheld projecting device is moved in an arbitrary direction.

Token Physical Objects and Textured-Surface Video Objects

Figure 43:
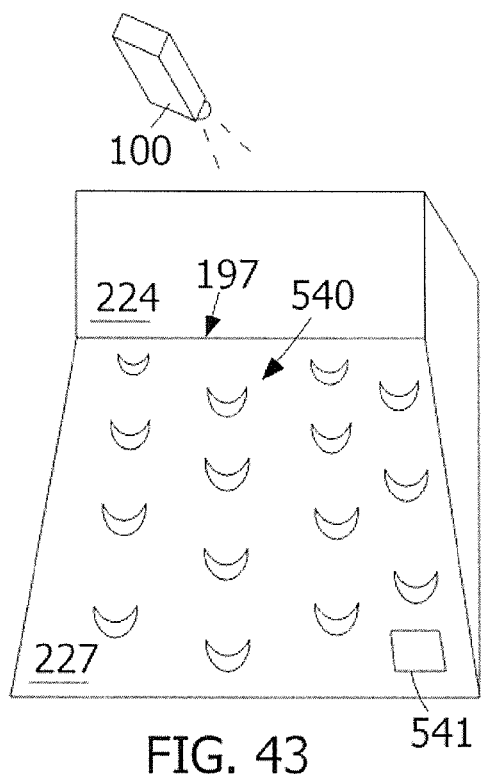
FIG. 43 is a perspective view of the projecting device of FIG. 1, wherein a wallpaper textured-surface video object is projected on a remote surface with a token physical object.
Figure 44:
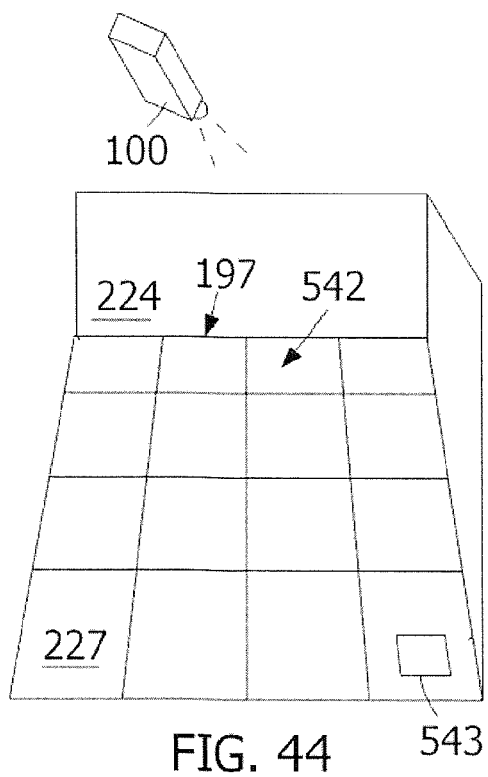
FIG. 44 is a perspective view of the projecting device of FIG. 1, wherein a tiled textured-surface video object is projected on a remote surface with a token physical object.
Figure 45:
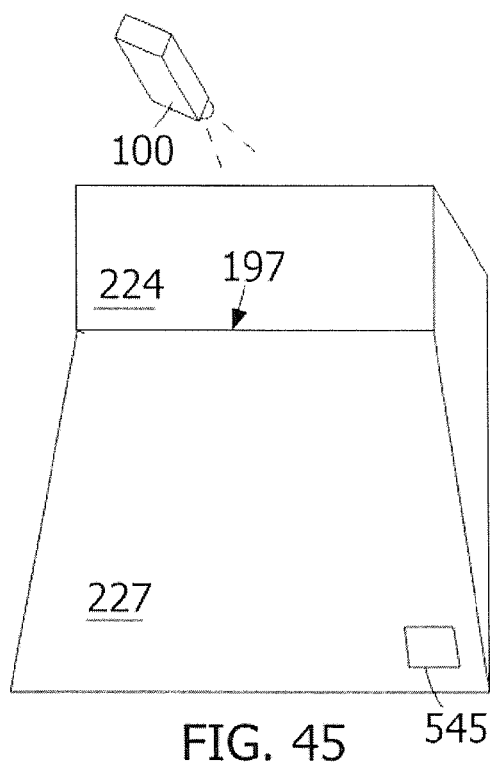
FIG. 45 is a perspective view of the projecting device of FIG. 1, wherein no surface video object appears on a remote surface with a token physical object.

Turning now to FIGS. 43-45, perspective views are given of the projecting device 100, which has projected visible images of various surface video objects on a wall remote surface 224 and a floor remote surface 227. Specifically, FIG. 43 shows projecting device 100 has created a wallpaper textured-surface video object 540, such as a wallpaper pattern, in the vicinity of a token physical object 541. In FIG. 44, the projecting device 100 has created a tiled textured-surface video object 542, such as a tiled pattern, in the vicinity of a token physical object 541. FIG. 43 shows projecting device 100 does not create any video object in the vicinity of a token physical object 545, but does track the position and orientation of the token physical object 545.

Moreover, in FIG. 43 and FIG. 44, the projecting device 100 illuminates the surface video objects according to the boundaries or surface edges of remote surfaces. In FIG. 43, the projecting device 100 illuminates textured-surface video object 540 on floor surface 227 to surface edge 197, but no further. In FIG. 44, the projecting device 100 illuminates textured-surface video object 542 on floor surface 227 to surface edge 197, but no further.

Understandably, other types of textured-surface video objects may be projected by the projecting device, such as a coffered ceiling, surface of a pond, wood flooring, sheet metal paneling, etc. Moreover, as the projecting device is moved through 3D space, the visual perspective can change of the surface video object, as if the surface video object is affixed to the associated remote surface.

Whereby, in one aspect, a projecting device can identify at least one physical object located on at least one remote surface, connect at least one video object to the at least one physical object, determine the position and orientation of the at least one physical object on the at least one remote surface, determine the position, orientation, and shape of the at least one remote surface, and generate a visible image comprised of the at least one video object such that the at least one video object appears to be substantially contained within at least a portion of the shape of the remote surface.

In another aspect, a projecting device can identify at least one physical object on at least one remote surface, connect at least one video object to the at least one physical object, determine the position and orientation of at least one surface edge of the at least one remote surface, and generate a visible image comprised of the at least one video object such that the at least one video object appears to responsively adapt to the at least one surface edge of the at least one remote surface.

Token Physical Objects and a Moving 3D Video Object

Figure 46:
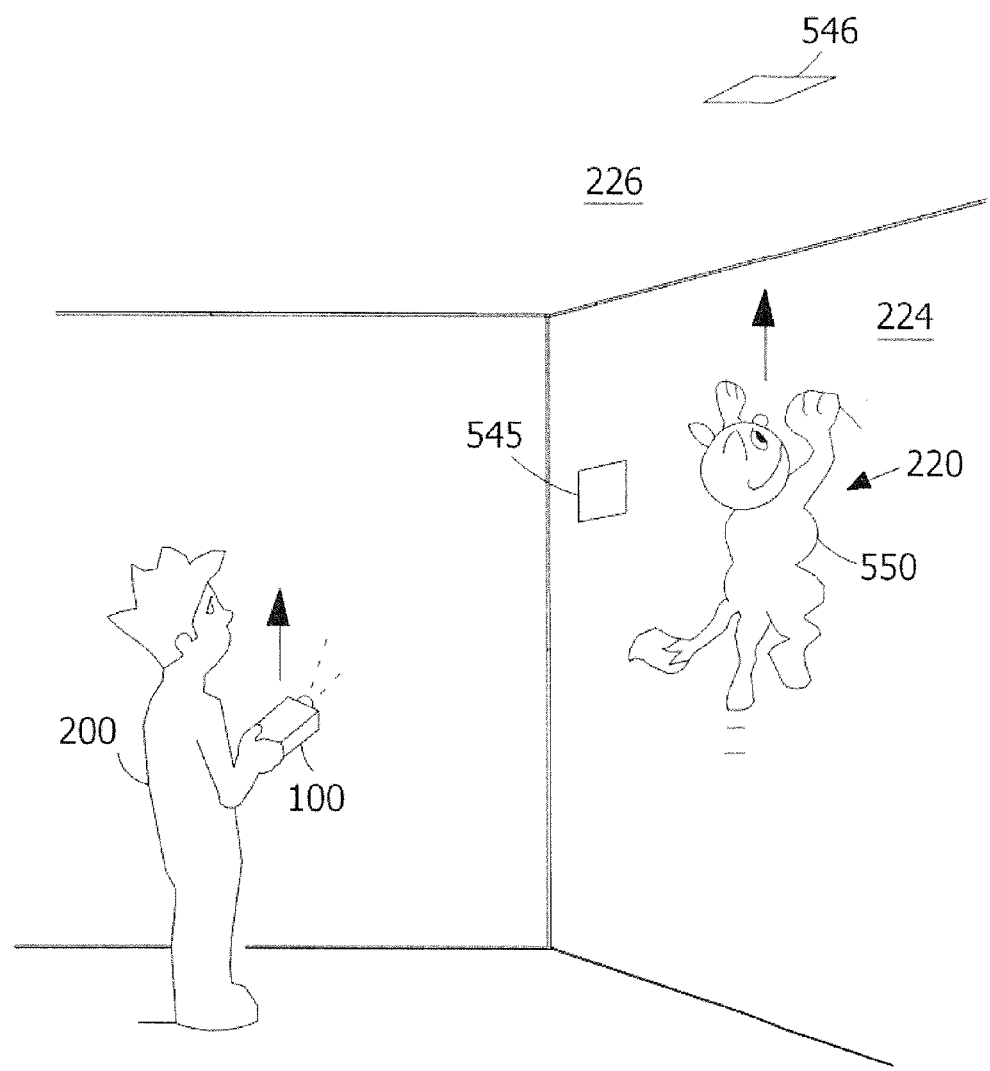
FIG. 46 is a perspective view of the projecting device of FIG. 1, wherein a 3D video object of a cat appears move vertically up a wall remote surface.
Figure 47:
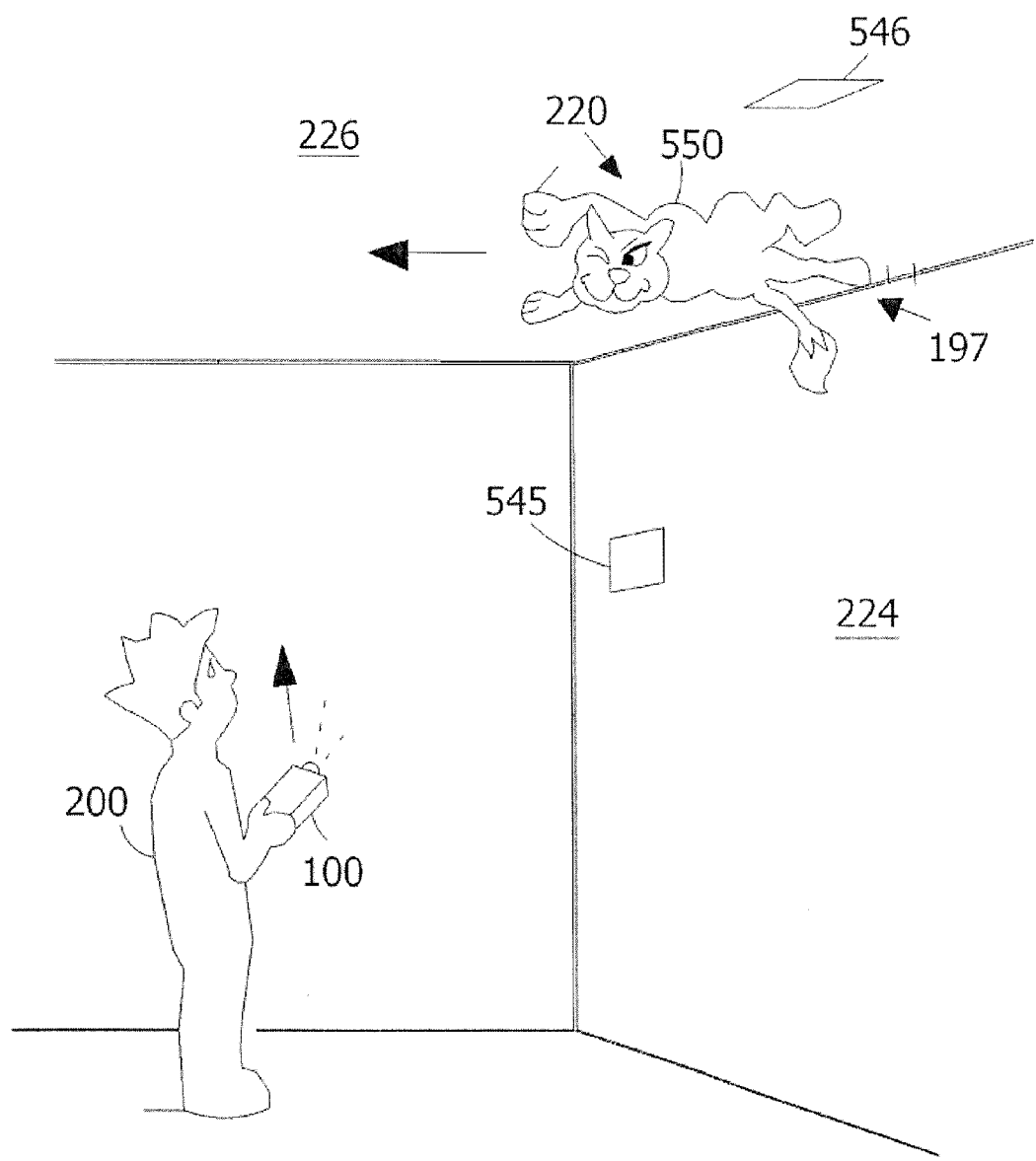
FIG. 47 is a perspective view of the projecting device of FIG. 1, wherein a 3D video object of a cat appears to move horizontally across a ceiling remote surface.

Turning now to FIGS. 46 and 47, thereshown are perspective views of a user 200 holding the projecting device 100, which is illuminating a visible image 220 comprised of a 3D video object 550 of a cat. Moreover, a token physical object 546 is affixed to a ceiling remote surface 226, and a token physical object 545 is affixed to the wall remote surface 224.

Then in an example operation, shown in FIG. 46, the user 200 moves the projecting device 100 in an upwards direction, such that the visible image 220 comprised of the cat 3D video object 550 appears to move upwards and climb up the wall remote surface 224.

In FIG. 47, to continue with the example operation, the user 200 again moves the projecting device 100 in an upward direction. However, the cat 3D video object 550 now appears to be moving across the ceiling remote surface 226. That is, once the cat 3D video object 550 encounters the surface edge 197 between the wall surface 224 and ceiling surface 226, the cat 3D video object 550 appears to adapt to the orientation of the ceiling surface 226.

Whereby, in one aspect, a handheld projecting device may present animated video frames, comprising: identifying at least one physical object located on at least one remote surface, determining the position and orientation of the at least one remote surface, and generating at least one video frame comprised of one or more video objects that is projected by the handheld projecting device, wherein the animated movement of the one or more video objects appears to adapt to the position and orientation of the at least one remote surface.

In another aspect, a handheld projecting device may present animated video frames, comprising: identifying at least one physical object located on at least one remote surface, determining the position and orientation of the at least one remote surface, determining the position and orientation of at least one surface edge of the at least one remote surface, and generating at least one video frame comprised of one or more video objects, wherein the animated movement of the one or more video objects appears to adapt to the at least one surface edge of the at least one remote surface.

In another aspect, a handheld projecting device may present animated video frames, comprising: identifying at least one physical object located on at least one remote surface, determining the position and orientation of the at least one remote surface, and generating at least one video frame comprised of one or more video objects that is projected by the handheld projecting device, wherein the speed and/or direction of the animated movement of the one or more video objects appears to adapt to the position and orientation of the at least one remote surface.

Token Physical Objects, Surface Video Objects, and 3D Video Objects

Figure 48:
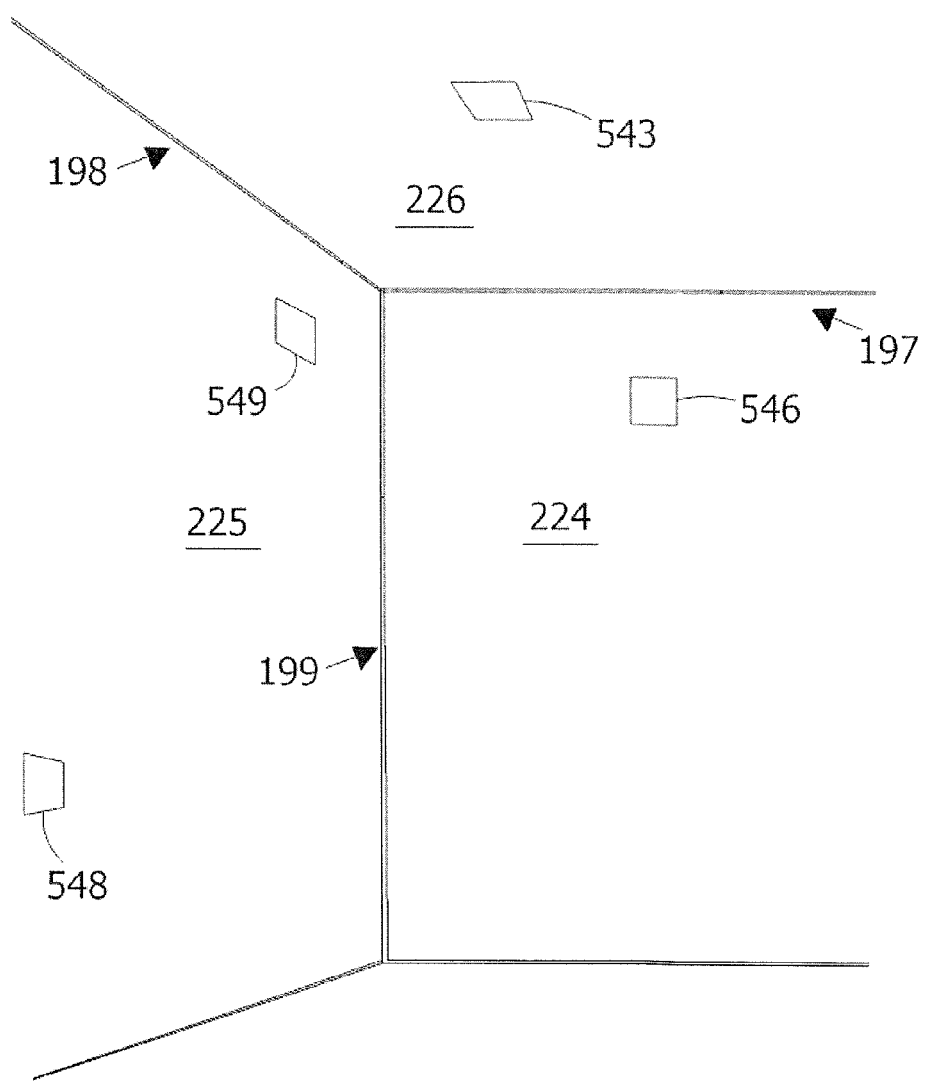
FIG. 48 is a perspective view of a collection of token physical objects located on three remote surfaces.

Turning now to FIG. 48, a perspective view of token physical objects 543, 546, 548, and 549 are shown located on wall remote surfaces 224-225 and ceiling remote surface 226 forming the surface edges 197-199. The token physical objects 543, 546, 548, and 549 may be arbitrarily placed in an environment.

Figure 49:
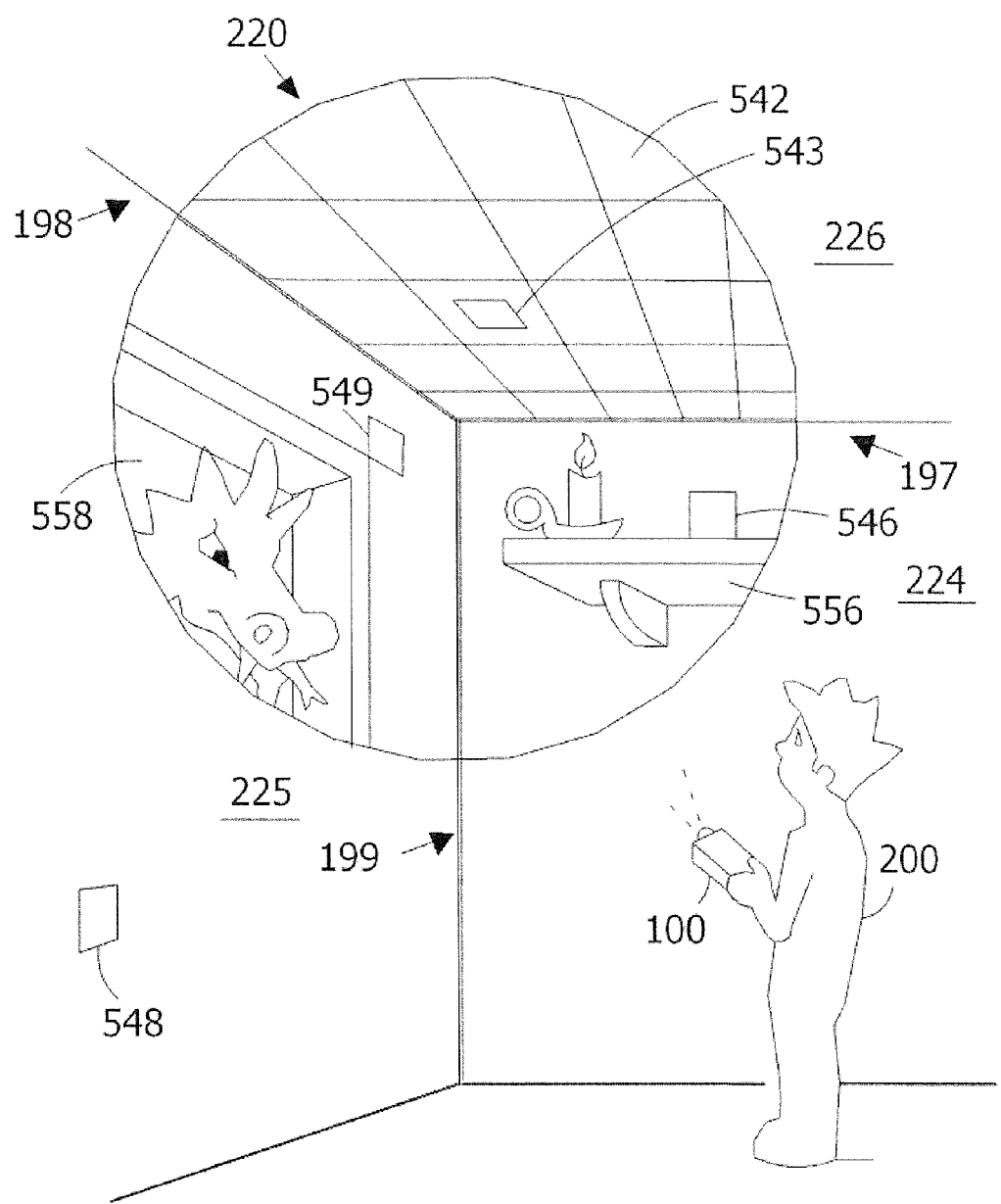
FIG. 49 is a perspective view of the projecting device of FIG. 1, wherein a surface video object and 3D video objects are projected on three remote surfaces.

Then continuing to FIG. 49, during an example operation, the projecting device 100 is aimed by the user 200 at the token physical objects 543, 546, 548, and 549, creating a visible image 220 comprised of a multitude of surface video objects and 3D video objects on remote surfaces 224-226.

A coffered ceiling textured-surface object 542 appears in the vicinity of the token physical object 543 on the ceiling remote surface 226. Moreover, the textured-surface object 542 adapts and extends to the surface edges 197 and 198 of the ceiling remote surface 226, but no further.

A shelf 3D video object 556 appears in the vicinity of the token physical object 546. Wherein, the shelf video object 556 contains a burning candle.

Finally, a window 3D video object 558 with a dragon looking in appears in the vicinity of token physical objects 548 and 549.

Figure 50:
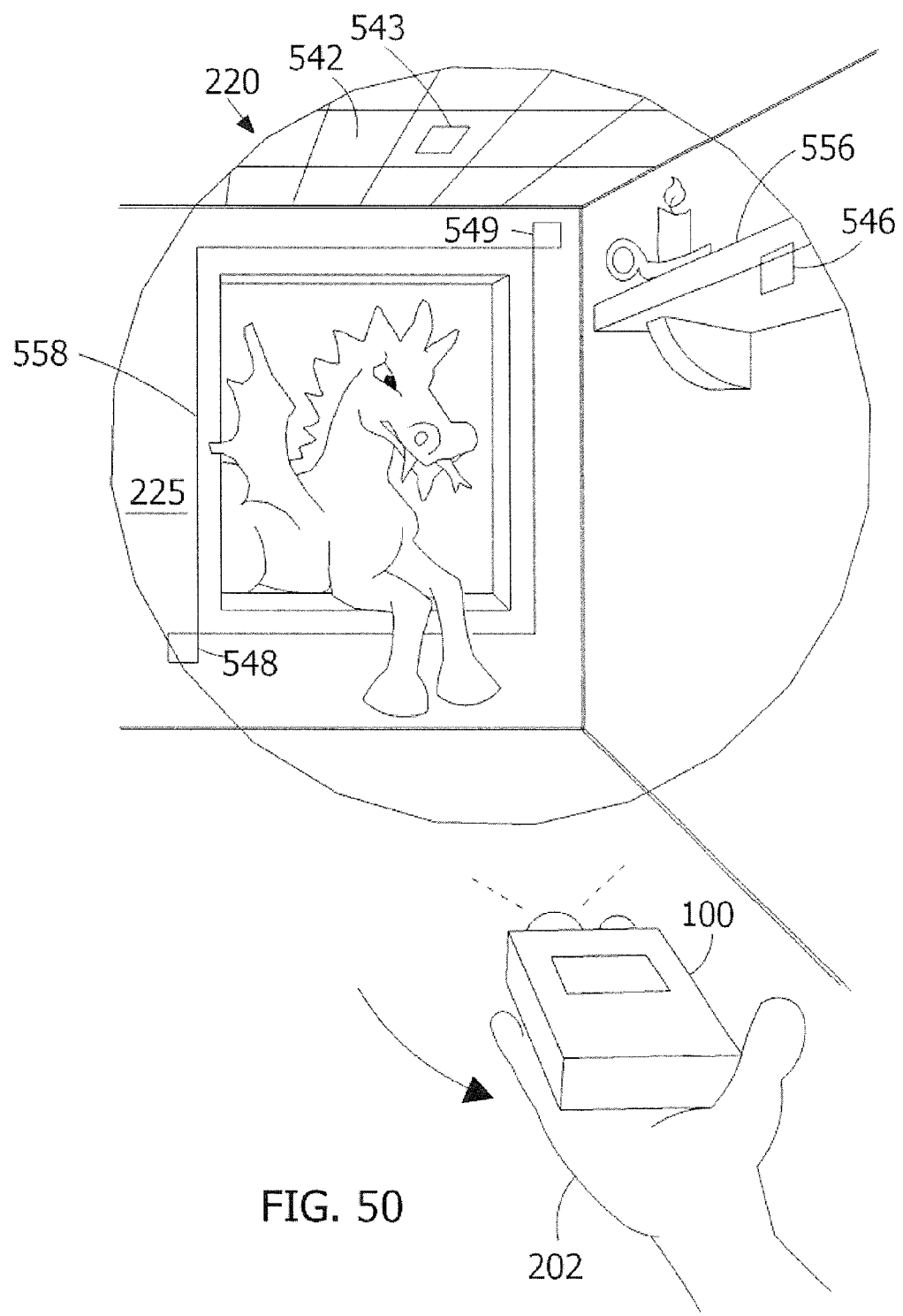
FIG. 50 is a perspective view of the projecting device of FIG. 1, wherein the device has moved to a different vantage point in the view of FIG. 49.

So turning to FIG. 50, thereshown is another perspective view where the projector 100 has been moved b a user hand 202. A new vantage point now exists for the token physical objects 543, 546, 548, and 549. Wherein, the visible image 220 comprised of the coffered ceiling textured-surface object 542, shelf 3D video object 556, and window 3D video object 55 are displayed as if the user has moved around actual objects in 3D space.

Also, the window 3D video object 558 utilizes two physical objects 548 and 549 to define the position of window corners on remote surface 225. For example, if a user moves the token physical objects 548 and 549 closer together, the window 3D video object 558 will get smaller in size. Whereby, a user can adjust the position, size, and/or shape of the video object 558 by adjusting the locations of a plurality of physical objects 548 and 549 on one or more remote surfaces. In other embodiments, a generated video object may utilize a plurality of physical objects to define various attributes of the video object, such as its position, orientation, shape, size, color, rendered perspective, etc.

Understandably, alternate embodiments may be comprised of other types of video objects, 3D video objects, and textured-surface video objects that are connected to physical objects within an environment. The entire environment (e.g., ceiling, walls floor, etc.) can be affixed with physical objects such that a projecting device can render a full-sized virtual world. Moreover, such a virtual world is user-configurable, simply by rearranging one or more physical objects in the environment.

Visible Light Handheld Projecting Device

Figure 51:
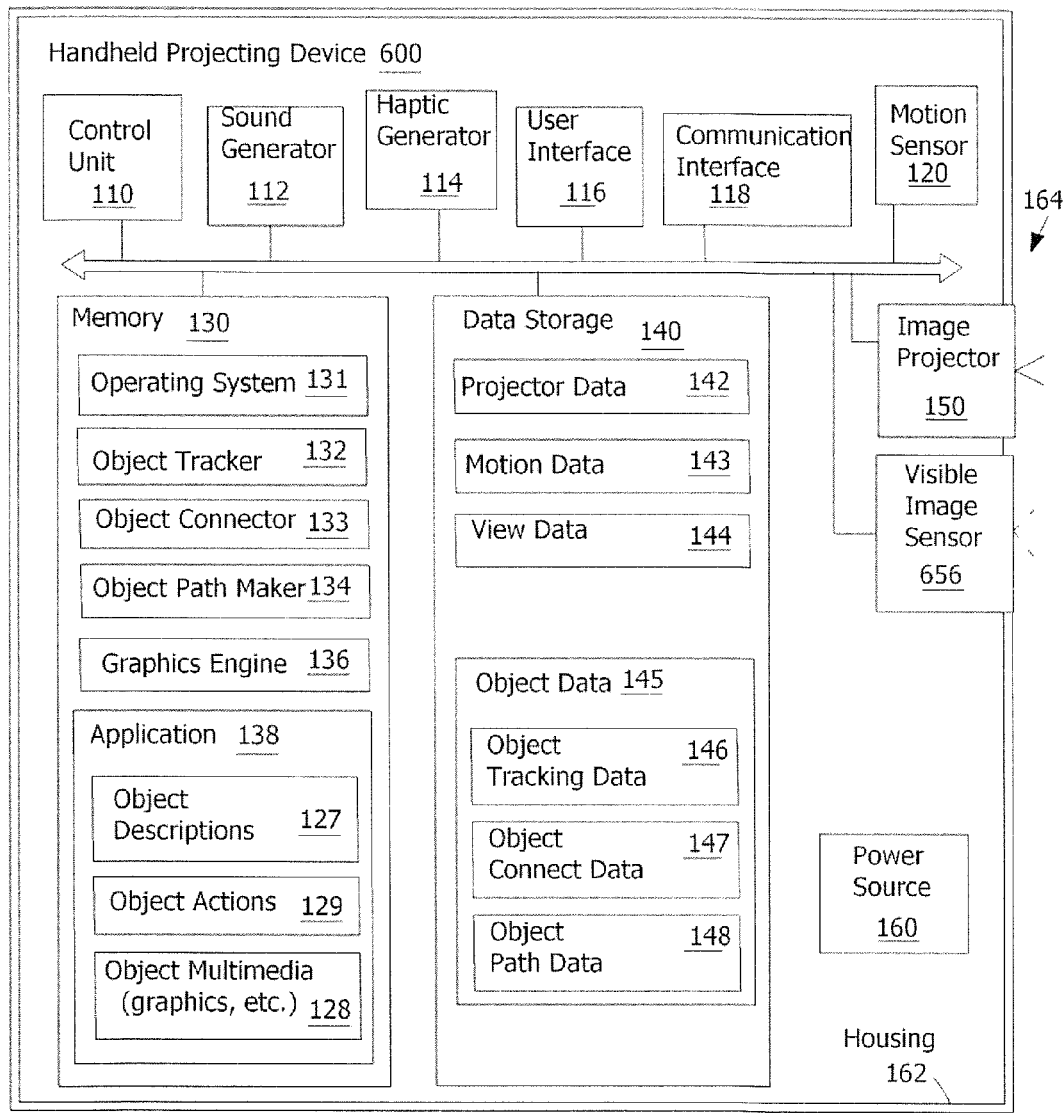
FIG. 51 is a block diagram of a second embodiment of a visible light handheld projecting device, showing components.

Turning now to FIG. 51, a block diagram of a second embodiment of the disclosure is presented, referred to as a visible light handheld projecting device 600. Though projecting device 600 is similar in construction to the previous projecting device (as shown in FIG. 3), there are some modifications that include, but not limited to, the following: the previous infrared image sensor has been replaced with a visible image sensor 656, and the previous infrared light emitter (reference numeral 158 of FIG. 3) has been removed. Similar parts use similar reference numerals in the given Figures.

So in detail in FIG. 51, the visible light handheld projecting device 600 is comprised of, but not limited to, outer housing 162, control unit 110, sound generator 112, haptic generator 114, user interface 116, communication interface 118, motion sensor 120, image projector 150, visible image sensor 656, memory 130, data storage 140, and power source 160.

Most of these components may be constructed and function similar to the previous embodiment's components (as defined in FIG. 3). However, one component shall be discussed in greater detail.

Visible Image Sensor

As shown in FIG. 51, affixed to the front end 164 of device 600 is the visible image sensor 656, which is operable to detect a spatial view of at least visible light (e.g., red, green, and/or blue light) outside of device 600. Moreover, image sensor 656 may be operable to capture one or more image view frames. Image sensor 656 may be operatively coupled to control unit 110 such that control unit 110, for example, may receive and process captured image data. Visible image sensor 656 may be comprised of at least one of a photo diode-, a photo detector-, a photo detector array-, a complementary metal oxide semiconductor (CMOS)-, a charge coupled device (CCD)-, or an electronic camera-based image sensor that is sensitive to at least visible light, although other types, combinations, and/or numbers of image sensors may be considered. In the current embodiment, the visible image sensor 656 may be a CMOS- or CCD-based video camera that is sensitive to at least visible light (e.g., red, green, and/or blue).

Visible Object Tags

As shown in FIG. 51, the projecting device 600 uses the visible image sensor 656 to sense at least visible light. Whereby, the object tags that are included or affixed to physical objects should be detectable in at least in visible light by the image sensor 656. So turning briefly back to FIG. 5, thereshown are example object tags 276-1, 276-2, 276-3, and 276-4 that include various patterns of optical machine-readable representation of data. Such object tags may be adapted to be detectable in visible light, such as, for example, a 2D barcode printed with visible ink on paper. Moreover, the visible object tags may include a pattern or shape that has a one-fold rotational symmetry (as discussed in FIGS. 5-7).

Operations of the Visible Light Handheld Projecting Device

The operations and capabilities of the visible light handheld projecting device 600, shown in FIG. 51, may be substantially similar to the operations and capabilities of the previous embodiment of the handheld projecting device (as disclosed in FIGS. 1-50). This assumes the previous embodiment's object tags are replaced with visible object tags (as described above).

For example, the handheld projecting device 600 of FIG. 51 can illuminate one or more video objects that adapt to the position and orientation of at least one physical object. In some embodiments, the device 600 can connect together physical objects and video objects to form an object path. For sake of brevity, the reader may refer back to the previous embodiment's description (as disclosed in FIGS. 1-50) of operations and capabilities to appreciate the visible light handheld projecting device 600.

Infrared Receiver Handheld Projecting Device

Figure 52:
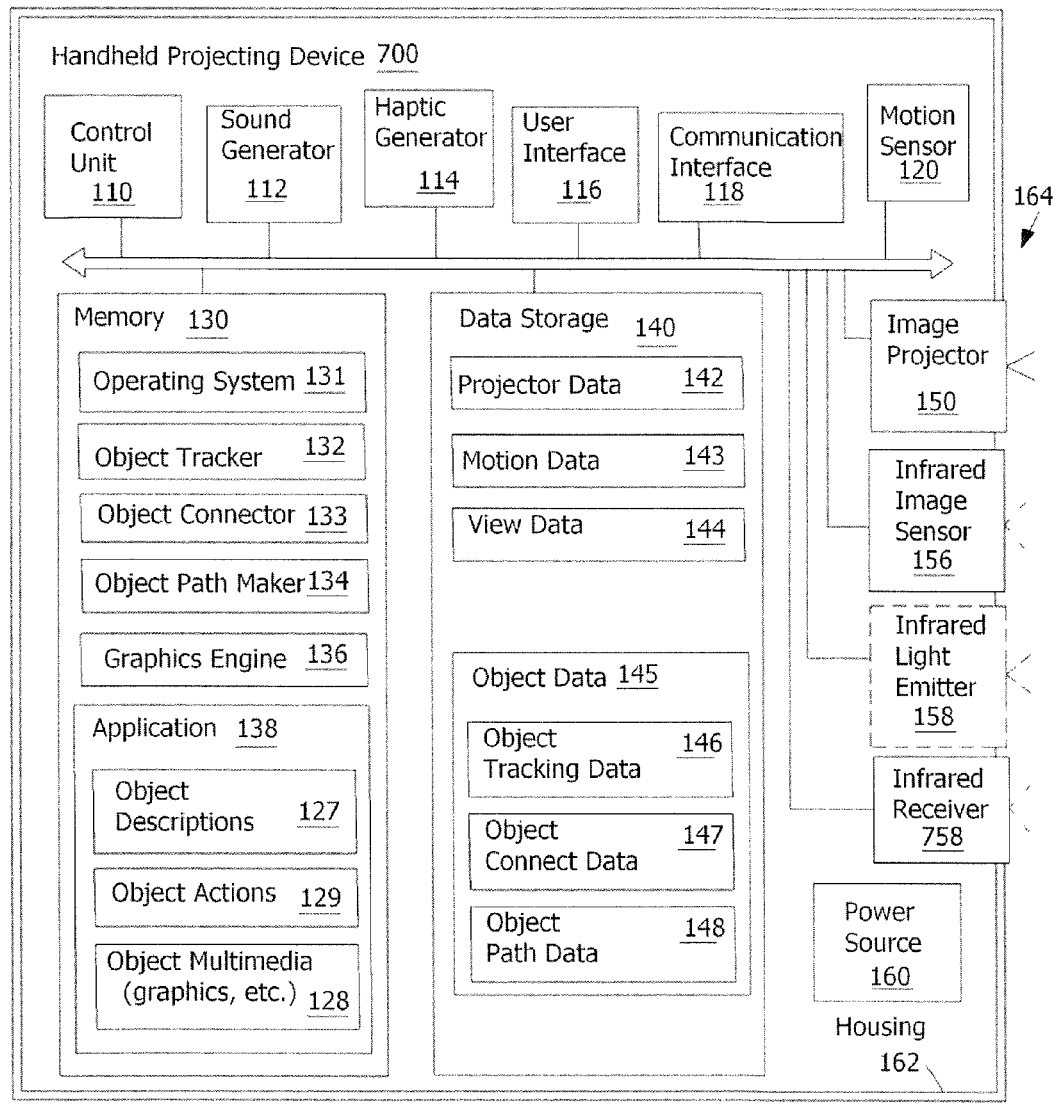
FIG. 52 is a block diagram of a third embodiment of an infrared receiver handheld projecting device, showing components.

Turning now to FIG. 52, a block diagram of a third embodiment of the disclosure is presented, referred to as an infrared receiver handheld projecting device 700. Though projecting device 700 is similar in construction to the previous projecting device (as shown in FIG. 3), there are some modifications that include, but not limited to, the following: an infrared receiver 758 has been added to the apparatus. Similar parts use similar reference numerals in the given Figures.

So in detail in FIG. 52, the infrared receiver handheld projecting device 700 is comprised of, but not limited to, outer housing 162, control unit 110, sound generator 112, haptic generator 114, user interface 116, communication interface 118, motion sensor 120, image projector 150, infrared image sensor 156, infrared light emitter 158, infrared receiver 758, memory 130, data storage 140, and power source 160.

Most of these components may be constructed and function similar to the previous embodiment's components (as defined in FIG. 3). However, one component shall be discussed in greater detail.

Infrared Receiver

As shown in FIG. 52, affixed to the front end 164 of device 700 is the infrared receiver 758, which is operable to receive modulated and data encoded infrared light. Infrared receiver may be operatively coupled to control unit 110 such that control unit 110, for example, may receive a data encoded signal from receiver 758 and transform the signal into binary data. The infrared receiver 758 may be comprised of at least one of a photo diode-, a photo detector-, a photo detector array-, a complementary metal oxide semiconductor (CMOS) image sensor, a charge coupled device (CCD) image sensor, or an integrated circuit-based infrared receiver that is sensitive to at least infrared light, although other types, combinations, and/or numbers of infrared receivers may be considered.

Active Infrared Object Tags

Figure 53:
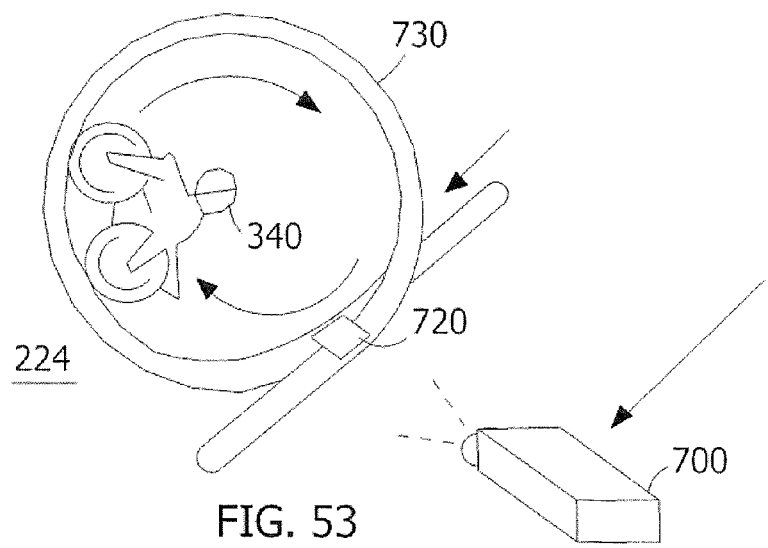
FIG. 53 is a perspective view of the projecting device of FIG. 52, wherein a motorcycle video object is spinning around in a loop physical object.

Turning now to FIG. 53, a perspective view is shown of the projecting device 700 illuminating a motorcycle video object 340 in the vicinity of a loop physical object 730 that includes an active infrared object tag 720. So in an example operation, device 700 detects and receives object tag data (e.g., tag ID="340", etc.) from the infrared object tag 720 using its infrared receiver (reference numeral 758 of FIG. 52). Device 700 further determines the position and orientation of the infrared object tag 720 on remote surface 224 using its infrared image sensor (reference numeral 156 of FIG. 52). Whereupon, in response to interactivity between objects 340 and 730, the device 700 connects the video object 340 to the physical object 730, and rotates the motorcycle video object 340 around the loop physical object 730.

FIGS. 54A-56 show examples of active infrared object tags, which transmit modulated and data encoded infrared light, although alternative active infrared object tags may be considered as well. The light encoded data may contain tag and/or physical object information (e.g., tag ID, physical object ID, etc.). Moreover, the active infrared object tags may generate infrared light in a pattern or shape that has a one-fold rotational symmetry or is asymmetrical (such that a rotational orientation of the tag can be determined, similar to the object tags of FIGS. 5-6).

Figures 54A, 55, 56:
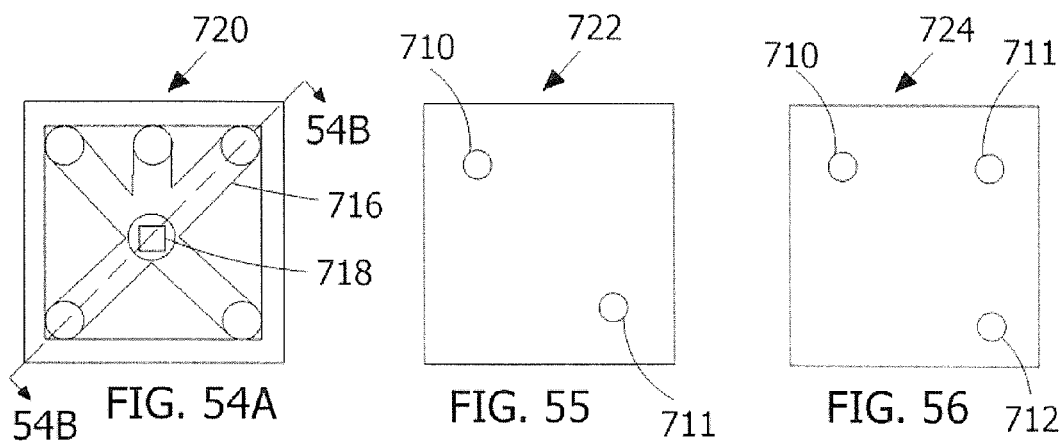
FIG. 54A is a top view of a first example of an active infrared object tag.
FIG. 55 is a top view of a second example of an active infrared object tag.
FIG. 56 is a top view of a third example of an active infrared object tag.
Figure 54B:
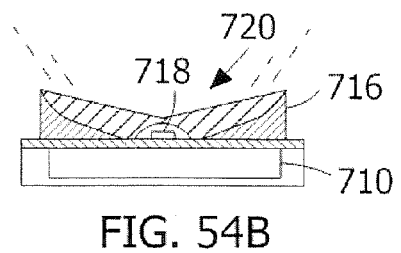
FIG. 54B is a section view of the active infrared object tag of FIG. 54A.

So turning first to FIG. 54A, a top view is shown of active infrared object tag 720 comprised of an optical waveguide 716 (i.e., infrared light transmissive plastic) and at least one infrared light source 718 (i.e., infrared light emitting diode). In FIG. 54B, presented is a section view of the infrared object tag 720 that is comprised of, but not limited to, the optical waveguide 716, the infrared light source, and a support module 710. The support module 710 may be comprised of, but not limited to, a data signal modulator (e.g., microcontroller with modulated data encoding abilities), and a portable battery.

Then in operation, shown in FIGS. 54A-54B, the infrared light source 718 modulates infrared light, which is transmitted through and out the optical waveguide 716 such that the active infrared object tag 760 creates a modulated, data encoded light pattern that has a one-fold rotational symmetry or is asymmetrical.

Turning now to FIG. 55, presented is a top view of an active infrared object tag 722 that is comprised of infrared light emitters 710 and 711 (i.e., infrared light emitting diodes), and a support module (not shown but similar to module 710 of FIG. 54B).

Then in operation, the emitters 710 and 711 may toggle in light intensity or duration such that the object tag 722 creates a modulated, data encoded light pattern that has a one-fold rotational symmetry or is asymmetrical.

Finally, turning to FIG. 56, presented is a top view of an active infrared object tag 724 that is comprised of, but not limited to, a plurality of infrared light emitters 710, 711, and 712 (i.e., infrared light emitting diodes), and a support module (not shown but similar to module 710 of FIG. 54B).

Then in operation, a plurality of infrared light emitters 710-712 modulate infrared light such that the object tag 724 creates a modulated, data encoded light pattern that has a one-fold rotational symmetry or is asymmetrical.

Operations of the Infrared Receiver Handheld Projecting Device

The operations and capabilities of the infrared receiver handheld projecting device 700, shown in FIG. 52, may be substantially similar to the operations and capabilities of the previous embodiment of the handheld projecting device (as disclosed in FIGS. 1-50). This assumes the previous embodiment's object tags are replaced with active infrared object tags (as described above).

For example, the handheld projecting device 700 of FIG. 52 can illuminate one or more video objects that adapt to the position and orientation of at least one physical object. In some embodiments, the device 700 can connect together physical objects and video objects to form an object path. For sake of brevity, the reader may refer back to the previous embodiment's description (as disclosed in FIGS. 1-50) of operations and capabilities to appreciate the infrared receiver handheld projecting device 700.

Summary of Handheld Projecting Devices

Design advantages of the handheld projecting device (as shown in FIGS. 1-50) may include, but not limited to, low cost object tags for the physical objects. In contrast, design advantages of the visible light handheld projecting device (as shown in FIG. 51) may include, but not limited to, low cost object tags and potential use of an off-the-shelf visible image sensor. Yet design advantages of the infrared receiver handheld projecting device (shown in FIG. 52) may include, but not limited to, rapid detection and identification of physical objects.

Although projectors and image sensors may be affixed to the front end of projecting devices, alternative embodiments of the projecting device may locate the image projector and/or image sensor at the device top, side, and/or other device location.

Some embodiments of the handheld projecting device may be integrated with and made integral to a mobile telephone, a tablet computer, a laptop, a handheld game device, a video player, a music player, a personal digital assistant, a mobile TV, a digital camera, a robot, a toy, an electronic appliance, or any combination thereof.

Finally, the handheld projecting device embodiments disclosed herein are not necessarily mutually exclusive in their construction and operation, for some alternative embodiments may be constructed that combine, in whole or part, aspects of the disclosed embodiments.

Various alternatives and embodiments are contemplated as being within the scope of the following claims particularly pointing out and distinctly claiming the subject matter regarded as the invention.

I claim:

1. An interactive image projecting system, comprising:
   at least one physical object; and
   a handheld projecting device including:
   an outer housing;
   a control unit within the outer housing;
   an image projector operatively coupled to the control unit and operable to project a visible image comprised of one or more video objects generated by the control unit;
   an image sensor operatively coupled to the control unit and operable to observe a spatial view including the at least one physical object located on a remote surface; and
   an object tracker operable to analyze the observed spatial view including, the at least one physical object and determine a position and orientation of the at least one physical object from the observed spatial view,
   wherein the control unit modifies the visible image comprised of one or more video objects based upon the position and orientation of the at least one physical object relative to the projected visible image, that the one or more video objects adapt to the position and orientation of the at least one physical object.

2. The device of claim 1 further comprising an object connector operable to connect the one or more video objects to the at least one physical object such that the one or more video objects appear to remain substantially in the vicinity of the at least one physical object.

3. The device of claim 1 further comprising an object connector operable to connect the one or more video objects to the at least one physical object such that the one or more video objects appear to remain substantially affixed to the at least one physical object.

4. The device of claim 1, wherein the object tracker further identifies the at least one physical object by analyzing at least one object tag associated with the physical object, wherein the object tag is comprised of an optical machine-readable pattern that represents data.

5. The device of claim 1 further comprising an object path maker operable to create an object path among a plurality of physical objects.

6. The device of claim 5, wherein the object path is an auto-generated object path that is substantially defined by the handheld projecting device.

7. The device of claim 5, wherein the object path is a user-defined object path that is substantially defined by a user.

8. A computer-implemented method for presenting video frames projected by a handheld projecting device, comprising the steps of:
   obtaining, a spatial view located in front of the handheld projecting device;
   determining a position and orientation of at least one physical object in the spatial view by the handheld projecting device; and
   rendering one or more video frames comprised of one or more video objects that are projected by the handheld projecting device, wherein the one or more video objects appear to responsively adapt to the position and orientation of the at least one physical object in the spatial view.

9. The method of claim 8, wherein the handheld projecting device connects the one or more video objects to the at least one physical object such that the one or more video objects appear to remain substantially in the vicinity of the at least one physical object.

10. The method of claim 8, wherein the handheld projecting device connects the one or more video objects to the at least one physical object such that the one or more video objects appear to remain substantially affixed to the at least one physical object.

11. The method of claim 8, wherein the handheld projecting device further creates an object path among a plurality of physical objects.

12. The method of claim 11, wherein at least a first video object of the one or more video objects is a path video object that graphically defines the object path.

13. The method of claim 11, wherein at least a first video object of the one or more video objects is moved along, the object path by moving the handheld projecting device.

14. The method of claim 11, wherein the object path forms a closed path or a racetrack.

15. The method of claim 11, wherein the object path is an auto-generated object path that is substantially defined by the handheld projecting device.

16. The method of claim 11, wherein the object path is a user-defined object path that is substantially defined by a user.

17. A computer-readable storage medium comprised of computer-executable instructions that, when processed by a control unit, perform an operation for presenting video frames projected by a handheld projecting device, the operation comprising:

- obtaining a spatial view located in front of the handheld projecting device;
- determining a position and orientation of at least one physical object in the spatial view by the handheld projecting device; and
- rendering one or more video frames comprised of one or more video objects that are projected by the handheld projecting device, wherein the one or more video objects appear to responsively adapt to the position and orientation of the at least one physical object in the spatial view.

18. The computer-readable storage medium of claim 17, wherein the handheld projecting device connects the one or more video objects to the at least one physical object such that the one or more video objects appear to remain substantially in the vicinity of the at least one physical object.

19. The computer-readable storage medium of claim 17, wherein the handheld projecting device connects the one or more video objects to the at least one physical object such that the one or more video objects appear to remain substantially affixed to the at least one physical object.

20. The computer-readable storage medium of claim 17, wherein the handheld projecting device further creates an object path among a plurality of physical objects.

21. The computer-readable storage medium of claim 20, wherein at least a first video object of the one or more video objects is a path video object that graphically defines the object path.

22. The computer-readable storage medium of claim 20, wherein at least a first video object of the one or more video objects moved along the object path by moving the handheld projecting device.

23. The computer-readable storage medium of claim 20, wherein the object path forms a closed path or a racetrack.

24. The computer-readable storage medium of claim 20, wherein the object path is an auto-generated object path that is substantially defined by the handheld projecting device.

25. The computer-readable storage medium of claim 20, wherein the object path is a user-defined object path that is substantially defined by a user.

\* \* \* \* \*